US009875601B2

(12) United States Patent
Kitamura et al.

(10) Patent No.: US 9,875,601 B2
(45) Date of Patent: Jan. 23, 2018

(54) GAMING MACHINE THAT SHOWS CONSECUTIVE SYMBOLS OF SPECIFIC KIND

(71) Applicants: Universal Entertainment Corporation, Koto-ku, Tokyo (JP); Aruze Gaming America, Inc., Las Vegas, NV (US)

(72) Inventors: Kenta Kitamura, Tokyo (JP); Susumu Mio, Tokyo (JP); Ryosuke Takahashi, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 43 days.

(21) Appl. No.: 14/864,342

(22) Filed: Sep. 24, 2015

(65) Prior Publication Data

US 2016/0093146 A1 Mar. 31, 2016

(30) Foreign Application Priority Data

Sep. 25, 2014 (JP) ................................ 2014-194911

(51) Int. Cl.

*A63F 13/00* (2014.01)
*G07F 17/32* (2006.01)
*G07F 17/34* (2006.01)

(52) U.S. Cl.

CPC ...... *G07F 17/3213* (2013.01); *G07F 17/3258* (2013.01); *G07F 17/34* (2013.01)

(58) Field of Classification Search

CPC ... G07F 17/3213; G07F 17/3258; G07F 17/34
USPC ........................................................ 463/21
See application file for complete search history.

(56) References Cited

U.S. PATENT DOCUMENTS

2008/0318664 A1* 12/2008 Saito .................. G07F 17/3267 463/20
2010/0093424 A1* 4/2010 Kono ..................... G07F 17/32 463/20
2011/0034234 A1* 2/2011 Berman ............. G07F 17/3265 463/20
2011/0312400 A1* 12/2011 Schultz .................. G07F 17/34 463/20
2013/0310138 A1* 11/2013 Kitamura ........... G07F 17/3213 463/20
2013/0310155 A1 11/2013 Fujisawa et al.
2014/0179398 A1* 6/2014 Vandaele ............... G07F 17/34 463/20

* cited by examiner

*Primary Examiner* — Allen Chan
(74) *Attorney, Agent, or Firm* — Potomac Law Group, PLLC; Kenneth Fagin

(57) ABSTRACT

Provided is a gaming machine capable of changing a symbol when a predetermined condition is satisfied even though the gaming machine is a type of gaming machine that mechanically drives real reels. The gaming machine drives the reels to show a second symbol and drives the reels to show consecutive first symbols when the second symbol is shown.

1 Claim, 47 Drawing Sheets

FIG. 8

| No. | 52A | 52B | 52C | 52D | 52E |
|---|---|---|---|---|---|
| 1 | 1 | 1 | 1 | 1 | 1 |
| 2 | 0 | 0 | 0 | 0 | 0 |
| 3 | 2 | 2 | 2 | 2 | 2 |
| 4 | 0 | 1 | 2 | 1 | 0 |
| 5 | 2 | 1 | 0 | 1 | 2 |
| 6 | 0 | 2 | 0 | 2 | 0 |
| 7 | 2 | 0 | 2 | 0 | 2 |
| 8 | 1 | 0 | 1 | 0 | 1 |
| 9 | 1 | 2 | 1 | 2 | 1 |
| 10 | 0 | 0 | 1 | 0 | 0 |
| 11 | 2 | 2 | 1 | 2 | 2 |
| 12 | 1 | 0 | 2 | 0 | 1 |
| 13 | 1 | 2 | 0 | 2 | 1 |
| 14 | 0 | 2 | 2 | 2 | 0 |
| 15 | 2 | 0 | 0 | 0 | 2 |
| 16 | 0 | 1 | 0 | 1 | 0 |
| 17 | 2 | 1 | 2 | 1 | 2 |
| 18 | 1 | 1 | 0 | 1 | 1 |
| 19 | 1 | 1 | 2 | 1 | 1 |
| 20 | 1 | 0 | 0 | 0 | 1 |
| 21 | 1 | 2 | 2 | 2 | 1 |
| 22 | 0 | 1 | 1 | 1 | 0 |
| 23 | 2 | 1 | 1 | 1 | 2 |
| 24 | 0 | 0 | 2 | 0 | 0 |
| 25 | 2 | 2 | 0 | 2 | 2 |
| 26 | 0 | 0 | 1 | 2 | 2 |
| 27 | 2 | 2 | 1 | 0 | 0 |
| 28 | 1 | 2 | 1 | 0 | 1 |
| 29 | 2 | 0 | 1 | 0 | 2 |
| 30 | 0 | 2 | 1 | 2 | 0 |

FIG. 9

| Symbol | 1 | 2 | 3 | 4 | 5 |
|---|---|---|---|---|---|
| WILD | 0 | 0 | 50 | 100 | 300 |
| RED7 | 0 | 0 | 30 | 75 | 200 |
| BLUE7 | 0 | 0 | 20 | 50 | 150 |
| ANY7 | 0 | 0 | 10 | 20 | 30 |
| 3BAR | 0 | 0 | 20 | 40 | 80 |
| 2BAR | 0 | 0 | 15 | 20 | 40 |
| 1BAR | 0 | 0 | 10 | 15 | 30 |
| ANYBAR | 0 | 0 | 5 | 10 | 15 |

Scatter Win

| Symbol | 1 | 2 | 3 | 4 | 5 |
|---|---|---|---|---|---|
| BONUS | 0 | 0 | 1 | 2 | 5 |

FIG. 10

| | 52A | | 52B | | 52C | | 52D | | 52E | |
|---|---|---|---|---|---|---|---|---|---|---|
| NO. | SYMBOL | WEIGHT | SYMBOL | WEIGHT | SYMBOL | WEIGHT | SYMBOL | WEIGHT | SYMBOL | WEIGHT |
| 0 | 1BAR | 10 | 3BAR | 4 | 2BAR | 2 | 3BAR | 10 | 1BAR | 20 |
| 1 | Blank | 25 | Blank | 8 | Blank | 4 | Blank | 4 | Blank | 20 |
| 2 | RED7 | 9 | RED7 | 15 | RED7 | 6 | RED7 | 8 | RED7 | 30 |
| 3 | Blank | 30 | Blank | 10 | Blank | 14 | Blank | 20 | Blank | 28 |
| 4 | BLUE7 | 9 | BLUE7 | 16 | BLUE7 | 6 | BLUE7 | 15 | BLUE7 | 32 |
| 5 | Blank | 25 | Blank | 10 | Blank | 4 | Blank | 4 | Blank | 20 |
| 6 | 3BAR | 24 | 2BAR | 17 | 1BAR | 6 | 2BAR | 8 | 3BAR | 10 |
| 7 | Blank | 20 | Blank | 6 | Blank | 2 | Blank | 4 | Blank | 20 |
| 8 | BLUE7 | 19 | RED7 | 21 | RED7 | 4 | RED7 | 9 | BLUE7 | 10 |
| 9 | Blank | 19 | Blank | 14 | Blank | 11 | Blank | 10 | Blank | 20 |
| 10 | RED7 | 12 | BLUE7 | 22 | BLUE7 | 4 | BLUE7 | 11 | RED7 | 10 |
| 11 | Blank | 14 | Blank | 5 | Blank | 2 | Blank | 8 | Blank | 8 |
| 12 | BONUS | 15 | BONUS | 5 | BONUS | 2 | BONUS | 15 | BONUS | 9 |
| 13 | Blank | 13 | Blank | 5 | Blank | 2 | Blank | 8 | Blank | 8 |
| 14 | 1BAR | 24 | 1BAR | 6 | 1BAR | 6 | 2BAR | 4 | 3BAR | 10 |
| 15 | Blank | 20 | Blank | 18 | Blank | 4 | Blank | 9 | Blank | 10 |
| 16 | 2BAR | 16 | 2BAR | 12 | 3BAR | 1 | 1BAR | 12 | 2BAR | 20 |
| 17 | Blank | 5 | Blank | 1 | Blank | 1 | Blank | 5 | Blank | 21 |
| 18 | Wild1 | 1 | Wild1 | 1 | Wild1 | 1 | Wild1 | 6 | Wild1 | 2 |
| 19 | Wild2 | 1 | Wild2 | 1 | Wild2 | 1 | Wild2 | 1 | Wild2 | 2 |
| 20 | Wild3 | 1 | Wild3 | 1 | Wild3 | 1 | Wild3 | 6 | Wild3 | 2 |
| 21 | Blank | 6 | Blank | 2 | Blank | 2 | Blank | 5 | Blank | 2 |
| | | 318 | | 200 | | 86 | | 182 | | 314 |

FIG. 11

| | 52A | | 52B | | 52C | | 52D | | 52E | |
|---|---|---|---|---|---|---|---|---|---|---|
| NO. | SYMBOL | WEIGHT | SYMBOL | WEIGHT | SYMBOL | WEIGHT | SYMBOL | WEIGHT | SYMBOL | WEIGHT |
| 0 | 1BAR | 40 | 3BAR | 20 | 2BAR | 20 | 3BAR | 40 | 1BAR | 60 |
| 1 | Blank | 4 | Blank | 4 | Blank | 4 | Blank | 4 | Blank | 4 |
| 2 | RED7 | 25 | RED7 | 25 | RED7 | 25 | RED7 | 25 | RED7 | 25 |
| 3 | Blank | 10 | Blank | 8 | Blank | 8 | Blank | 8 | Blank | 8 |
| 4 | BLUE7 | 38 | BLUE7 | 20 | BLUE7 | 20 | BLUE7 | 20 | BLUE7 | 20 |
| 5 | Blank | 4 | Blank | 4 | Blank | 4 | Blank | 4 | Blank | 4 |
| 6 | 3BAR | 40 | 2BAR | 40 | 1BAR | 36 | 2BAR | 40 | 3BAR | 50 |
| 7 | Blank | 12 | Blank | 12 | Blank | 12 | Blank | 12 | Blank | 12 |
| 8 | BLUE7 | 36 | RED7 | 6 | RED7 | 20 | RED7 | 6 | BLUE7 | 6 |
| 9 | Blank | 10 | Blank | 6 | Blank | 10 | Blank | 6 | Blank | 6 |
| 10 | RED7 | 12 | BLUE7 | 6 | BLUE7 | 20 | BLUE7 | 16 | RED7 | 6 |
| 11 | Blank | 10 | Blank | 50 | Blank | 40 | Blank | 20 | Blank | 10 |
| 12 | BONUS | 20 | BONUS | 64 | BONUS | 84 | BONUS | 50 | BONUS | 10 |
| 13 | Blank | 15 | Blank | 50 | Blank | 40 | Blank | 20 | Blank | 10 |
| 14 | 1BAR | 34 | 1BAR | 20 | 1BAR | 16 | 2BAR | 44 | 3BAR | 84 |
| 15 | Blank | 40 | Blank | 20 | Blank | 6 | Blank | 40 | Blank | 40 |
| 16 | 2BAR | 40 | 2BAR | 40 | 3BAR | 30 | 1BAR | 40 | 2BAR | 40 |
| 17 | Blank | 1 | Blank | 1 | Blank | 1 | Blank | 1 | Blank | 1 |
| 18 | Wild1 | 1 | Wild1 | 1 | Wild1 | 1 | Wild1 | 1 | Wild1 | 1 |
| 19 | Wild2 | 1 | Wild2 | 1 | Wild2 | 1 | Wild2 | 1 | Wild2 | 1 |
| 20 | Wild3 | 1 | Wild3 | 1 | Wild3 | 1 | Wild3 | 1 | Wild3 | 1 |
| 21 | Blank | 1 | Blank | 1 | Blank | 1 | Blank | 1 | Blank | 1 |
| | | 395 | | 400 | | 400 | | 400 | | 400 |

FIG. 23

| No. | COMBINATION OF EFFECTS | | WEIGHTS | | | | |
|---|---|---|---|---|---|---|---|
| | EFFECTS BEFORE START OF SPINNING (1) | EFFECTS FROM MIDDLE UNTIL STOP OF SPINNING | Table A | Table B | Table C | Table D | Table E |
| 0 | | | 0 | 0 | 0 | 0 | 3000 |
| 1 | | LOW SPEED | 300 | 300 | 375 | 1265 | 0 |
| 2 | | HIGH SPEED | 100 | 300 | 375 | 1265 | 0 |
| 3 | | HIGH SPEED 2 | 100 | 500 | 400 | 200 | 0 |
| 4 | | HIGH SPEED AND STOP TOGETHER | 100 | 200 | 230 | 0 | 0 |
| 5 | | SHAKE 3 - REVERSE SPIN - HIGH SPEED - STOP TOGETHER | 400 | 400 | 100 | 0 | 0 |
| 6 | SHAKE 1 | - | 0 | 0 | 0 | 0 | 0 |
| 7 | SHAKE 1 | LOW SPEED | 200 | 150 | 160 | 92 | 0 |
| 8 | SHAKE 1 | HIGH SPEED | 200 | 150 | 160 | 92 | 0 |
| 9 | SHAKE 1 | HIGH SPEED 2 | 200 | 150 | 250 | 41 | 0 |
| 10 | SHAKE 1 | HIGH SPEED AND STOP TOGETHER | 200 | 150 | 150 | 0 | 0 |
| 11 | SHAKE 2 | - | 0 | 0 | 0 | 0 | 0 |
| 12 | SHAKE 2 | LOW SPEED | 300 | 175 | 200 | 20 | 0 |
| 13 | SHAKE 2 | HIGH SPEED | 300 | 175 | 200 | 20 | 0 |
| 14 | SHAKE 2 | HIGH SPEED 2 | 300 | 175 | 200 | 5 | 0 |
| 15 | SHAKE 2 | HIGH SPEED AND STOP TOGETHER | 300 | 175 | 200 | 0 | 0 |
| TOTAL | | | 3000 | 3000 | 3000 | 3000 | 3000 |

FIG. 24B
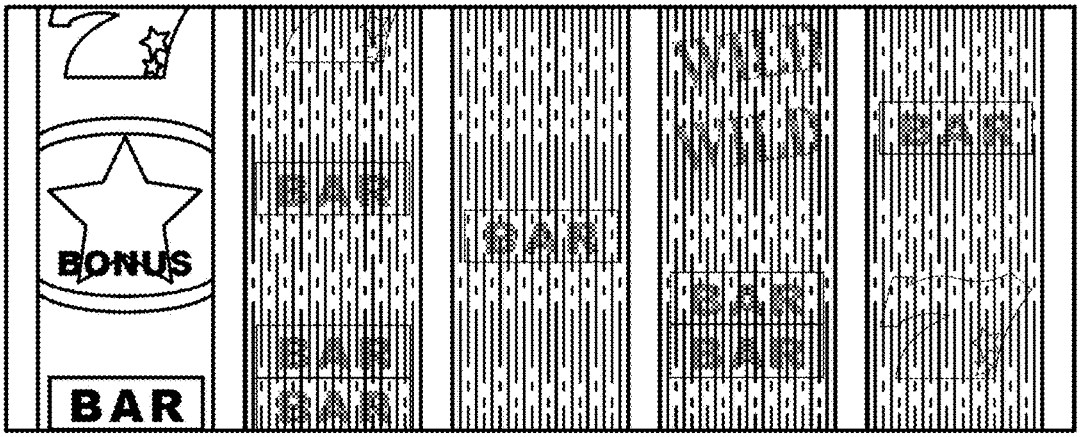

FIG. 28A
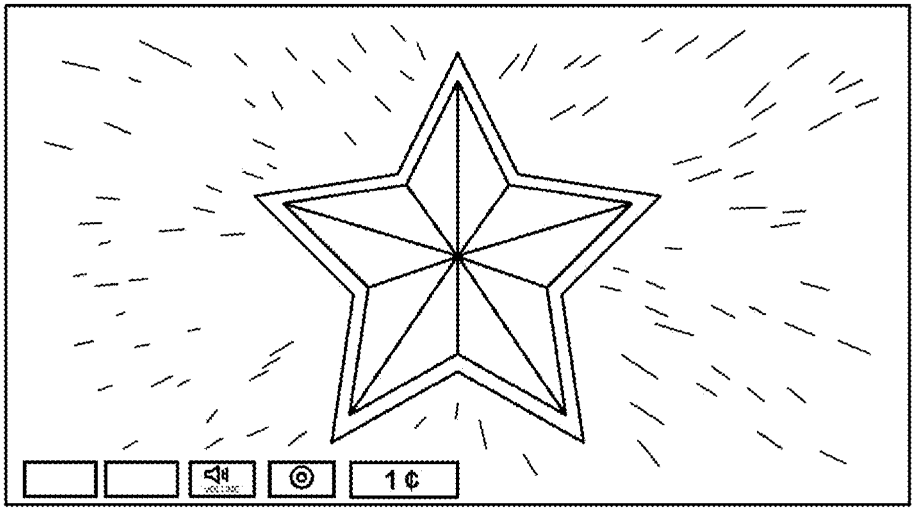
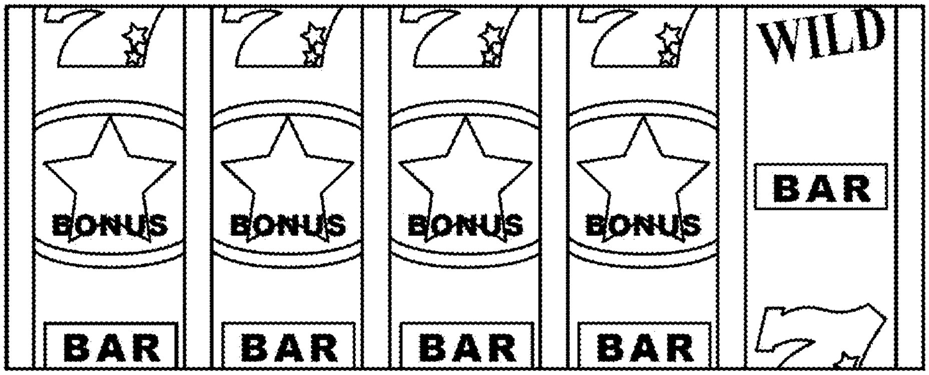

FIG. 33A
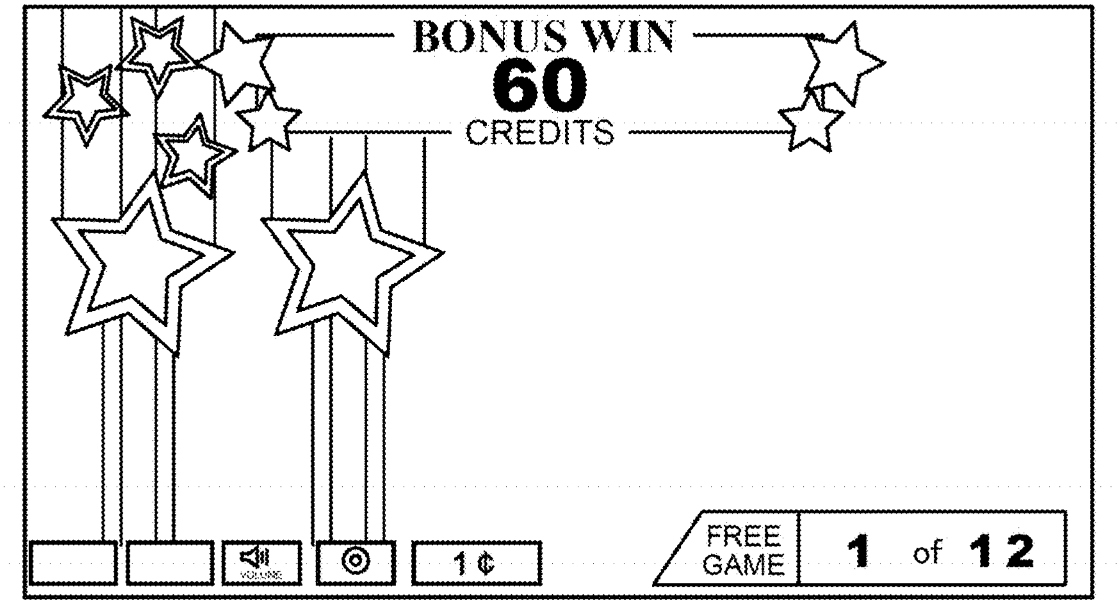
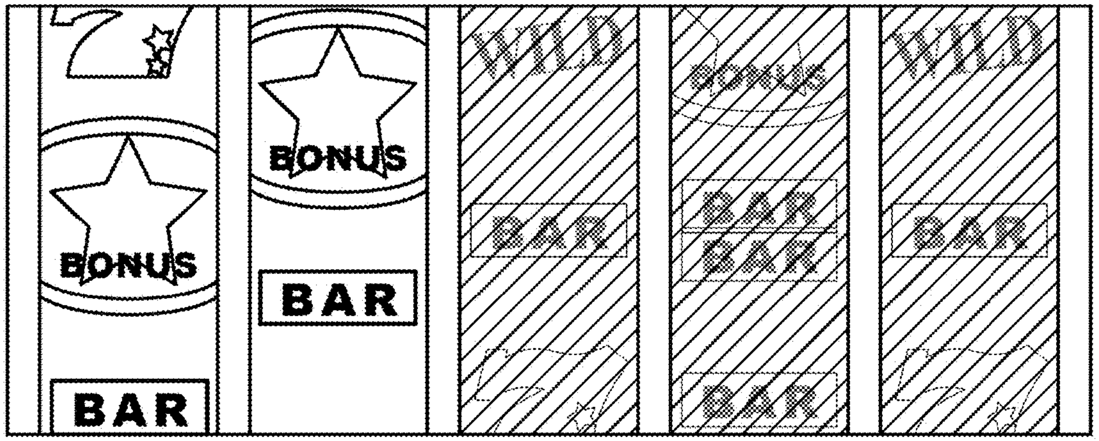

FIG. 34A
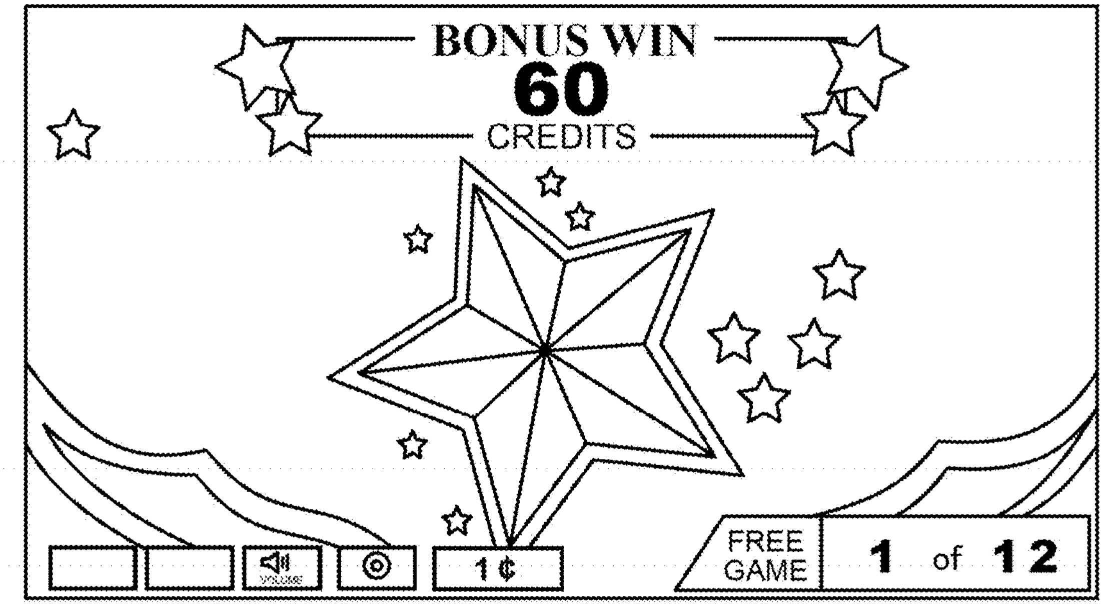
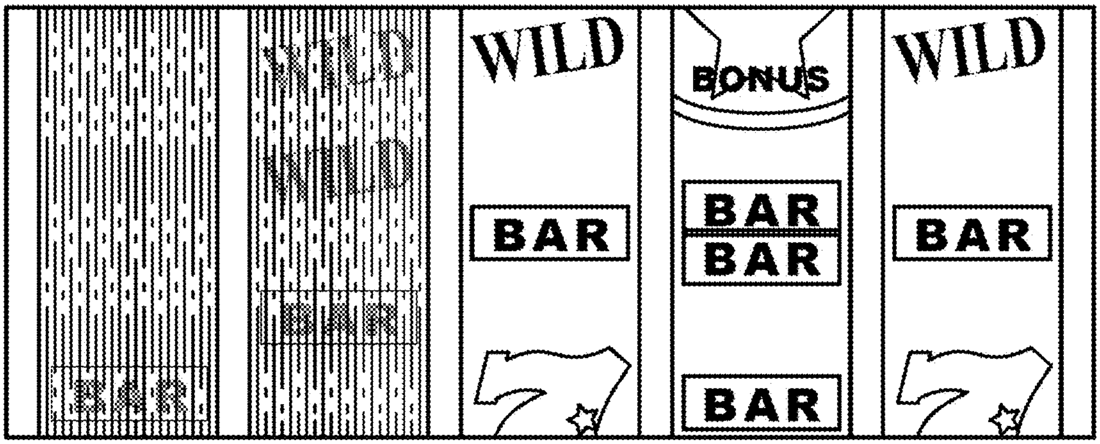

GAMING MACHINE THAT SHOWS CONSECUTIVE SYMBOLS OF SPECIFIC KIND

CROSS-REFERENCE TO RELATED APPLICATIONS

This application claims the benefit of Japanese Patent Application No. 2014-194911 filed on Sep. 25, 2014, which application is incorporated herein by reference in its entirety.

FIELD OF THE INVENTION

The present invention relates to a gaming machine that rearranges symbols.

BACKGROUND OF THE INVENTION

There exists a gaming machine that shows symbols with video reels and changes all the consecutive symbols on some of the video reels into WILDs when a predetermined condition is satisfied (for example, refer to US Patent Application Publication No. 2013/0310155). Each WILD substitutes for another kind of symbol to complete an advantageous winning pattern. Completion of a winning pattern leads to providing a predetermined payout or entering an advantageous game mode. For this reason, appearance of a WILD increases the player's expectation.

Furthermore, replacing all the consecutive symbols shown on some video reels with WILDs increases the probability of completion of multiple winning patterns; the player's expectation increases more.

This existing gaming machine displays the symbols by images; symbols can be changed easily by rewriting a specific storage area of the video RAM with the image data of WILD.

BRIEF SUMMARY OF THE INVENTION

Gaming machines configured to display symbols by images, like the foregoing existing gaming machine, can easily change a symbol to another like a WILD by rewriting image data. However, rewriting a symbol is difficult for gaming machines configured to mechanically drive real reels with motors. Accordingly, symbols cannot be changed to consecutive different symbols even if a predetermined condition is satisfied; there has been no way to eliminate the game progress from being monotonous.

The present invention has been accomplished in view of the foregoing problems and an object of the present invention is to provide a gaming machine that can change symbols when a predetermined condition is satisfied even though the gaming machine is configured to mechanically drive real reels.

The first embodiment of the present invention is a gaming machine comprising:

a symbol display device including reels to be mechanically driven to rotate; and a controller for controlling the driving of the reels.

In the gaming machine, a plurality of symbols are disposed on each of the reels;

on at least one of the reels, the plurality of symbols include first symbols and a second symbol different from the first symbol;

the first symbols are disposed consecutively on the at least one of the reels; and the controller is programmed to perform the following processing of:

(1-1) driving the reels to show a second symbol; and (1-2) driving the reels to show the consecutively disposed first symbols when a condition that the second symbol is shown is satisfied.

Even in the gaming machine that mechanically drives real reels, the reels can be controlled to show consecutive first symbols after once showing a second symbol, which increases the probability of completion of winning patterns on multiple paylines with the first symbols. Completion of winning patterns on multiple paylines results in higher payout; accordingly, the player can feel higher expectations.

The second embodiment of the present invention is the foregoing gaming machine, in which, the symbol display device has a display area where symbols are rearranged when the reels are stopped; and the first symbols and the second symbol are disposed to be spaced apart more than the display area on the at least one of the reels.

Since the reels are real, the first symbols and the second symbol must be disposed on the same reel in order to show the first symbols after showing the second symbol. Since the first symbols are apart from the second symbol by more than the display area, none of the first symbols appears in the display area when the second symbol is shown in the display area. Accordingly, the game goes on while keeping the player from knowing the existence of the first symbols even though the reel including the first symbols and the second symbol shows the second symbol in the display area.

The third embodiment of the present invention is the foregoing gaming machine, in which, the first symbols are wild symbols substitutable for other symbols; and the second symbol is a particular symbol different from the wild symbols.

Even in a gaming machine that mechanically drives real reels, the reels can be controlled to once show a particular symbol and then to show consecutive wild symbols; the substitution by other symbols increases the probability of completion of winning patterns on multiple paylines, which raises the player's expectation.

The fourth embodiment of the present invention is the foregoing gaming machine, in which, the symbol display device displays results of games with rearranged symbols;

the games include a game in base game mode and a game in feature game mode different from the base game mode; and the controller is programmed to further perform the following processing of:

(4-1) changing game mode from the base game mode to the feature game mode when a condition that the particular symbol is shown in the base game mode is satisfied; and (4-2) driving the reels to show the consecutive wild symbols when a condition that the particular symbol is shown in the feature game mode is satisfied.

In the base game mode, the particular symbol is a symbol that triggers changing the game mode to the feature game mode; in the feature game mode, the particular symbol is a symbol that triggers showing the consecutive wild symbols. For real reels, it is difficult to change the kinds and the numbers of symbols. Assigning different functions to a particular symbol enables the particular symbol to be shared between the base game mode and the feature game mode but eliminates the limitations caused by the real reels.

The fifth embodiment of the present invention is the foregoing gaming machine, in which the controller is programmed to further perform the following processing of:

(5-1) driving the reels to spin at a predetermined speed to show the particular symbol in the feature game mode; and (5-2) driving one or more reels that have shown the particular symbol to spin at a speed different from the predetermined speed to show the consecutive wild symbols.

Since the spin speeds of a reel are different between before and after appearance of a particular symbol, the time for the games can be controlled. If the time for the games in the feature game mode is shorter, the game mode returns to the base game mode sooner so that more credits are spent in the games in the base game mode to secure the benefit for the game hall. Contrarily, if the time taken for the games in the feature game mode is longer, the game mode stays in the feature game mode, so that less credits are spent in the games in the feature game mode to secure the benefit for the player.

The sixth embodiment of the present invention is the foregoing gaming machine, in which, the plurality of symbols include the wild symbols, normal symbols including the particular symbol, and blank symbols;

the normal symbols are symbols that are able to be a constituent symbol of a winning pattern;

the blank symbols are symbols that are unable to be a constituent symbol of a winning pattern; and the normal symbols are disposed alternately with blank symbols and wild symbols are disposed consecutively without a blank symbol interposed between the wild symbols on the reels.

Since the wild symbols are disposed consecutively without a blank symbol interposed therebetween, the consecutive wild symbols can increase the probability of completion of winning patterns on multiple payline by substituting for other symbols.

Advantageous Effects of Invention

The gaming machine of the present invention can change symbols when a predetermined condition is satisfied even though the gaming machine is configured to mechanically drive real reels.

These and other aspects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which:

FIG. 8 is a drawing for illustrating an example of a payline definition table;

FIG. 9 is a drawing for illustrating an example of a winning pattern and payout table;

FIG. 10 is a table for illustrating reel strips of five mech reels (symbol determination table);

FIG. 11 is a table for illustrating reel strips of five mech reels (symbol determination table);

FIG. 23 is a drawing for illustrating a reel effect lottery table;

FIG. 24B is a view for showing an image of a video display unit and five mech reels;

FIG. 28A is a view for showing an image of a video display unit and five mech reels;

FIG. 33A is a view for showing an image of a video display unit and five mech reels;

FIG. 34A is a view for showing an image of a video display unit and five mech reels;

DETAILED DESCRIPTION OF THE PREFERRED EMBODIMENT

Hereinafter, an embodiment is described based on the drawings.

<<<<Overview of Gaming Machine in Embodiment>>>>

As will be described later, appearance of a predetermined number or more (e.g., three or more) of particular symbols (e.g., BONUS symbols having a shape of star) on a symbol display device triggers a free game mode, so that the game mode is changed from a base game mode to a free game mode (see FIG. 12).

Figure 1:
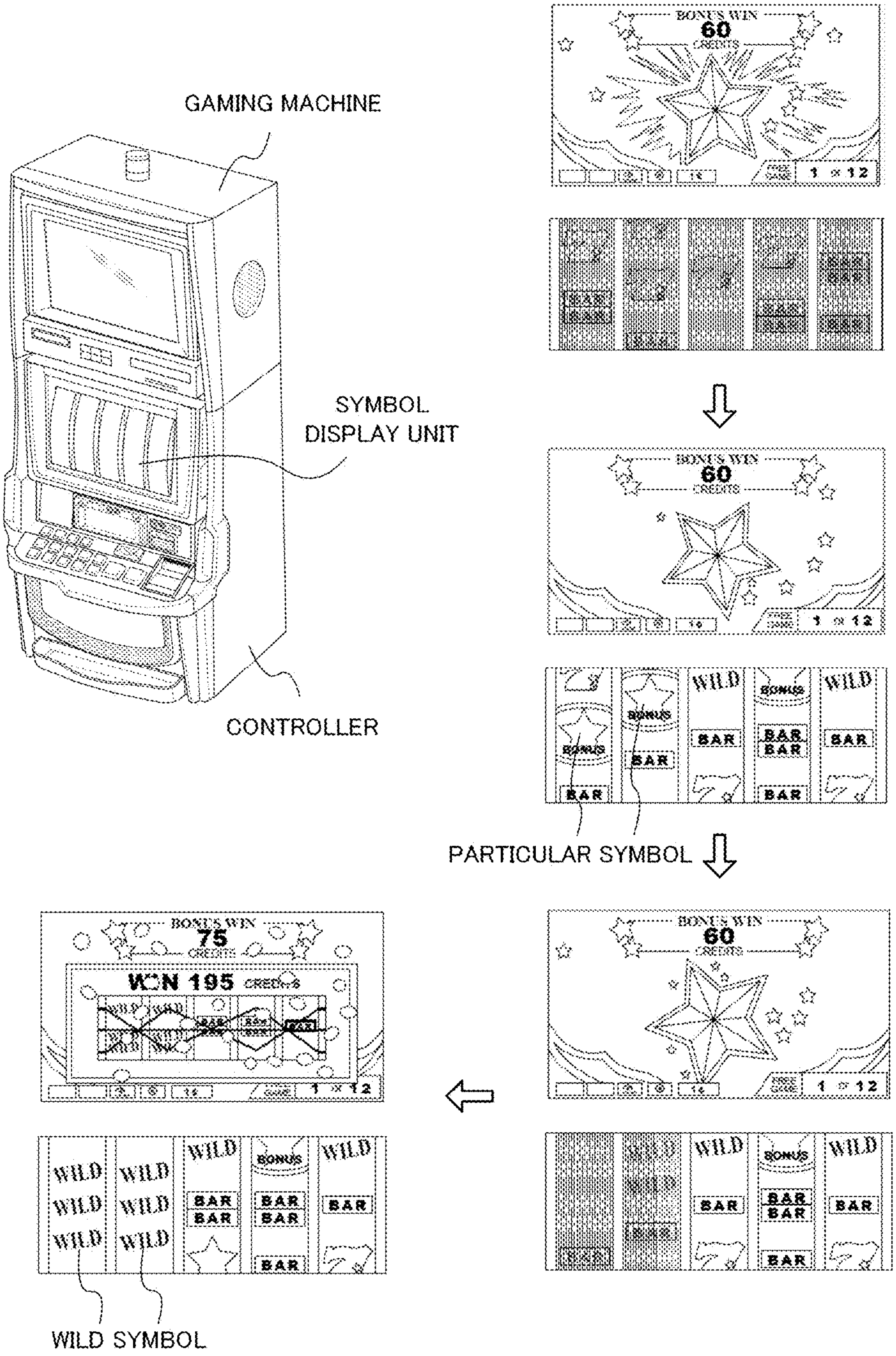
FIG. 1 is a diagram for illustrating an overview of a gaming machine according to an embodiment of the present invention.

If at least one of five mechanical reels (hereinafter, mech reels) 52A to 52E (see FIG. 3) mechanically driven by motors shows a BONUS in the free game mode, the mech reel that has shown a BONUS spins (the symbols on the mech reel are shuffled) again for a predetermined time and thereafter, three consecutive WILDs appear with the stop of the reel (see FIG. 1). The appearance of three consecutive WILDs increases the probability of completion of winning patterns on multiple paylines.

Hereinafter the overview of the gaming machine in the present embodiment is described. FIG. 1 is a diagram for illustrating the overview of the gaming machine in the present embodiment.

The gaming machine according to the present embodiment comprises:

a symbol display device (e.g., the symbol display unit 40 to be described later) including reels (e.g., the five mech reels 52A to 52E to be described later) to be mechanically driven to rotate; and a controller (e.g., the motherboard 220 to be described later) for controlling the driving of the reels.

In the gaming machine, a plurality of symbols (e.g., the symbol determination table of FIG. 10 or FIG. 11) are disposed on each of the reels;

the plurality of symbols include first symbols (e.g., WILDs to be described later) and a second symbol (e.g., a BONUS to be described later) different from the first symbols;

the first symbols are disposed consecutively on the reels (e.g., Wild1, Wild2, and Wild3 in FIG. 11 to be described later); and the controller is programmed to perform the following processing of:

(1-1) driving the reels to show a second symbol (e.g., the weights of BONUSes in the symbol determination table of FIG. 11, and FIG. 32A, which will be described later); and (1-2) driving the reels to show the consecutively disposed first symbols when a condition that the second symbol is shown (e.g., Wild1, Wild2, and Wild3 in FIG. 11, steps S2121 to S2127, and FIG. 34B, which will be described later) is satisfied.

The reels mechanically driven to rotate include a plurality of symbols physically disposed thereon. The plurality of symbols include first symbols and a second symbol different from the first symbols. The first symbols are consecutively disposed on a reel. Preferably, the plurality of first symbols are disposed on at least one of the plurality of reels. More preferably, the plurality of first symbols are disposed on each of the plurality of reels.

The controller drives the reels to show a second symbol and drives the reels to show the consecutively disposed first symbols when the condition that the second symbol is shown is satisfied. Specifically, the gaming machine drives the reels to show a second symbol on a stopped reel, to spin the reel (shuffles the symbols on the reel) showing the second symbol again, and then to stop the reel so as to show the consecutively disposed first symbols.

Even in the gaming machine that mechanically drives real reels, the reels can be controlled to show consecutive first symbols after once showing a second symbol, which increases the probability of completion of winning patterns on multiple paylines with the first symbols. Completion of winning patterns on multiple paylines results in higher payout; accordingly, the player can feel higher expectations.

In the gaming machine according to the present embodiment, the symbol display device has a display area (e.g., the display window 56 to be described later) where symbols are rearranged when the reels are stopped; and the first symbols and the second symbol are disposed to be spaced apart more than the display area (e.g., the space between the BONUS of No. 12 and the Wild1 of No. 18 in FIGS. 10 and 11 and three symbols on the top row, the middle row, and the bottom row in the display window 56, which will be described later) on the reels.

The symbol display device has a display area. Symbols are rearranged in the display area. The symbols are rearranged in the display area when the reels are stopped. The first symbols and the second symbol are disposed on the same reel. The first symbols are apart from the second symbol by more than the display area. Specifically, the first symbols and the second symbol are disposed to be apart by more than the length of the display area defined along the reel.

Since the reels are real, the first symbols and the second symbol must be disposed on the same reel in order to show the first symbols after showing the second symbol. Since the first symbols are apart from the second symbol by more than the length of the display area, none of the first symbols appears in the display area when the second symbol is shown in the display area. Accordingly, the game goes on while keeping the player from knowing the existence of the first symbols even though the reel including the first symbols and the second symbol shows the second symbol in the display area.

In the gaming machine according to the present embodiment, the first symbols are wild symbols (e.g., WILDs to be described later) substitutable for other symbols; and the second symbol is a particular symbol (e.g., a BONUS to be described later) different from the wild symbols.

Even in a gaming machine that mechanically drives real reels, the reels can be controlled to once show a particular symbol and then to show consecutive wild symbols; the substitution by other symbols increases the probability of completion of winning patterns on multiple paylines, which raises the player's expectation.

In the gaming machine according to the present embodiment, the symbol display device displays results of games with rearranged symbols;

the games include a game in base game mode and a game in feature game mode different from the base game mode; and the controller is programmed to further perform the following processing of:

(4-1) changing game mode from the base game mode to the feature game mode when a condition that the particular symbol is shown in the base game mode (e.g., steps S1325 and S1327 to be described later) is satisfied; and (4-2) driving the reels to show the consecutive wild symbols when a condition that the particular symbol is shown in the feature game mode (e.g., Wild1, Wild2, and Wild3 in FIG. 11 and steps S2121 to S2127, which will be described later) is satisfied.

Game modes include base game mode and feature game mode. When the condition that a particular symbol is shown in the base game mode is satisfied, the game mode changes from the base game mode to the feature game mode. Furthermore, when the condition that the particular symbol is shown in the feature game mode is satisfied, the reel that has shown the particular symbol is controlled to show the consecutive wild symbols.

In the base game mode, the particular symbol is a symbol that triggers changing the game mode to the feature game mode; in the feature game mode, the particular symbol is a symbol that triggers showing the consecutive wild symbols. For real reels, it is difficult to change the kinds and the numbers of symbols. Assigning different functions to a particular symbol enables the particular symbol to be shared between the base game mode and the feature game mode but eliminates the limitations caused by the real reels.

In the gaming machine according to the present embodiment, the controller is programmed to further perform the following processing of:

(5-1) driving the reels to spin at a predetermined speed to show the particular symbol in the feature game mode (e.g., step S2011 to be described later); and (5-2) driving one or more reels that have shown the particular symbol to spin at a speed different from the predetermined speed (e.g., step S2123 to be described later) to show the consecutive wild symbols (e.g., Wild1, Wild2, and Wild3 in FIG. 11 and steps S2121 to S2127, which will be described later).

Since the spin speeds of a reel are different between before and after appearance of a particular symbol, the time for the games can be controlled. If the time for the games in the feature game mode is shorter, the game mode returns to the base game mode sooner so that more credits are spent in the games in the base game mode to secure the benefit for the game hall. Contrarily, if the time taken for the games in the feature game mode is longer, the game mode stays in the feature game mode, so that less credits are spent in the games in the feature game mode to secure the benefit for the player.

In the gaming machine according to the present embodiment, the plurality of symbols include the wild symbols, normal symbols including the particular symbol, and blank symbols (e.g., the symbol determination table in FIG. 10 or 11 to be described later);

the normal symbols are symbols that are able to be a constituent symbol of a winning pattern (e.g., the winning patterns and payout table in FIG. 9 to be described later);

the blank symbols are symbols that are unable to be a constituent symbol of a winning pattern; and normal symbols are disposed alternately with blank symbols and wild symbols are disposed consecutively without a blank symbol interposed between the wild symbols on the reels (e.g., Wild1, Wild2, and Wild3 in FIG. 11 to be described later).

The plurality of symbols include wild symbols, normal symbols, and blank symbols. A wild symbol is a symbol substitutable for another symbol. A normal symbol is a symbol that does not have the function to be a substitute but can be a constituent of a winning pattern. A blank symbol is a symbol that cannot be a constituent of a winning pattern.

Normal symbols are disposed alternately with blank symbols on each reel. Wild symbols are disposed consecutively on the reel without a blank symbol being interposed. Since the wild symbols are disposed consecutively without a blank symbol being interposed, the consecutive wild symbols can increase the probability of completion of winning patterns on multiple payline by substituting for other symbols.

<<<Basic Concept>>>

A slot machine 10 is a kind of gaming machine. The present embodiment describes the slot machine 10 as an example of a gaming machine; however, the gaming machine is not limited to this and is satisfactory if the apparatus independently operates a base game mode and develops the base game mode to a different game mode such as feature game mode.

Games in the base game mode in the present embodiment are conducted in the slot machine 10. In the present embodiment, games in the base game mode are referred to as base games. The base games are slot games that rearrange a plurality of symbols each time. The base games are games conceptually distinguished from feature games.

Specifically, rearranging symbols in a slot game is performed by five mech reels 52A, 52B, 52C, 52D, and 52E (see FIG. 3) which can be rotated and stopped. The symbols to be rearranged are stopped and shown in a display window 56 of a symbol display unit 40 (see FIG. 3).

The slot games are categorized into base game mode and free game mode (feature game mode). The base game mode is a game mode to conduct unit games (base games) under the condition that some gaming medium (gaming value) is bet. Each unit game rearranges symbols in the display window 56 and provides a normal payout in accordance with the rearranged symbols. The games in the base game mode are not limited to slot games and are satisfactory if the games can be conducted in a game terminal like the slot machine 10.

When a unit game starts, five to-be stopped symbols are determined by lottery. For each of the five mech reels 52A to 52E, one to-be stopped symbol is determined. Subsequently, an arrangement of a set of symbols is released. The releasing the arrangement of symbols starts to show the symbols as being shuffled (scrolling of the symbol arrays to be described later). After a predetermined time, the to-be stopped symbols are stopped at predetermined positions. Stopping the five to-be stopped symbols rearranges another set of symbols in the display window 56. Rearranging the symbols provides the result of the unit game in the display window 56. In the present embodiment, stopping and showing symbols mean appearance of the symbols and rearranging the symbols.

The free game mode is a game mode which is different from the base game mode and offers the player more benefit than the base game mode.

Symbols are to be rearranged visibly in the display window 56; they are not limited in kind or number. Symbol is a general concept of special symbol and normal symbol. Special symbols are included in normal symbols as necessary.

For example, special symbols include wild symbols (such as WILDs to be described later) and trigger symbols (such as BONUSes to be described later). A wild symbol is a symbol that can substitute for another kind of symbol. The wild symbol is replaced with another kind of symbol to make an advantageous winning pattern. A trigger symbol is to be at least a trigger to start bonus games. The trigger symbol may have another function to increase a special symbol in the bonus games, that is, to increase a special symbol of at least either a trigger symbol or a wild symbol. Alternatively, the trigger symbol may have another function to increase bonus games in the bonus game mode.

Specifically, the term "symbol" is a generic term for a WILD (wild symbol), a RED7, a BLUE7, a 3BAR, a 2BAR, a 1BAR, a BONUS (trigger symbol), or a BLANK.

The gaming value includes coins, bills, and electrically valuable information equivalent to these. The gaming value in the present embodiment is not specifically limited and can be gaming media such as medals, tokens, electric money, and tickets. The tickets are not specifically limited and may be later-described tickets with barcodes.

Bonus games can be games in which a unit game is repeated, for example. Bonus games can be any kind of games as far as the bonus games are advantageous over games in the base game mode. If the games are advantageous for the player, or if the games are advantageous over games in the base game mode, a plurality of kinds of bonus games may be mixed. For example, bonus games may be provided in one of the conditions or in combination of the conditions that more gaming value can be acquired than in the base game mode, that gaming value can be acquired with higher probability than in the base game mode, and the like.

Bonus games may be games in a free game mode. Bonus games can be any kind of games as far as they are different from games in the base game mode. In the present embodiment, games in the free game mode can be conducted with a smaller bet of gaming value than games in the base game mode and pays gaming value in the amount in accordance with a winning pattern completed with the rearranged symbols.

Rearranging means an action of arranging symbols in the display window 56 again after releasing an arrangement of symbols. An arrangement of symbols is released by starting a unit game (slot game) and subsequently, another set of symbols are arranged again (rearranged). The rearranged symbols determine a result of the unit game to terminate the unit game. Arrangement means a state in which symbols are visible by the player in the outside.

<<<<Specific Overview of Slot Machine in Present Embodiment>>>>

An overview of a slot machine in the present embodiment is as follows. Details are described later.

The slot machine 10 has five mech reels 52A, 52B, 52C, 52D, and 52E. The five mech reels 52A to 52E are shown in a display window 56 of the symbol display unit 40. A plurality of symbols are disposed along the longitudinal direction of each of the five mech reels 52A to 52E and the plurality of symbols disposed on the five mech reels 52A to 52E are shown.

The plurality of symbols disposed on a mech reel constitute one reel strip (one symbol array). The five mech reels 52A to 52E provide five reel strips (five symbol arrays). The present embodiment treats the reel strip and the symbol array as the same thing. The five reel strips and some reel strips are generally referred to as reel strips. Scroll lines of the symbol arrays are formed by showing the mech reels 52A to 52E being spun or stopped.

The present embodiment provides two game modes: base game mode and free game mode. As will be described later, FIG. 10 shows the symbols on the five mech reels 52A to 52E and their weights to be used in the base game mode. FIG. 11 shows the symbols on the five mech reels 52A to 52E and their weights to be used in the free game mode. Between the base game mode and the free game mode, the symbols are the same but the weights are different.

Thirty paylines are formed in the display window 56 of the slot machine 10. The thirty paylines do not depend on the bet count and are fixed. That is to say, the thirty paylines are always enabled in each unit game. Accordingly, even if the bet per line is 1, the total bet count is 30; the gaming media corresponding to the bet count are spent.

For example, when the bet per line is 1, the total bet count is 30. When the bet per line is 2, the total bet count is 60. When the bet per line is 3, the total bet count is 90. When the bet per line is 5, the total bet count is 150. When the bet per line is 10, the total bet count is 300.

The slot machine 10 in the present embodiment has the following kinds of symbols: WILD, RED7, BLUE7, 3BAR, 2BAR, 1BAR, BONUS, and BLANK.

The WILD is a kind of symbol to be replaced with another kind of symbol in identifying a winning pattern completed along a payline. To make an advantageous winning pattern, a WILD is replaced with another kind of symbol in identifying a winning pattern.

The BONUS is a scatter symbol. Independently from the paylines, when a predetermined number, for example three, of BONUSes are determined to appear in the display window 56 in symbol lottery processing, a winning pattern is completed. For example, when one BONUS on the mech reel 52A, one BONUS on the mech reel 52B, and one BONUS on the mech reel 52D are determined to appear, a winning pattern is completed.

Completion of a winning pattern of BONUSes triggers a free game mode. Winning patterns of BONUSes are completed only in the base game mode and are not completed in the free game mode.

The symbols in the present embodiment include BLANK (blank symbol). The BLANK is a kind of symbol that will not be a constituent of a winning pattern. Accordingly, when a plurality of BLANKs are arranged along a payline, they do not function as normal symbols to form a winning pattern. The BLANK does not function as a scatter symbol, either; even if a plurality of BLANKs appear independently from a payline, they do not form a winning pattern.

A BLANK disposed on a mech reel functions as a symbol for controlling the stop position of the mech reel within the display window 56. A BLANK is a symbol for stop control of a mech reel; as described above, the BLANK is ignored in winning pattern identification even if it is shown (is rearranged) in the display window 56.

In the present embodiment, BLANKs do not include any picture or mark, making the player see that the BLANKs do not form a winning pattern. For example, the BLANKs are preferred to be in a single color, but to include areas that can be recognized as a single-colored area because, even if some decorative pattern or picture is provided therein, most of the area is in a single color or otherwise the color of the pattern or picture is pale.

<Free Game Mode>

Appearance of three or more BONUSes in the display window 56 in a base game mode triggers a free game mode (see FIG. 9).

At the start of a free game mode, seven, twelve, or fifty unit games are provided. Specifically, if three BONUSes trigger the free game mode, the maximum number of unit games in the free game mode is determined to be seven. If four BONUSes trigger the free game mode, the maximum number of unit games in the free game mode is determined to be twelve. If five BONUSes trigger the free game mode, the maximum number of unit games in the free game mode is determined to be fifty.

The bet count in the free game mode is the same as the one when the free game mode is triggered. The free game mode executes symbol lottery processing with weights different from those in the base game mode to determine five to-be stopped symbols.

If one or more of the BONUSes on the five mech reels 52A to 52E appear in the display window 56 in the free game mode, the mech reels 52 showing the BONUSes start spinning again. After a predetermined time, the mech reels 52 stop; then, three consecutive WILDs appear in the display window 56.

In the present embodiment, appearance of three or more BONUSes in the free game mode does not retrigger the free game mode.

<<<Overall Game System>>>

Described hereinafter is a case where the slot machine 10 is taken as an example of the gaming machine according to an embodiment of the present invention.

<<Game System>>

Figure 2:
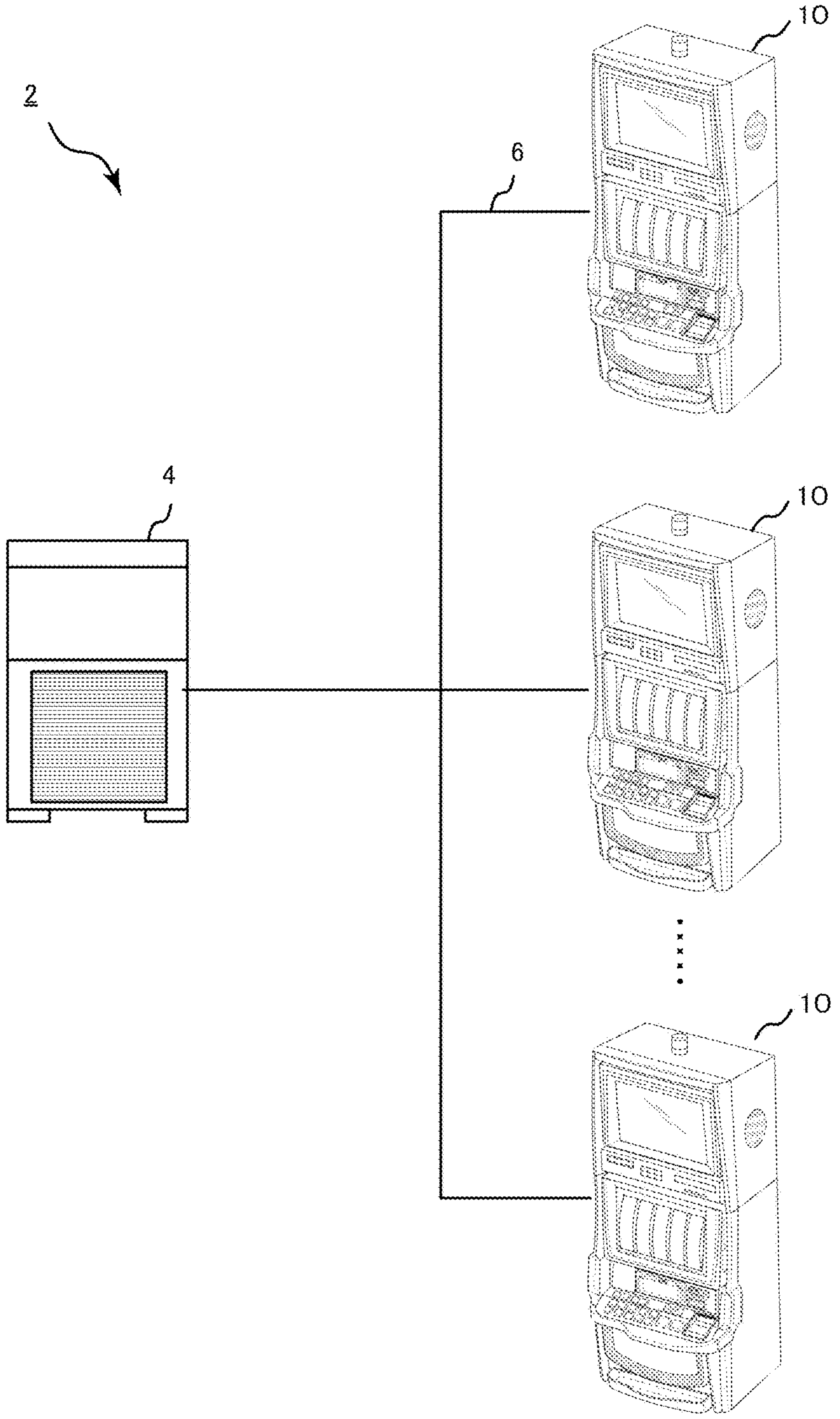
FIG. 2 is a diagram for illustrating a game system including a slot machine.

FIG. 2 is a diagram for illustrating a game system including the slot machine 10.

The game system 2 includes a plurality of slot machines 10 and an external control apparatus 4 connected with the slot machines 10 via a communication line 6.

The external control apparatus 4 controls the slot machines 10. In this embodiment, the external control apparatus 4 is a so-called hall server installed in a game hall having the slot machines 10. Each slot machine 10 has a unique identification number; the external control apparatus 4 identifies the source of data sent from a slot machine 10 with the identification number. In sending data to a slot machine 10, the external control apparatus 4 specifies the destination with the identification number.

The game system 2 may be constructed in a single game hall providing various games, such as a casino, or may be constructed among a plurality of game halls. In the case of a single game hall, the game system 2 may be constructed on each floor or in each section. The communication line 6 may be either wired or wireless, and either a private line or a switched line.

<Stand-Alone Progressive Jackpot>

Upon winning a jackpot, each of the slot machines 10 releases a stand-alone progressive jackpot. The stand-alone progressive jackpot is a feature that pays out from a jackpot amount, which is an accumulation of a part of the coins used by players in a slot machine 10, upon winning a jackpot. Unlike the later-described link progressive jackpot, the jackpot amount to be paid out is pooled in a slot machine 10, independently from the other slot machines 10. This means that a part of the coins used by the same player is paid out as a jackpot prize but the coins pooled in the other slot machines 10 by the other players as a jackpot amount are not to be paid out.

<Link Progressive Jackpot>

The game system 2 can also offer a shared game called a link progressive jackpot to be participated by a plurality of slot machines 10. In the shared game, the link progressive jackpot is a feature that pays out from a jackpot amount, which is an accumulation of parts of coins used by players in the slot machines 10. The game system 2 may pay out a jackpot amount to the player of the slot machine 10 that has satisfied requirements to release the link progressive jackpot. For example, the link progressive jackpot is released as follows.

The game system 2 releases the link progressive jackpot when a combination of symbols for a jackpot trigger appears in one of the slot machines 10.

Each slot machine 10 calculates an amount (contribution) to be pooled to the jackpot amount in each unit game and sends it to the external control apparatus 4. The external control apparatus 4 accumulates the amounts to be pooled sent from the slot machines 10 in the jackpot amount. The game system 2 releases the link progressive jackpot when specified symbols are aligned on a payline. Alternatively, the game system 2 may release the link progressive jackpot when an average of the accumulations of the slot machines 10 reaches a predetermined amount. Still alternatively, the game system 2 may release the link progressive jackpot when the total amount of the accumulations of all the slot machines 10 reaches a predetermined amount.

<<Configuration of Slot Machine 10>>

Figure 3:
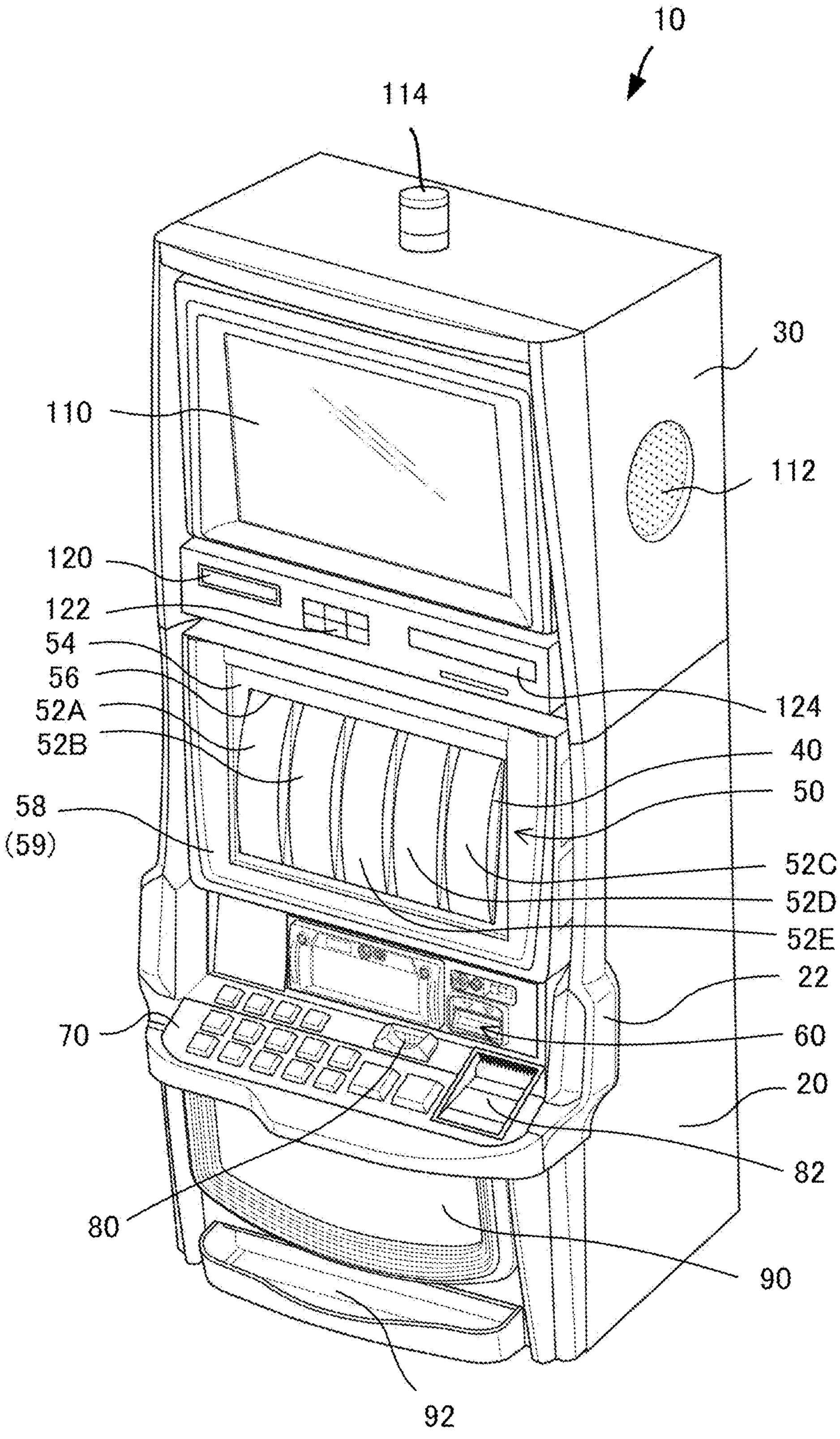
FIG. 3 is a diagram for illustrating an overall configuration of the slot machine.

FIG. 3 illustrates an overall configuration of a slot machine 10 according to the present embodiment.

The slot machine 10 accepts coins, bills, and electronic information equivalent to these as gaming media. The slot machine 10 also accepts credits stored in barcode tickets or IC cards as gaming media. The gaming media are not limited to the foregoing, but other kinds of media also can be used.

The slot machine 10 shown in FIG. 3 includes a cabinet 20, a top box 30 placed on the cabinet 20, and a main door 22 mounted on the front of the cabinet 20.

A symbol display unit 40 including a reel assembly 50 is provided on the main door 22. In this embodiment, the reel assembly 50 includes five mechanical (mech) reels 52A, 52B, 52C, 52D, and 52E. Each of the mech reels 52A to 52E has a drum with a plurality kinds of symbols disposed on its outer circumferential surface. The symbol display unit 40 includes a reel cover 54 attached to the front of the reel assembly 50 and having a display window 56. The reel cover 54 is provided outside so that the player can see a part of the five mech reels 52A to 52E. The reel cover 54 is provided on a display panel 58. The reel cover 54 is preferably made of a transparent liquid crystal panel. The symbol display unit 40 includes a touch panel 59 to detect the player's touch input.

When the five mech reels 52A to 52E are still, three of the symbols on each of the five meth reels 52A to 52E can be seen in the display window 56. In this state, a symbol matrix of three rows by five columns is formed in the display window 56. In the display window 56, one or more lines are prepared as paylines for determining whether a winning pattern is completed. In this embodiment, thirty paylines are prepared (see FIG. 8).

Each time a unit game is performed, the five mech reels 52A to 52E with symbols spin at a predetermined speed and then stop to rearrange the symbols, showing a part of the symbols in the display window 56. The rearranged symbols in the display window 56 determine the result of the unit game. A benefit associated with the result of the unit game is given to the player. For example, if the rearranged symbols make some winning pattern along one of the paylines, payout in the amount associated with the completed winning pattern is given to the player.

The symbols include so-called scatter symbols. The scatter symbols are to determine whether a winning pattern is completed depending on the number of scatter symbols included in the rearranged symbols, regardless of the paylines. The prizes include providing payout and entering bonus games (free games). In the case of payout, the amount of payout can be increased with the number of scatter symbols in the rearranged symbols. In this embodiment, the scatter symbols are BONUSes.

The rearranged symbols determine the game mode of the subsequent unit games. The present embodiment provides base game mode and free game mode for game modes, which will be described in detail in the following description. In each of the base game mode and the free game mode in the present embodiment, at least one unit game is performed.

A unit game in the base game mode is defined as a game in a period from the start of credit processing for starting the game until the end of closing the game, such as paying out in accordance with the game result of rearranged symbols in the display window 56 after the five mech reels 52A to 52E are stopped. Alternatively, the start of a game in the base game mode can be defined to be the time an operation related to the start of a game, such as a bet operation or an operation of the START button 79 (see FIG. 4), is performed by a player.

In the base game mode and the free game mode, a game result is determined based on the rearranged symbols. Accordingly, the processing in accordance with a game result determined based on the rearranged symbols can be defined as game closing processing. For example, in the case where a winning pattern is completed, when payout in the amount associated with the winning pattern is made can be defined as the end of the game. The time of determination to enter a bonus game such as a free game may also be defined as the end of the game.

The display panel 58 on the reel cover 54 indicates an amount of bet and an amount of credit in a specific area. The amount of credit means the number of the player's coins deposited in the slot machine 10. The amount of payout means the number of credits to be given to the player when a winning pattern is completed.

In this embodiment, the slot machine 10 employs five mech reels 52A to 52E. Instead of the mechanical reels, video reels or a combination of mechanical reels and video reels can be used.

Below the symbol display unit 40, an IC card reader 60 is provided. The IC card reader 60 accepts an IC card. The IC card stores specific data such as identification information on the player or game log data of the games previously played by the player. The IC card is able to store data equivalent to coins, bills, or credit owned by the player. The IC card reader 60 reads and writes an IC card inserted therein. Preferably, the IC card reader 60 has a liquid crystal display for indicating the data read from the IC card.

In front of the lower end of the IC card reader 60, a control panel 70 is provided. On the control panel 70, buttons, a coin entry 80, and a bill entry 82 are provided.

Figure 4:
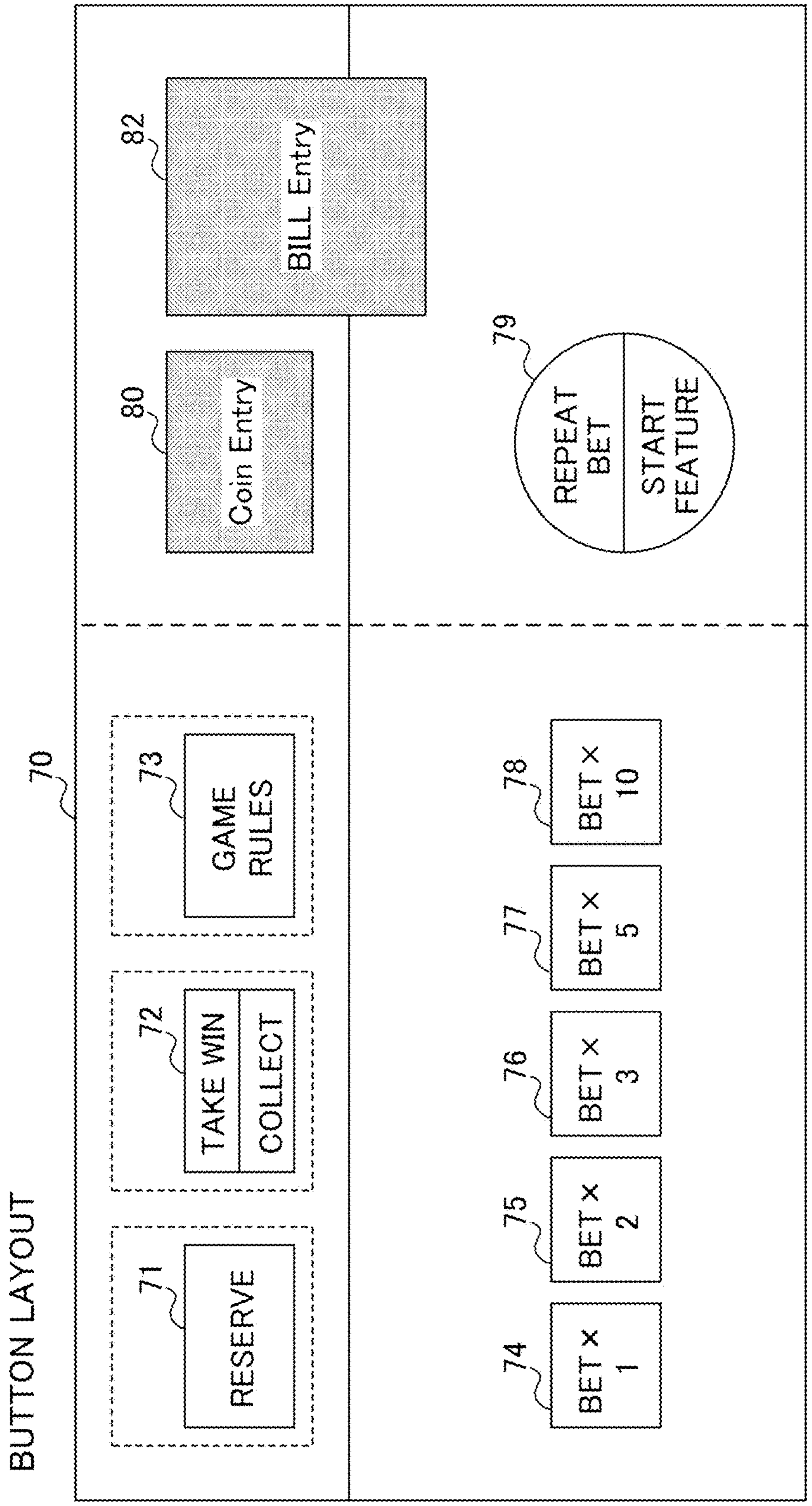
FIG. 4 is a diagram for schematically illustrating a layout of buttons on a control panel of the slot machine.

FIG. 4 is a diagram for schematically illustrating a layout of the buttons on the control panel of the slot machine 10 illustrated in FIG. 3. As illustrated in FIG. 4, a RESERVE button 71, a COLLECT button 72, and a GAME RULES button 73 are provided on the upper left of the control panel 70.

On the lower left of the control panel 70, a 1-BET button 74, a 2-BET button 75, a 3-BET button 76, a 5-BET button 77, and a 10-BET button 78 are provided. Further, a START button 79 is provided on the lower middle of the control panel 70. The coin entry 80 is provided on the upper middle of the control panel; the bill entry 82 is provided on the right of the control panel 70.

The RESERVE button 71 is used when the player leaves the machine for a minute or wants to ask a staff of the game hall for exchange. The RESERVE button 71 is also used to store the remaining credit to the IC card inserted in the IC card reader 60. The COLLECT button 72 is used to instruct the slot machine 10 to discharge the credited coins to a coin tray 92. If the player is unfamiliar with the rules of the game or the operation of the machine, the GAME RULES button 73 is used. In response to a press of the GAME RULES button 73, a variety of help information comes up on the video display unit 110.

The BET buttons 74 to 78 are used to set a bet. Each time the player presses the 1-BET button 74, one credit is bet on each active payline from the player's current credit. If the player presses the 2-BET button 75, two credits are bet on each active payline to start a unit game. If the player presses the 3-BET button 76, three credits are bet on each active payline to start a unit game. If the player presses the 5-BET button 77, five credits are bet on each active payline to start a unit game. If the player presses the 10-BET button 78, ten credits are bet on each active payline to start a unit game. The START button 79 (so-called spin button) is used to instruct the five mech reels 52A to 52E to start spinning under the bet condition determined before.

The slot machine 10 in the present embodiment can change the bet pattern. There are four bet patterns: the first bet pattern is "1", "2", "3", "4", and "5"; the second bet pattern is "1", "2", "3", "5", and "10"; the third bet pattern is "1", "2", "5", "10", and "15"; and the fourth bet pattern is "1", "2", "5", "10", and "20".

In the slot machine 10 in the present embodiment, the second bet pattern is set to a default. The bet pattern can be selected by an operation of a hall staff of the game hall such as a casino. Alternatively, the bet pattern may be selected by an operation of the player to reflect the player's intention.

In the case where the first bet pattern is selected, an operation of the 1-BET button 74 results in a bet of "1"; an operation of the 2-BET button 75 results in a bet of "2"; an operation of the 3-BET button 76 results in a bet of "3"; an operation of the 5-BET button 77 results in a bet of "4"; and an operation of the 10-BET button 78 results in a bet of "5".

In the case where the second bet pattern is selected, an operation of the 1-BET button 74 results in a bet of "1"; an operation of the 2-BET button 75 results in a bet of "2"; an operation of the 3-BET button 76 results in a bet of "3"; an operation of the 5-BET button 77 results in a bet of "5"; and an operation of the 10-BET button 78 results in a bet of "10".

In the case where the third bet pattern is selected, an operation of the 1-BET button 74 results in a bet of "1"; an operation of the 2-BET button 75 results in a bet of "2"; an operation of the 3-BET button 76 results in a bet of "5"; an operation of the 5-BET button 77 results in a bet of "10"; and an operation of the 10-BET button 78 results in a bet of "15".

In the case where the fourth bet pattern is selected, an operation of the 1-BET button 74 results in a bet of "1"; an operation of the 2-BET button 75 results in a bet of "2"; an operation of the 3-BET button 76 results in a bet of "5"; an operation of the 5-BET button 77 results in a bet of "10"; and an operation of the 10-BET button 78 results in a bet of "20".

When the coin entry 80 receives coins, the coins are guided to the inside of the cabinet 20. When the bill entry 82 receives a bill, it determines whether the inserted bill is genuine and accepts it into the cabinet 20 only if it is genuine.

On the lower front of the main door 22 and below the control panel 70, a bottom glass 90 and a coin tray 92 are provided. On the bottom glass 90, an illustration of a character of the slot machine 10 may be printed. The coin tray 92 receives coins discharged from the cabinet 20.

As shown in FIG. 3, a video display unit 110 including a liquid crystal panel is provided on the front of the top box 30. The video display unit 110 produces presentation effects of video for increasing the fun of the game. The video display unit 110 also shows information such as rules of the game and operation instructions. Speakers 112 and a lamp 114 are respectively provided on the sides and the top of the top box 30. The slot machine 10 increases the fun of the game by producing presentation effects of audio or flashes of light from the speakers 112 and the lamp 114.

Below the video display unit 110, a ticket printer 120, a keypad 122, and a data display 124 are provided.

The ticket printer 120 prints a barcode including credit data, a date, a time, and an ID number of the slot machine 10 on a ticket and ejects the ticket as a barcode ticket. The player can exchange the barcode ticket with money or other thing at a predetermined place in the game hall (for example, a cashier in a casino).

The keypad 122 has a plurality of keys. The player operates the keys to enter instructions about issuance of a barcode ticket. The data display 124 having a vacuum fluorescent display or an LED shows data entered by the player through the keypad 122.

<<<Electric Configuration of Slot Machine>>>

Figure 5:
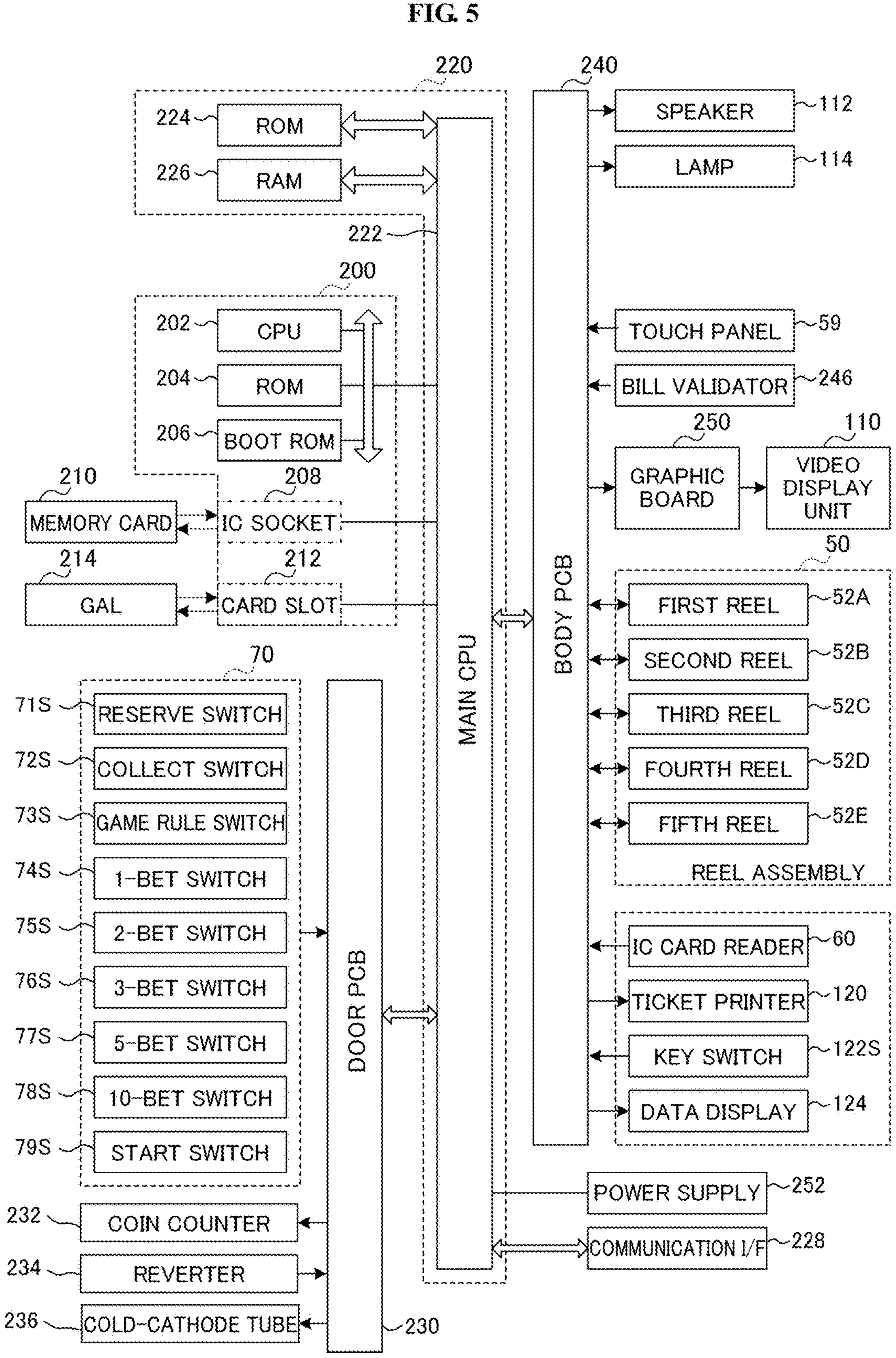
FIG. 5 is an electric block diagram of the slot machine.

FIG. 5 is an electric block diagram of the slot machine 10 shown in FIG. 3. The slot machine 10 includes a game board 200, a mother board 220, a door PCB 230, and a body PCB 240.

The game board 200 includes a CPU 202, a ROM 204 accessible from the CPU 202 via an internal bus, and a boot ROM 206 accessible from the CPU 202 via an internal bus. The game board 200 further includes an IC socket 208 to accommodate and communicate with a memory card 210, and a card slot 212 provided for generic array logic (GAL) 214.

The memory card 210 includes a non-volatile memory and holds a game program and a game system program.

The IC socket 208 is structured so that a memory card 210 is removable. The IC socket 208 is connected with the mother board 220 via an IDE bus. The game executed in the slot machine 10 can be changed by replacing the memory card 210 with another card. The game executed in the slot machine 10 can also be changed by removing the memory card 210 from the IC socket 208, rewriting a different program to the memory card 210, and inserting the memory card 210 again to the IC socket 208.

The GAL 214 is a kind of programmable logic device (PLD) having a fixed OR array structure and has multiple input ports and output ports. When the GAL 214 receives specific data via an input port, it outputs data corresponding to the input data via an output port.

The card slot 212 is structured so that the GAL 214 can be inserted to or removed from the card slot 212, and is connected with the mother board 220 via a PCI bus.

The CPU 202, the ROM 204, and the boot ROM 206 interconnected via an internal bus are connected with the mother board 220 via the PCI bus. The PCI bus enables signal transmission between the mother board 220 and the game board 200 and supply of power from the mother board 220 to the game board 200.

The ROM 204 stores programs. The boot ROM 206 stores a preliminary authentication program and a boot code to be used by the CPU 202 to start the preliminary authentication program. The authentication program is a tamper check program for verifying whether the game program and the game system program are authentic. The preliminary authentication program is a program for verifying whether the authentication program is authentic. The authentication program and the preliminary authentication program are written so as to perform verification that the target program is not tampered.

The mother board 220 is a commonly available main board to execute a game program and a game system program. The mother board 220 includes a main CPU 222, a ROM 224, a RAM 226, and a communication interface 228.

The ROM 224 is a memory device to store programs to be executed by the main CPU 222. The ROM 224 non-transitorily stores programs, for example BIOS, with other data. The ROM 224 can be a flash memory. When the BIOS program is executed by the main CPU 222, it initializes the peripheral devices. The BIOS program loads a game program and a game system program held in the memory card 210 via the game board 200. The ROM 224 may be rewritable. Alternatively, the ROM 224 may be write-protected.

The RAM 226 stores data and programs to be used during the operation of the main CPU 222. For example, to load a game program, a game system program, or an authentication program, the RAM 226 can store the program. The RAM 226 has working space to execute such a program. Specifically, the working space stores the amount of bet, the amount of payout, and the amount of credit and holds them during execution of the game. The RAM 226 also holds tables for defining symbols, symbol codes, winning patterns, and their probabilities during the game. Furthermore, the RAM 226 stores a symbol code determination table. The symbol code determination table holds mapping information between symbol codes and random numbers to be used to determine a symbol based on a random number. Still further, the RAM 226 holds a mode flag together with a game counter. The mode flag indicates the game mode. The game counter indicates a count value representing the number of unit games executed in a free game mode or the number of unit games remaining in the free game mode.

The RAM 226 also stores count values of a plurality of counters. The plurality of counters include a bet counter, a payout counter, a credit counter, and a free game mode game counter for counting the unit games in a free game mode. Some of the count values may be held in the internal register of the main CPU 222.

The main CPU 222 communicates with an external controller via the communication interface 228. For example, the external controller may be a server (not-shown) connected via a communication channel.

The mother board 220 is connected with the door PCB 230 and the body PCB 240. The mother board 220 can communicate with the door PCB 230 and the body PCB 240 using USB. The mother board 220 is also connected with a power supply 252. The main CPU 222 of the mother board 220 activates and operates using the power supplied from the power supply 252. The mother board 220 supplies a part of the power to the game board 200 via the PCI bus to activate the CPU 202. The door PCB 230 and the body PCB 240 are connected with input devices. Examples of the input devices are switches, sensors, and peripheral devices whose operation is controlled by the main CPU 222. The door PCB 230 is connected with a control panel 70, a coin counter 232, a reverter 234, and a cold-cathode tube 236.

The control panel 70 includes a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch 79S, which are respectively associated with the buttons 71 to 79. The switches 71S to 79S detect that the buttons 71 to 79 are pressed by the player and output signals to the main CPU 222.

The coin counter 232 and the reverter 234 are installed in the coin entry 80. The coin counter 232 determines whether each coin put in the coin entry 80 is genuine from the characteristics of the coin, such as the material and the shape of the coin. If it detects a genuine coin, the coin counter outputs a signal to the main CPU 222. A coin determined to be fake is ejected to the coin tray 92. The reverter 234 operates in accordance with a control signal from the main CPU 222. The reverter 234 supplies the coin determined to be genuine by the coin counter 232 to a cash box (not shown).

The cold-cathode tube 236 is installed behind the video display unit 110. The cold-cathode tube 236 functions as a backlight and lights up in accordance with a control signal from the main CPU 222.

The body PCB 240 is connected with the speakers 112, the lamp 114, the touch panel 59, the bill validator 246, the reel assembly 50, the IC card reader 60, the graphic board 250, the ticket printer 120, the key switch 122S, and the data display 124.

The lamp 114 is turned on and off in accordance with a control signal from the main CPU 222. The speakers 112 output sound such as BGM in accordance with a control signal from the main CPU 222.

The touch panel 59 detects a position touched by the player and supplies a positional detection signal corresponding to the detected point to the main CPU 222. The bill validator 246 provided at the bill entry 82 supplies a bill detection signal corresponding to the amount of a detected genuine bill to the main CPU 222 upon detection.

The graphic board 250 controls the video display unit 110 and the display panel 58 of the symbol display unit 40 in accordance with control signals from the main CPU 222. The graphic board 250 includes a video display processor (VDP) for creating video data and a video RAM for storing video data on a temporal basis. The video data is created by a game program stored in the RAM 226.

The IC card reader 60 retrieves data held in an IC card inserted in the IC socket 208 and supplies the retrieved data to the main CPU 222. The IC card reader 60 also writes data supplied to the main CPU 222 to the ID card.

The ticket printer 120 prints a barcode including information such as the amount of credit stored in the RAM 226, time and date, and the identification number of the slot machine 10 on a ticket in accordance with a control signal from the main CPU 222 to output a barcode ticket.

The key switch 122S is provided behind the keypad 122 and outputs a key detection signal to the main CPU 222 when the keypad 122 is pressed by the player.

The data display 124 shows information related to information entered with the keypad 122 in accordance with a control signal from the main CPU 222.

<<Electric Circuitry of Reel Assembly>>

Figure 6:
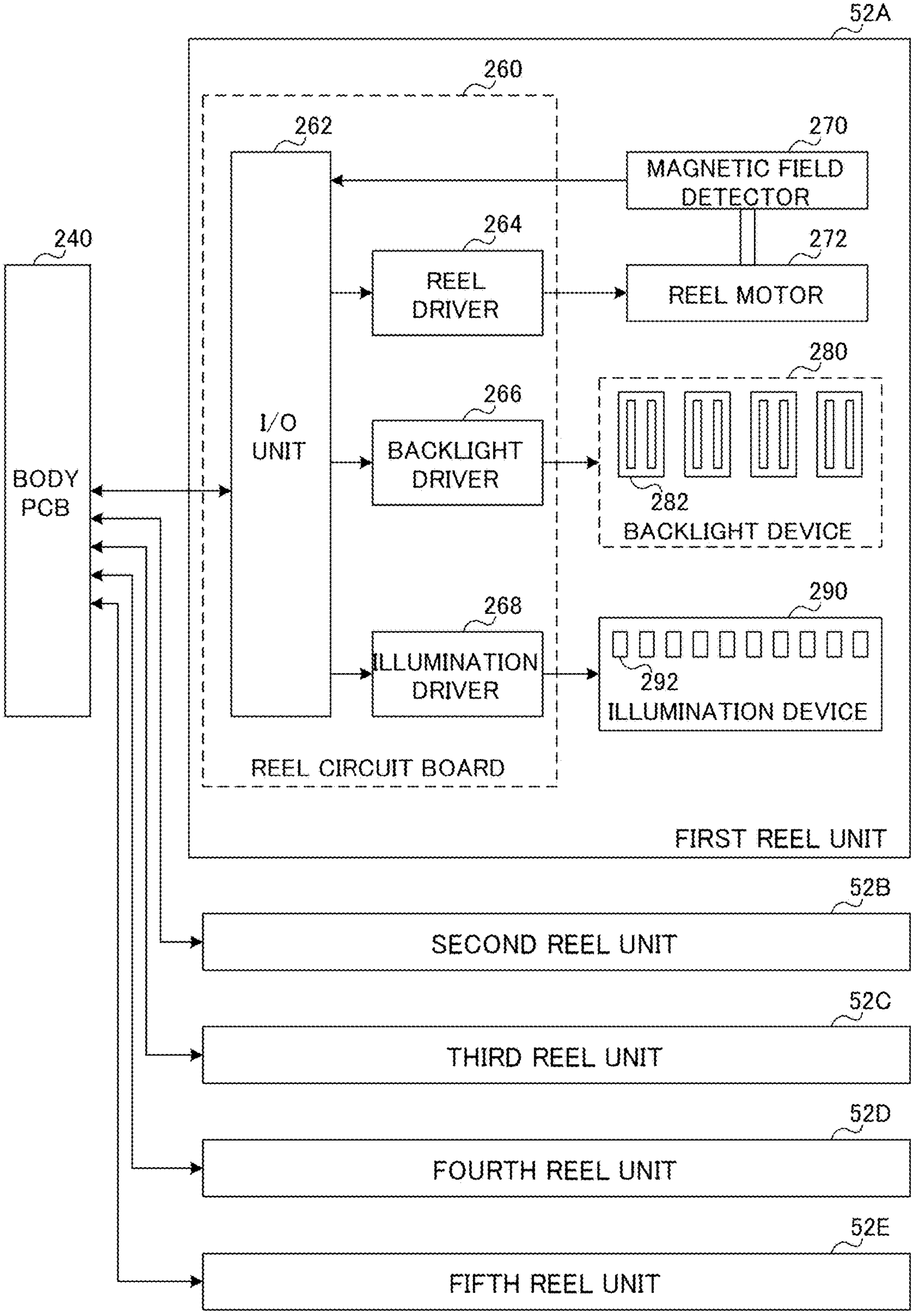
FIG. 6 is a block diagram for illustrating electric circuitry of a reel assembly.

FIG. 6 is a block diagram for illustrating electric circuitry of the reel assembly.

As shown in FIG. 6, the body PCB 240 is electrically connected with the reel assembly 50. As mentioned above, the reel assembly 50 includes five mech reels 52A to 52E. Each of the five mech reels 52A to 52E is provided on a reel circuit board 260. The reel circuit board 260 includes an input/output (I/O) unit 262 which is able to communicate with the body PCB 240. The reel circuit board 260 also includes a reel driver 264, a backlight driver 266, and an illumination driver 268 which are connected with the I/O unit 262.

The I/O unit 262 is connected with a magnetic field detector 270. The magnetic field detector 270 includes a magnetic sensor for sensing the intensity of magnetic field and outputting a magnetism detection signal proportional to the intensity of the magnetic field and a sensor fixer for fixing the magnetic sensor to a predetermined position. The magnetic sensor senses the intensity of magnetic field generated by a magnet. The magnet is attached to a rotary shaft of a reel motor 272 and rotates with the mech reel 52A.

The reel driver 264 supplies electric power to the reel motor 272. The backlight driver 266 supplies electric power to lights 282 of a backlight device 280 separately. The illumination driver 268 supplies electric power to lights 292 of an illumination device 290 separately.

The remaining four mech reels 52B and 52E have the same configuration as the first reel 52A; the detailed explanation thereof is omitted.

<<Processing of Game Program>>

Figure 7:
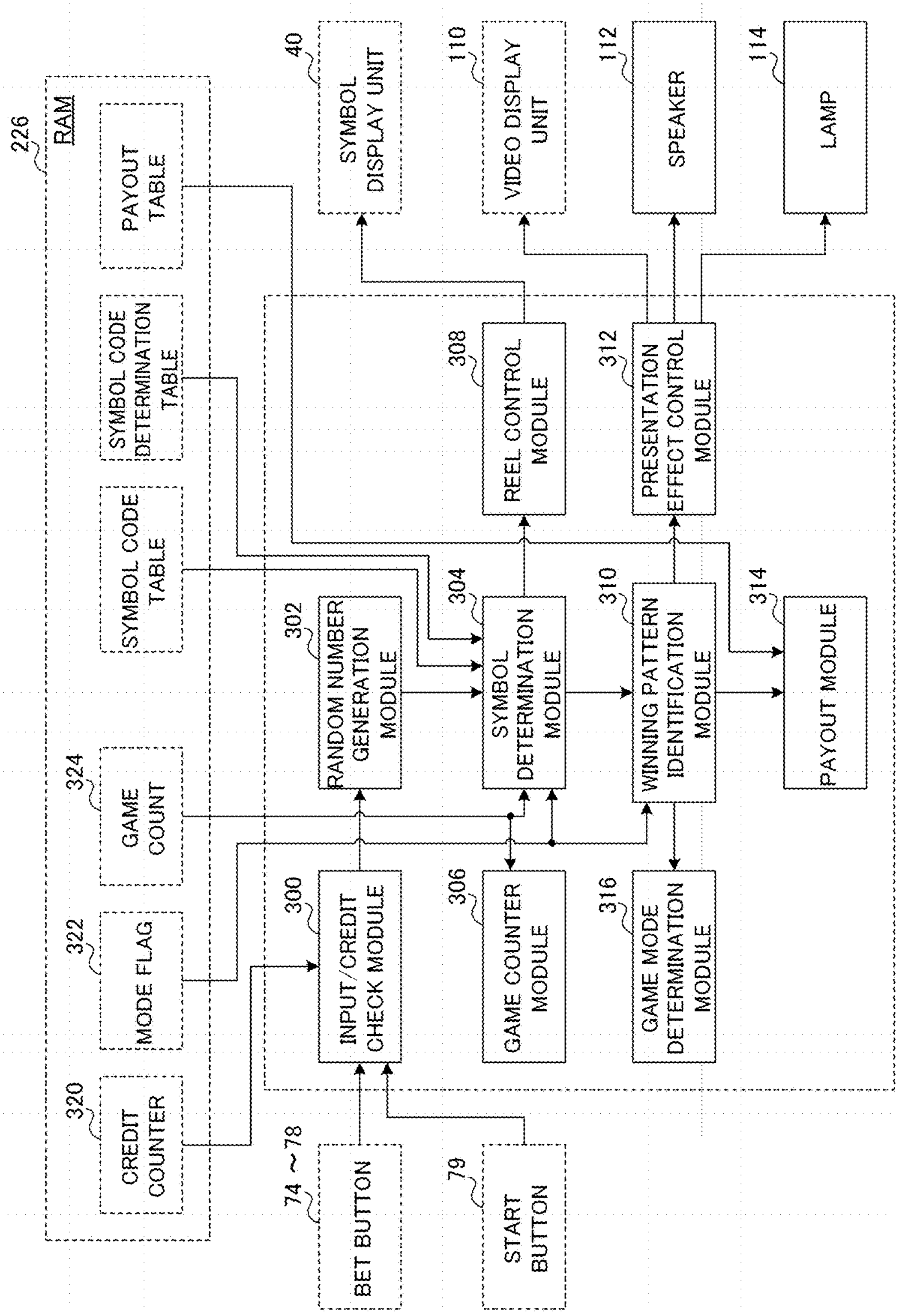
FIG. 7 is a block diagram for illustrating processing of a game program executed by the main CPU on the mother board.

FIG. 7 is a block diagram for illustrating processing of a game program executed by the main CPU 222 of the mother board 220. When power is supplied to the slot machine 10, the main CPU 222 retrieves the authenticated game program and game system program from the memory card 210 via the game board 200 and writes them to the RAM 226. The game program is executed in such a loaded state on the RAM 226.

In a preferred embodiment, the game program is executed by an input/credit check module 300, a random number generation module 302, a symbol determination module 304, a game counter module 306, a reel control module 308, a winning pattern identification module 310, a presentation effect control module 312, a payout module 314, and a game mode determination module 316.

It should be noted that, the input/credit check module 300 may be an independent input/credit check device 300; the random number generation module 302 may be an independent random number generation device 302; the symbol determination module 304 may be an independent symbol determination device 304; the game counter module 306 may be an independent game counter device 306; the reel control module 308 may be an independent reel control device 308; the winning pattern identification module 310 may be an independent winning pattern identification device 310; the presentation effect control module 312 may be an independent presentation effect control device 312; the payout module 314 may be an independent payout device 314; and the game mode determination module 316 may be an independent game mode determination device 316'. In this way, the game program can be an aggregate of independent devices. Alternatively, some of these devices may be integrated into a device. In any case, it is sufficient as far as the processing modules may be software or hardware such as components, devices, or units that can execute the game program.

<Input/Credit Check Module 300>

The input/credit check module 300 continuously checks whether any of the BET buttons 74 to 78 or the START button 79 is pressed in an idle state where the five mech reels 52A to 52E are still. Upon detection of pressing one of the BET buttons 74 to 78 or the START button 79, the input/credit check module 300 checks whether any credit remains for the player with reference to the credit counter 320 held in the RAM 226. If the player has at least one credit, the input/credit check module 300 invokes the random number generation module 302.

The random number generation module 302 generates random numbers to be used by the symbol determination module 304. In this embodiment, the random number generation module 302 generates five random numbers. The five random numbers are individually used for the five mech reels 52A to 52E.

After extracting all the five random numbers, the symbol determination module 304 separately determines to-be stopped symbols for the five mech reels 52A to 52E with reference to a symbol code determination table held in the RAM 226. The symbol determination module 304 determines five to-be stopped symbols for the five mech reels 52A to 52E and shows the to-be stopped symbols for the five mech reels 52A to 52E in the display window 56 of the symbol display unit 40.

In addition, the symbol determination module 304 refers to the mode flag 322 held in the RAM 226 to find the current game mode. For the game modes in the present embodiment, there are base game mode and free game mode. The number of unit games to be executed in a free game mode is predetermined, for example, to be seven. To limit the number of free games, the game counter module 306 counts the free games executed in the present free game mode or the free games remaining in the present free game mode. The value of the game count 324 is stored in the RAM 226. The game counter module 306 may belong to the symbol determination module 304.

The reel control module 308 controls the reel assembly 50 by supplying stop position information for the determined symbols. Consequently, the spinning five mech reels 52A to 52E stop at the positions specified by the stop position information. That is to say, the symbols are scrolled with the spin of the five mech reels 52A to 52E. Then, the reel control module 308 stops the five mech reels 52A to 52E so that the determined symbols will be rearranged at the vertically middle of the display window 56 of the symbol display unit 40.

The winning pattern identification module 310 determines whether the rearranged symbols make any specific winning pattern. If the rearranged symbols make a winning pattern, the presentation effect control module 312 controls the symbol display unit 40 and other devices, such as the speakers 112, the lamp 114, and the video display unit 110. The presentation effects include performances by video and audio and performances by changing backlight and illumination. The payout module 314 determines the amount of payout in accordance with the completed winning pattern, and provides the determined amount of payout to the player.

Each time a unit game ends, the game mode determination module 316 determines the game mode of the next unit game. If the rearranged symbols generate a trigger event in the base game mode, the game mode determination module 316 switches the game mode from the base game mode to the roulette game mode. When the roulette game mode ends, the game mode determination module 316 switches the game mode from the roulette game mode to the free game mode. Further, if an exit requirement is satisfied in the free game mode, the game mode determination module 316 switches the free game mode to the base game mode. In the other situations, the game mode determination module 316 maintains the current game mode. The game mode determination module 316 may belong to the winning pattern identification module 310.

<<Payline Definition Table>>

FIG. 8 illustrates a payline definition table provided in the preferred embodiment of the present invention. In the present embodiment, thirty paylines of No. 1 to No. 30 are defined for a symbol matrix. In the payline definition table of FIG. 8, the value "0" represents the position of the top row (the first row) in the display window 56; the value "1" represents the position of the middle row (the second row) in the display window 56; and the value "2" represents the position of the bottom row (the third row) in the display window 56.

For example, the No. 1 payline indicates all "1", meaning that the payline is "the middle row"-"the middle row"-"the middle row"-"the middle row"-"the middle row". The No. 15 payline indicates "2"-"0"-"0"-"0"-"2", meaning that the payline is "the bottom row"-"the top row"-"the top row"-"the top row"-"the bottom row". The No. 27 payline indicates "2"-"2"-"1"-"0"-"0", meaning that the payline is "the bottom row"-"the bottom row"-"the middle row"-"the top row"-"the top row".

If rearranged symbols complete some winning pattern along any one of these 30 paylines of No. 1 to No. 30, a payout associated with the winning pattern is given to the player. As described above, in the case of scatter symbols, the number of scatter symbols shown in the display window 56 determines whether a winning pattern is completed, regardless of these paylines.

In the present embodiment, all the 30 paylines of No. 1 to No. 30 are always active regardless of the bet operation of the player.

The number of paylines is not limited to 30; it may be more than 30 or less than 30. Alternatively, active paylines may be determined in accordance with the bet operation of the player. The total number of paylines can be changed with the size of the symbol matrix; other paylines can be defined as necessary.

<Payout Table>

FIG. 9 is a drawing for illustrating an example of a payout table. The payout table in FIG. 9 defines winning patterns of nine kinds of symbols.

The payout table indicates relations among the kind of the symbols constituting the winning pattern, the number of the kind, and the payout. The number of the kind equals the number of constituent symbols of the winning pattern that are continuously arranged from the left to the right along the payline. The slot machine 10 of the present embodiment determines a win or a loss on a left-to-right basis except for BONUSes. Accordingly, the payout is determined depending on the kind and the number of symbols continuously arranged along a payline. Instead of the left-to-right basis, the number of symbols arranged along a payline, even if they are not continuous, may determine whether a winning pattern is completed.

The first winning patterns are patterns where WILDs are continuously arranged. Specifically, the first winning patterns are patterns where three to five WILDs are continuously arranged along a payline. For example, the payout when five WILDs are continuously arranged along a payline is defined as 300.

A WILD is a symbol to substitute for another symbol to make an advantageous winning pattern. When a winning pattern is completed with another symbol substituted by a WILD, a payout for the winning pattern is determined to be given. In the present embodiment, however, a WILD cannot substitute for a BONUS.

The second winning patterns are patterns where three to five RED7s are continuously arranged along a payline. For example, the payout when five RED7s are continuously arranged along a payline is defined as 200.

The third winning patterns are patterns where three to five BLUE7s are continuously arranged along a payline. For example, the payout when five BLUE7s are continuously arranged along a payline is defined as 150.

The fourth winning patterns are patterns where three to five ANY7s are continuously arranged along a payline. The winning patterns of ANY7 are patterns where symbols of the two kinds of RED7 and BLUE7 are mixed and continuously arranged along a payline. For example, the payout when five ANY7s are continuously arranged along a payline is defined as 30.

The fifth winning patterns are patterns where three to five 3BARs are continuously arranged along a payline. For example, the payout when five 3BARs are continuously arranged along a payline is defined as 80.

The sixth winning patterns are patterns where three to five 2BARs are continuously arranged along a payline. For example, the payout when five 2BARs are continuously arranged along a payline is defined as 40.

The seventh winning patterns are patterns where three to five 1BARs are continuously arranged along a payline. For example, the payout when five 1BARs are continuously arranged along a payline is defined as 30.

As noted from the above, the payouts for the 3BARs are defined as highest and the payouts for the 1BARs are defined as lowest among the 3BARs, 2BARs, and 1BARs.

The eighth winning patterns are patterns where three to five ANYBARs are continuously arranged along a payline. The winning patterns of ANYBAR are patterns where symbols of at least two kinds out of 3BAR, 2BAR, and 1BAR are mixed and continuously arranged along a payline. For example, the payout when two 2BARs and one 1BAR are arranged along a payline is defined as 5.

The ninth winning patterns are winning patterns where three to five BONUSes appear. As mentioned above, the BONUSes are scatter symbols. Accordingly, BONUSes arranged along a payline are not a requirement to complete a winning pattern and the number of BONUSes in the display window 56 determines whether a ninth winning pattern is completed. The payout when three BONUSes appear is defined as 1.

As mentioned above, when the condition that three or more BONUSes are determined to appear in the display window 56 through symbol lottery processing is satisfied, a free game mode is triggered. Accordingly, when three or more BONUSes are determined to appear in the display window 56 through symbol lottery processing, both of the benefits of receiving payout and entering the free game mode are provided to the player.

<Configuration of Reel Strips>

FIGS. 10 and 11 are drawings for illustrating reel strips (symbol arrays) of the five mech reels 52A to 52E and weights of individual symbols. The relations between the symbols and the weights indicated in FIGS. 10 and 11 are digitalized and stored in the RAM 226.

Figure 15:
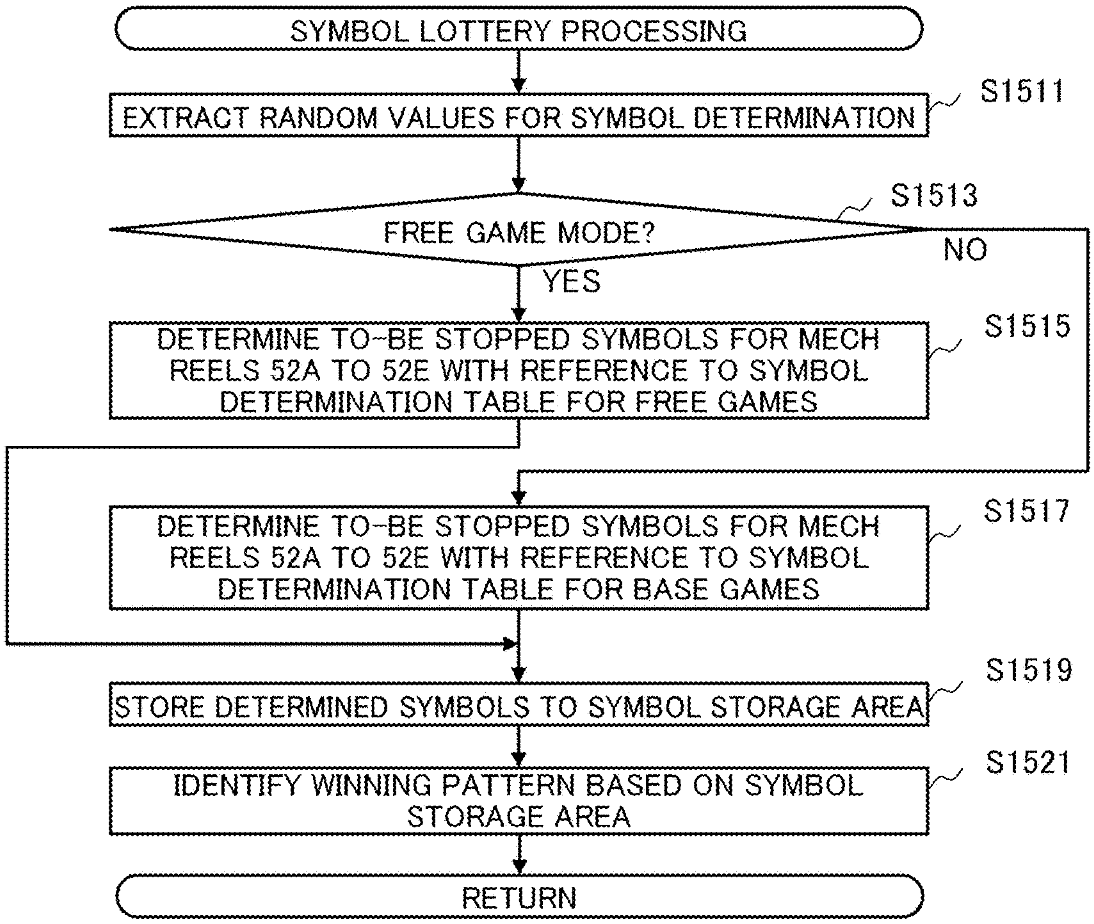
FIG. 15 is a flowchart of symbol lottery processing.

Each of FIGS. 10 and 11 functions as a symbol determination table for determining five to-be stopped symbols in symbol lottery processing of FIG. 15. The symbol lottery processing extracts random numbers, determines five code numbers with reference to the symbol determination table of FIG. 10 or 11, and determines the symbols corresponding to the code numbers to be the five to-be stopped symbols to be stopped on the middle row (second row) of the display window 56.

FIG. 10 defines reel strips to be used in the base game mode. FIG. 11 defines reel strips to be used in the free game mode. As shown in FIGS. 10 and 11, the arrays of the symbols for the base game mode and the arrays of the symbols for the free game mode are identical but the weights are different between them. The directions along the columns of FIGS. 10 and 11 are the spin direction of the five mech reels 52A to 52E.

On each of the five mech reels 52A to 52E, total 22 symbols are disposed. Each of these 22 symbols is assigned a code number (0 to 21) to identify the symbol. Each of the five mech reels 52A to 52E is also assigned a reel number (1 to 5) to identify the reel. Identifying a reel number and a code number leads to identifying one symbol.

As shown in FIGS. 10 and 11, the reel strips are assigned eight kinds of symbols, WILDs, RED7s BLUE7s, 3BARs, 2BARs, 1BARs, BONUSes, and BLANKs. For example, the code number 10 of the mech reel 52C is assigned a BLUE7. Completion of a winning pattern of BONUSes triggers a free game mode.

On each of the five mech reels 52A to 52E, BLANKs are disposed at every other place along the spin direction, except for the WILDs of code numbers 18, 19, and 20.

On each of the five mech reels 52A to 52E, the three WILDs (Wild1, Wild2, and Wild3) of code numbers 18, 19, and 20 are disposed consecutively without a BLANK interposed. Three WILDs are thus disposed consecutively on all the five mech reels 52A to 52E. Rearranging symbols in such a position that all these three WILDs appear in the display window 56 increases the probability of completion of winning patterns on a plurality of paylines.

On each of the five mech reels 52A to 52E, a BONUS is disposed at only the code number 12. The base game mode weights of the BONUSes on the five mech reels 52A, 52B, 52C, 52D, and 52E are 15, 5, 2, 15, and 9, respectively, as shown in FIG. 10. The free game mode weights of the BONUSes on the five mech reels 52A, 52B, 52C, 52D, and 52E are 20, 64, 84, 50, and 10, respectively, as shown in FIG. 11. The free game mode weights of the BONUSes are specified as generally higher than the base game mode weights of the BONUSes.

Particularly on the three mech reels 52B, 52C and 52D, the free game mode weights of BONUSes are specified as higher than the base game mode weights. Specifically, the weight for the mech reel 52B is specified as 12 times higher, the weight for the mech reel 52C is specified as 42 times higher, and the weight for the mech reel 52D is specified as 3 times higher than those for the base game mode.

These weights specified as above lead BONUSes to appear with low probability in the base game mode and to appear with high probability in the free game mode. For this reason, the free game mode can be configured so that appearance of a BONUS is to be followed by appearance of three consecutive WILDs.

In addition to the weights of BONUSes, the free game mode weights of the BLANKs (No. 11 and No. 13) before and after the BONUSes are specified as higher. Accordingly, the BONUSes are configured to stop at the top row or the bottom row with high probability, as well as the middle row. This configuration leads three consecutive WILDs to appear with high probability in the free game mode.

As described above, BLANKs are disposed at every other place along the spin direction. Accordingly, when a BLANK on some mech reel stops at the middle row of the symbol matrix, normal symbols such as a RED7, a BLUE7, a 3BAR, a 2BAR, a 1BAR, and a BONUS stop at the top row and the bottom row of the mech reel. In such a case, paylines going through the top row or the bottom row can complete a winning pattern.

In another example, when a BLANK on some mech reel stops at the top row or the bottom row of the symbol matrix, a normal symbol stops at only the middle row of the mech reel. In such a case, only paylines going through the middle row can complete a winning pattern.

With respect to one reel, one normal symbol stops at minimum, and two normal symbols at maximum. Accordingly, winning patterns could be completed with two paylines at maximum.

In contrast, when the Wild2 on some mech reel stops at the middle row, the Wild1 and the Wild3 stop at the top row and the bottom row, respectively, so that three consecutive WILDs (Wild1, Wild2, and Wild3) appear in the display window 56. In this case, the paylines going through the top row, the middle row, and the bottom row can complete a winning pattern with respect to the mech reel. In this way, showing three consecutive WILDs in the display window 56 increases the paylines on which a winning pattern could be completed.

As shown in FIGS. 10 and 11, the code numbers of the BONUSes are No. 12 and the code numbers of the Wild1 are No. 18. Accordingly, a BONUS and a Wild1 are separated by five symbols. However, the display window 56 has space for three symbols of the top row, the middle row, and the bottom row. The BONUS and the Wild1 are spaced apart more than the length of the display window 56. Accordingly, when a BONUS appears at the top row of the display window 56, a Wild1 will never appear in the display window 56. Accordingly, when a BONUS appears in the display window 56, the player does not know the existence of the Wild1.

<<State Transitions of Games>>

Figure 12:
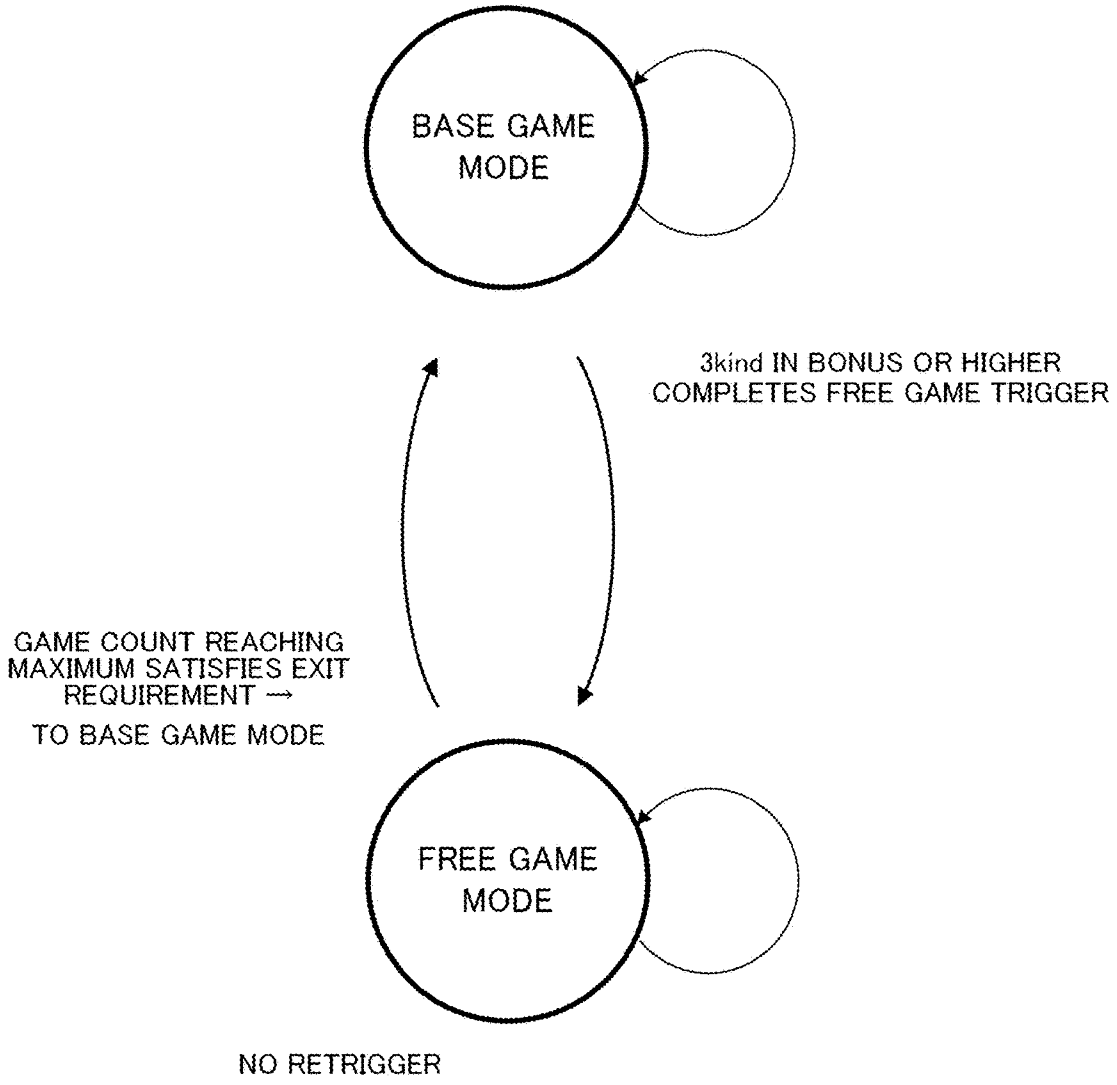
FIG. 12 is a diagram for illustrating state transitions in the slot machine.

FIG. 12 is a diagram for illustrating state transitions in the slot machine 10. Specifically, FIG. 12 is a diagram for illustrating transitions between base game mode and free game mode.

The slot machine 10 has two game modes: base game mode and free game mode. The slot machine 10 offers unit games basically in the base game mode. When a free game trigger (event) occurs in the base game mode, the game mode changes to the free game mode.

As illustrated in FIG. 12, the base game mode repeats a unit game until a free game trigger is completed. The games in the base game mode are games to conduct unit games by spending (betting) gaming media such as medals. In the games in this base game mode, when one of the winning patterns illustrated in FIG. 9 is completed, an award in the amount in accordance with the payout for the winning pattern is paid out.

Completion of a winning pattern of BONUSes in the base game mode triggers a free game mode. Specifically, appearance of three or more BONUSes completes a winning pattern of BONUSes. The BONUSes are scatter symbols, which can make winning patterns independently from paylines. The number of BONUSes shown in the display window 56 determines whether a winning pattern is completed or not.

The game mode changes to a free game mode when the free game mode is triggered. In the present embodiment, the games in the free game mode are games to conduct unit games without spending gaming media such as medals.

In the case where three BONUSes (3kind) trigger a free game mode, the maximum number of unit games in the free game mode is determined to be 7. In the case where four BONUSes (4kind) trigger a free game mode, the maximum number of unit games in the free game mode is determined to be 12. In the case where five BONUSes (5kind) trigger a free game mode, the maximum number of unit games in the free game mode is determined to be 50.

The present embodiment does not have retrigger. Accordingly, if three or more BONUSes appear in a free game mode, the free game mode is not retriggered. Accordingly, there is no situation of adding a unit game in the present embodiment.

<<Description of Program>>

Now, with reference to FIGS. 13 to 22, the program to be executed by the slot machine 10 is described.

<Main Control Processing>

Figure 13:
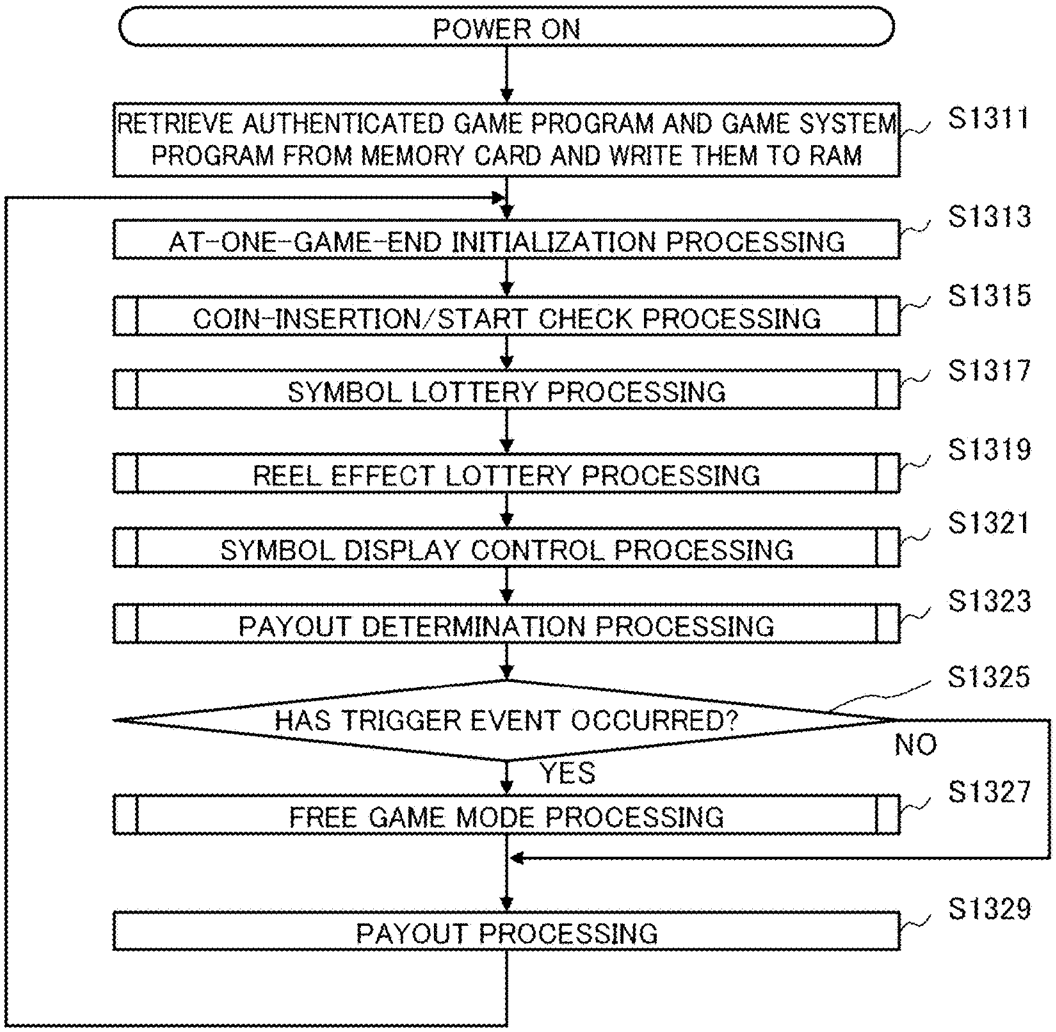
FIG. 13 is a flowchart of main control processing.

FIG. 13 is a flowchart of main control processing for the slot machine 10 according to the present embodiment. The game mode in this main control processing in FIG. 13 is the base game mode.

When the slot machine 10 is powered on, the main CPU 222 retrieves an authenticated game program and an authenticated game system program from the memory card 210 via the game board 200 and writes them to the RAM 226 (step S1311). Thus, the base game mode is started.

Next, the main CPU 222 executes at-one-game-end initialization processing (step S1313). The one game means a single unit game. The main CPU 222 clears data which becomes unnecessary after each unit game in the working area of the main RAM 226, such as the bet count and the symbols determined by a lottery.

Next, the main CPU 222 executes coin-insertion/start check processing (step S1315), which will be described later with reference to FIG. 14. At this step, the main CPU 222 checks for input with a BET button or the START button 79.

Next, the main CPU 222 executes symbol lottery processing (step S1317), which will be described later with reference to FIG. 15. At this step, the main CPU 222 determines to-be stopped symbols based on random numbers for symbol determination.

Next, the main CPU 222 invokes and executes reel effect lottery processing (step S1319) which will be described later with reference to FIG. 22. The reel effect lottery processing determines presentation effects before the start of spinning of the five mech reels 52A to 52E and presentation effects from the middle until the stop of the spinning of the five mech reels 52A to 52E.

The reel effects are presentation effects by motion of the five mech reels 52A to 52E. Specifically, a plurality of kinds of reel effects are provided as shown in FIG. 23 and a combination of reel effects is determined. The reel effects are performed by controlling the spin speeds, spin directions, spin times (spin angles), and times to stop of the individual reel motors 272 for driving the five mech reels 52A to 52E. In the reel effect lottery processing, the main CPU 222 determines parameters for these spin speed, spin direction, spin time (spin angle), and time to stop of each reel motor 272.

In addition, at step S1319, the main CPU 222 may extract a random number for effect determination, determine an effect content from the predefined plurality of effect contents by lottery, and executes the determined effect content with predetermined timing. For example, the main CPU 222 can control the video display unit 110 to play a video for presentation effects, the speakers 112 to output audio, the lamp 114 to flash, and further apply special effects to these.

Next, the main CPU 222 executes symbol display control processing (step S1321), which will be described later with reference to FIG. 16. At this step, the main CPU 222 starts scrolling the symbol arrays on the reels and stops the to-be stopped symbols determined in the symbol lottery processing of step S1317 at predetermined positions.

Next, the main CPU 222 executes payout determination processing (step S1323), which will be described later with reference to FIG. 17. At this step, in the case of base game mode, the main CPU 222 determines an amount of payout based on the combination of symbols shown on each payline with reference to the payout table (FIG. 9) and stores the amount of payout to a payout count storage area (payout counter) provided in the RAM 226. In the case of free game mode, the main CPU 222 determines an amount of payout with reference to a payout table different from the one for base games.

Next, the main CPU 222 determines whether a trigger event has occurred (step S1325). In the present embodiment, if the rearranged symbols include three or more BONUSes (trigger symbols), a trigger event occurs. When determining that a trigger event has occurred, the main CPU 222 executes free game mode processing (step S1327), which will be described later with reference to FIG. 18.

Next, after step S1327 or if the determination at step S1325 is that no trigger event has occurred, the main CPU 222 executes payout processing (step S1329). The main CPU 222 adds the value held in the payout count storage area (payout counter) to the value held in a credit count storage area (credit counter 320) provided in the RAM 226.

Alternatively, the main CPU 222 may discharge coins in the amount corresponding to the payout counter to the coin tray. Still alternatively, the main CPU 222 may control the driver of the ticket printer 120 to issue a ticket with a barcode indicating the record of the payout counter. After this step, the main CPU 222 clears the mode flag and the BONUS symbol value storage area and returns to step S1313.

<Coin-Insertion/Start Check Processing>

Figure 14:
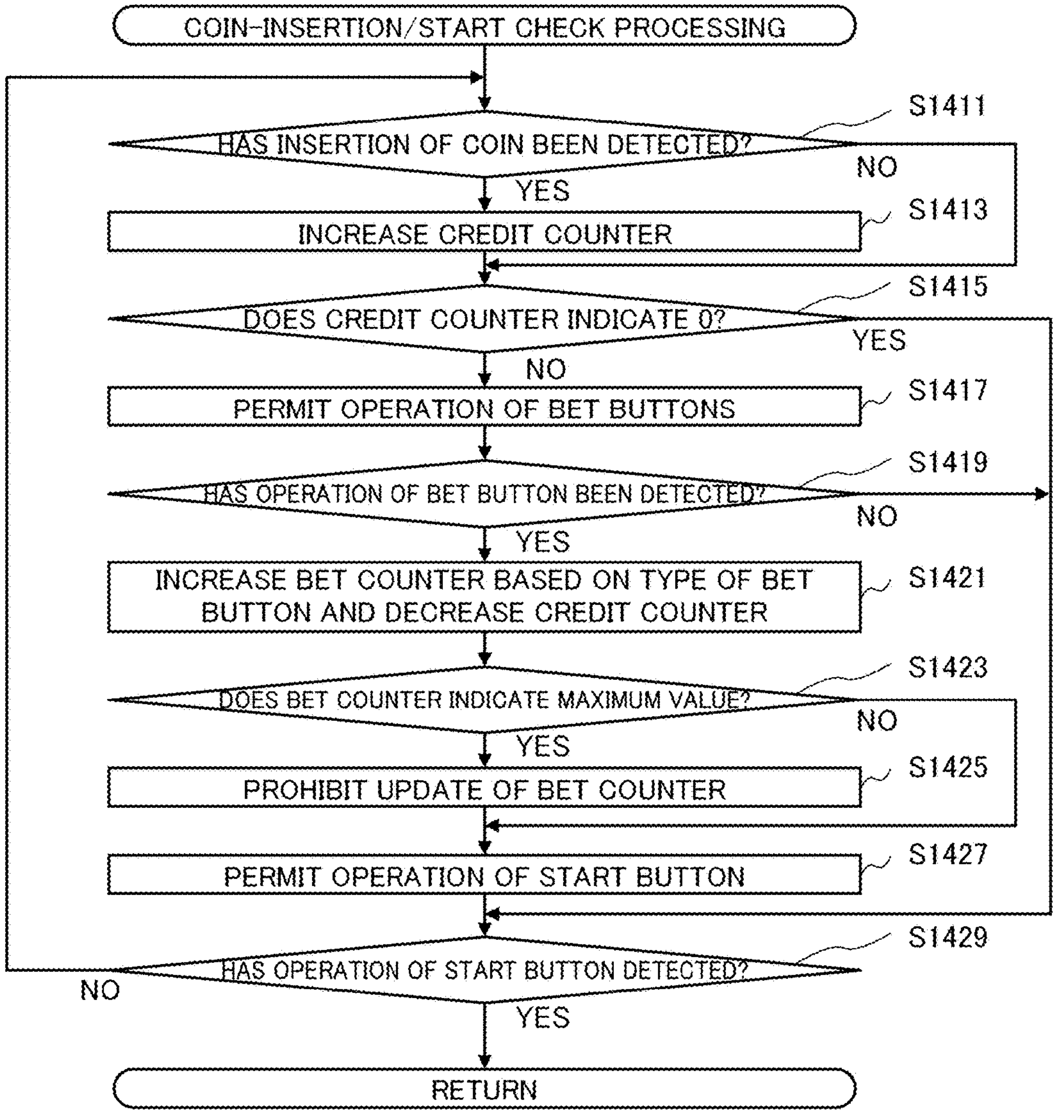
FIG. 14 is a flowchart of coin-insertion/start check processing.

FIG. 14 is a flowchart of coin-insertion/start check processing for the slot machine 10 according to the present embodiment.

First, the main CPU 222 determines whether the coin counter 232 has detected insertion of a coin (step S1411) with the input/credit check module 300 run by the main CPU 222. If the determination is that insertion of a coin has been detected, the main CPU 222 adds a value corresponding to the amount of the received coin to the value held in the credit count storage area (credit counter 320) (step S1413). In addition to the coin, the main CPU 222 may determine whether the bill validator 246 has detected insertion of a bill, and if the determination is that insertion of a bill has been detected, increase the credit counter 320 by a value corresponding to the amount of the bill.

After step S1413 or if the determination at step S1411 is that insertion of a coin has not been detected, the main CPU 222 determines whether the credit counter 320 indicates 0 (step S1415). If the determination is that the credit counter 320 does not indicate 0, the main CPU 222 permits operation of the BET buttons (step S1417).

Next, the main CPU 222 determines whether operation of a BET button has been detected (step S1419). If the main CPU 222 detects a BET button by the player through a BET switch, it adds a value based on the type of the BET button to the value held in a bet count storage area (bet counter) provided in the RAM 226 and decreases the credit counter 320 (step S1421).

Next, the main CPU 222 determines whether the bet counter indicates the maximum value (step S1423). If the determination is that the bet counter indicates the maximum value, the main CPU 222 prohibits update of the bet counter (step S1425). After step S1425 or if the determination at step S1423 is that the bet counter does not indicate the maximum value, the main CPU 222 permits operation of the START button 79 (step S1427).

After step S1427, if the determination at step S1419 is that operation of a BET button has not been detected, or if the determination at step S1415 is that the credit counter 320 indicates 0, the main CPU 222 determines whether operation of the START button 79 has been detected (step S1429). If the determination is that operation of the START button 79 has not been detected, the main CPU 222 returns to step S1411.

If the determination is that operation of the START button 79 has been detected, the main CPU 222 exits the coin-insertion/start check processing.

<Symbol Lottery Processing>

FIG. 15 is a flowchart of symbol lottery processing for the slot machine 10 according to the present embodiment.

First, the random number generation module 302 run by the main CPU 222 extracts random numbers for symbol determination (step S1511).

Next, the main CPU 222 determines whether the game mode is a free game mode (step S1513). If the determination is that the game mode is a free game mode (YES), the main CPU 222 determines to-be stopped symbols for the mech reels 52A to 52E with reference to the symbol determination table for free games (FIG. 11) (step S1515).

Contrarily, if the determination at step S1513 is that the game mode is not the free game mode (NO), the main CPU 222 determines the symbols to be stopped for the mech reels 52A to 52E with reference to the symbol code determination table for base games (FIG. 10) (step S1517).

At step S1515 or S1517, the main CPU 222 draws a lottery for each of the mech reels 52A to 52E and determines a to-be stopped symbol from the 22 symbols (code Nos. 00 to 21) in the symbol determination table (FIG. 10 or 11). In the lottery, the probabilities to draw the 22 symbols (code Nos. 00 to 21) accord with the weights in the symbol code determination table.

After step S1515 or S1517, the main CPU 222 stores the determined to-be stopped symbols for the reels to a symbol storage area provided in the RAM 226 (step S1519). Next, the winning pattern identification module 310 run by the main CPU 222 determines whether any winning pattern is completed based on the combination of symbols stored in the symbol storage area (step S1521), with reference to the payout table (FIG. 9). The main CPU 222 determines whether the combinations of symbols on the reels to appear on the paylines match any of the combinations of symbols defined in the payout table to determine whether any winning pattern is completed. As to BONUSes of the scatter symbol, the main CPU 222 determines whether the number of BONUSes to appear in the display window 56 matches one of the numbers of BONUSes defined in the payout table to determine whether any winning pattern is completed.

<Symbol Display Control Processing>

Figure 16:
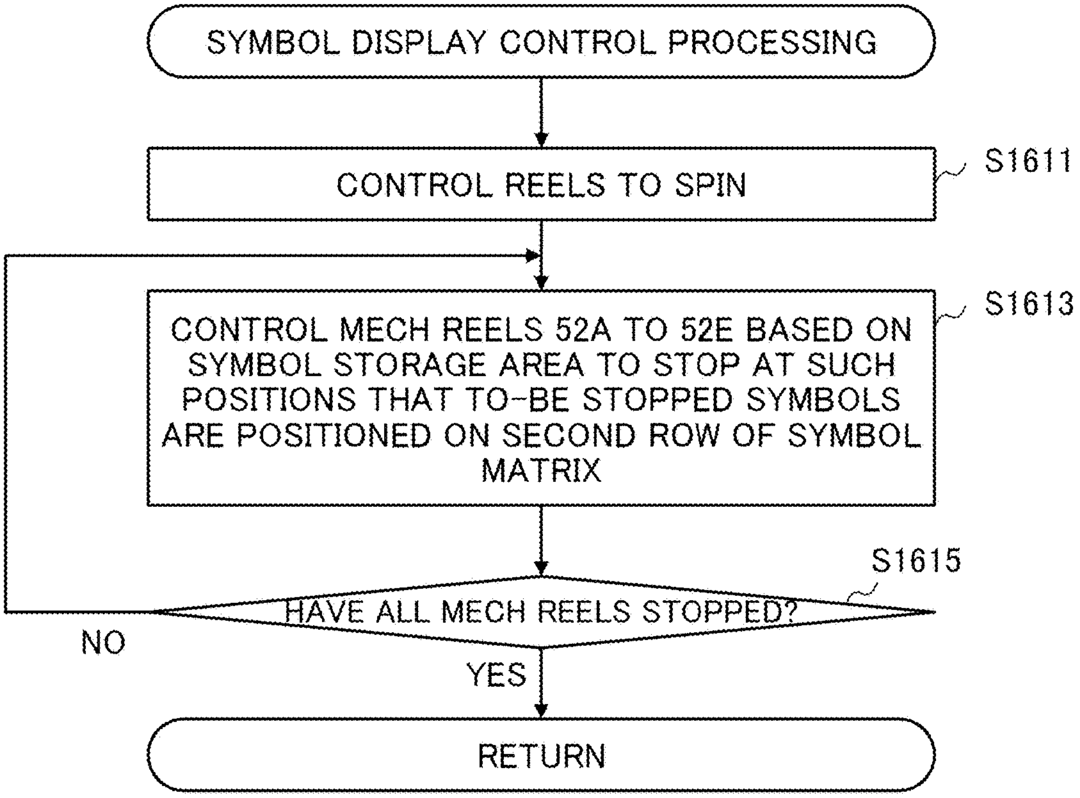
FIG. 16 is a flowchart of symbol display control processing.

FIG. 16 is a flowchart of symbol display control processing for the slot machine 10 according to the present embodiment. This symbol display control processing is executed at step S1321 when the game mode is a base game mode.

First, the reel control module 308 run by the main CPU 222 sends a spin control signal to the reel assembly 50. The reel drivers 264 of the mech reels 52A to 52E supply power to the reel motors 272 to spin the mech reels 52A to 52E. The mech reels 52A to 52E spin at a predetermined speed so that the symbol arrays on the mech reels 52A to 52E scroll in the display window 56 of the symbol display unit 40 (step S1611).

Next, the reel control module 308 run by the main CPU 222 controls the reels to stop (step S1613). The spin control signal includes information on the stop positions of the mech reels 52A to 52E. The information on the stop positions can be obtained from the to-be stopped symbols for the individual reels held in the symbol storage area. The reel drivers 264 of the mech reels 52A to 52E control the reel motors 272 based on the information on spin positions of the mech reels 52A to 52E acquired by the magnetic field detectors 270 to stop the mech reels 52A to 52E at the positions indicated by the spin control signal. In this way, the reel control module 308 controls the reel motors 272 made of stepping motors to stop at desired positions; the scrolling of the symbol arrays are stopped so that the to-be stopped symbols are positioned on the middle row (the second row) of the symbol matrix formed in the display window 56.

Next, the main CPU 222 determines whether all the mech reels 52A to 52E are stopped (step S1615). If the determination is that all the mech reels 52A to 52E are not stopped, the main CPU 222 returns to step S1613.

If the determination is that all the mech reels 52A to 52E are stopped, the main CPU 222 exits this subroutine.

Through the symbol display control processing illustrated in FIG. 16, symbols are rearranged in the display window 56. That is to say, the symbols rearranged in the display window 56 constitute the symbol matrix formed in the display window 56.

<Payout Determination Processing>

Figure 17:
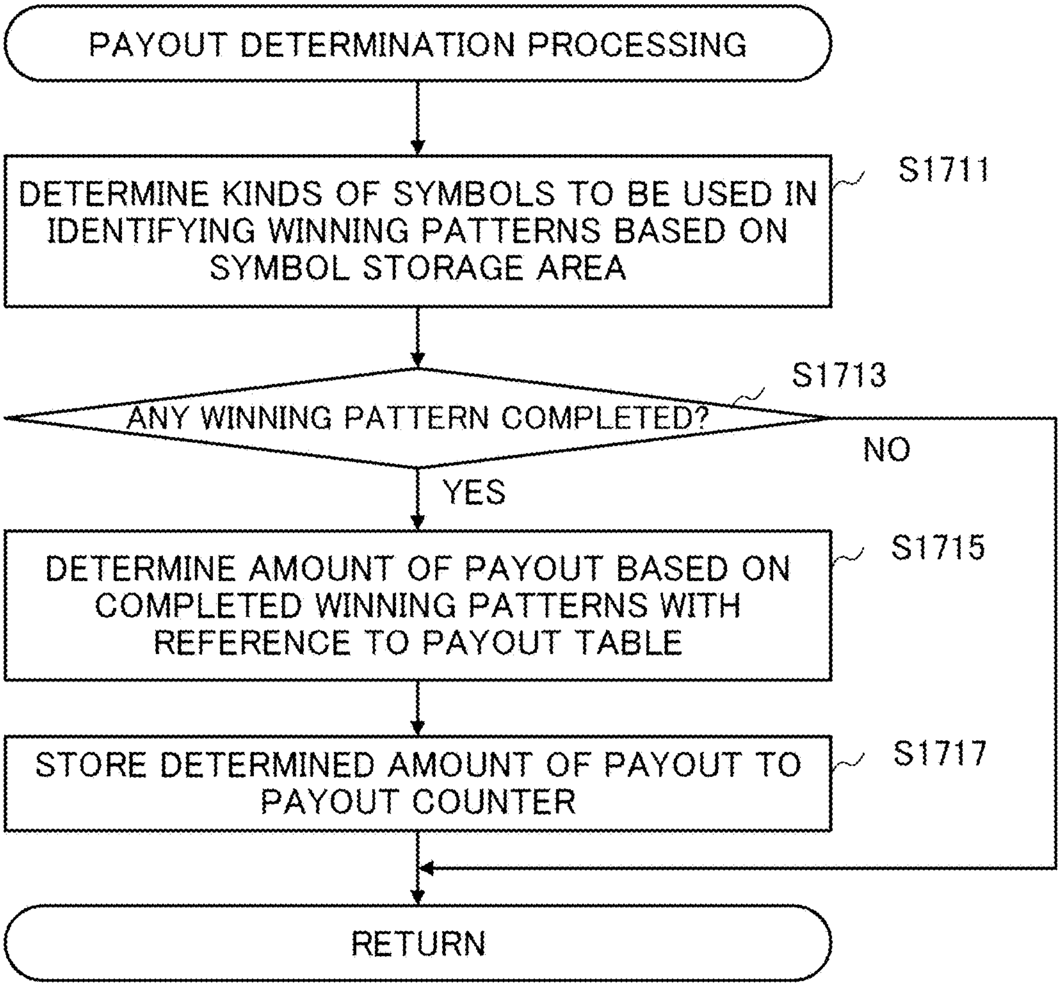
FIG. 17 is a flowchart of payout determination processing.

FIG. 17 is a flowchart of payout determination processing for the slot machine 10 according to the present embodiment.

First, the main CPU 222 determines the kinds of symbols to be used in identifying winning patterns based on the symbols stored in the symbol storage area with reference to the payout table in FIG. 9 (step S1711).

Next, the main CPU 222 determines whether any winning pattern is completed with the kinds of symbols determined at step S1711 (step S1713).

If the determination is that some winning pattern is completed, the main CPU 222 determines the amount of payout based on the payout associated with the winning pattern in the symbol storage area and the payout table (FIG. 9) (step S1715).

Next, the main CPU 222 stores the determined amount of payout to a payout counter in the payout count storage area (step S1717) and exits this subroutine.

If the determination at step S1713 is that no winning pattern is completed, the main CPU 222 immediately exits this subroutine.

<Free Game Mode Processing>

Figure 18:
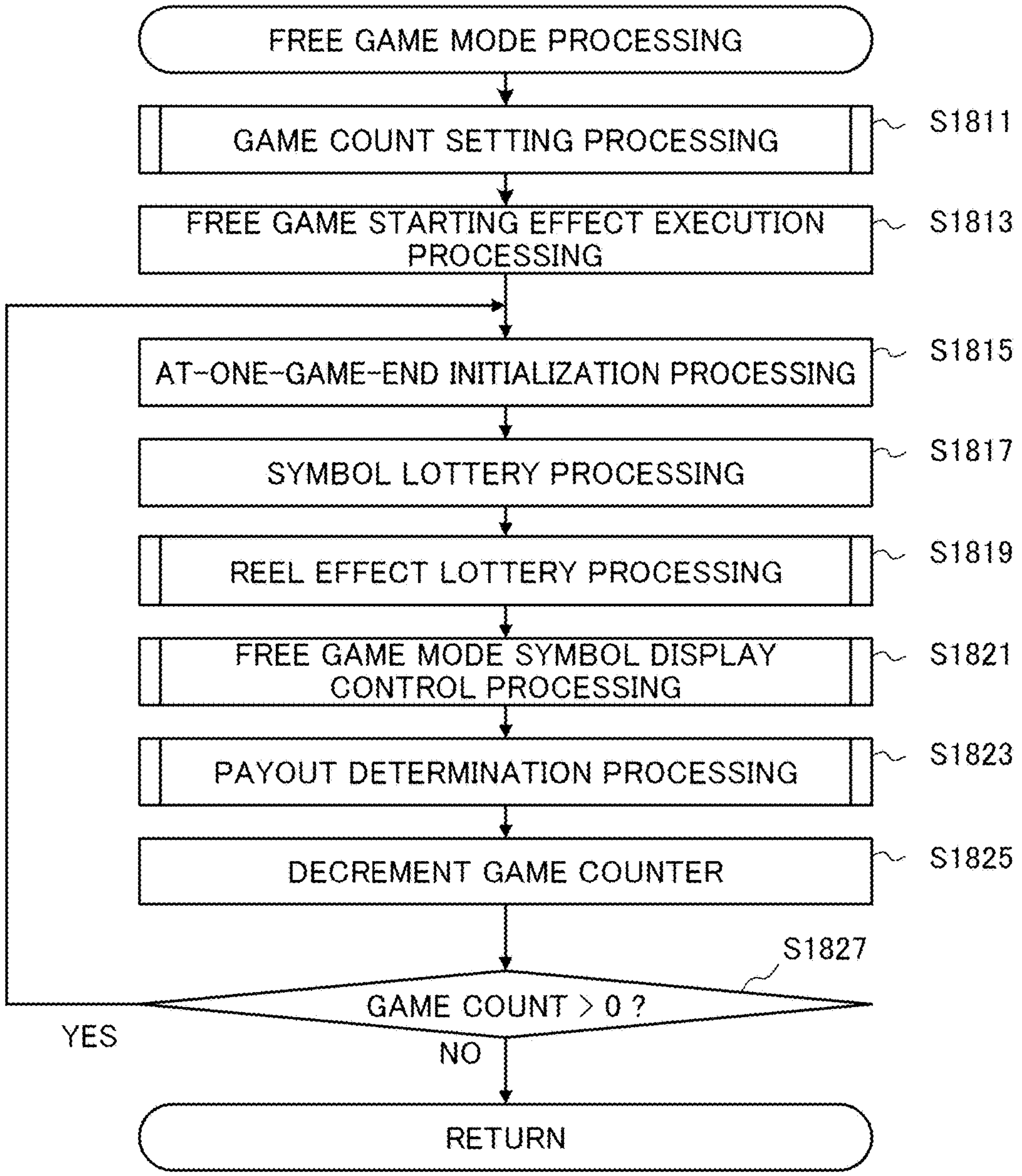
FIG. 18 is a flowchart of free game mode processing.

FIG. 18 is a flowchart of the free game mode processing for the slot machine 10 according to the embodiment of the present invention. Free games in the present embodiment are slot games (unit games) same as the games in the base game mode. The games in the free game mode are slot games (unit games) that can be started without bet.

Figure 19:
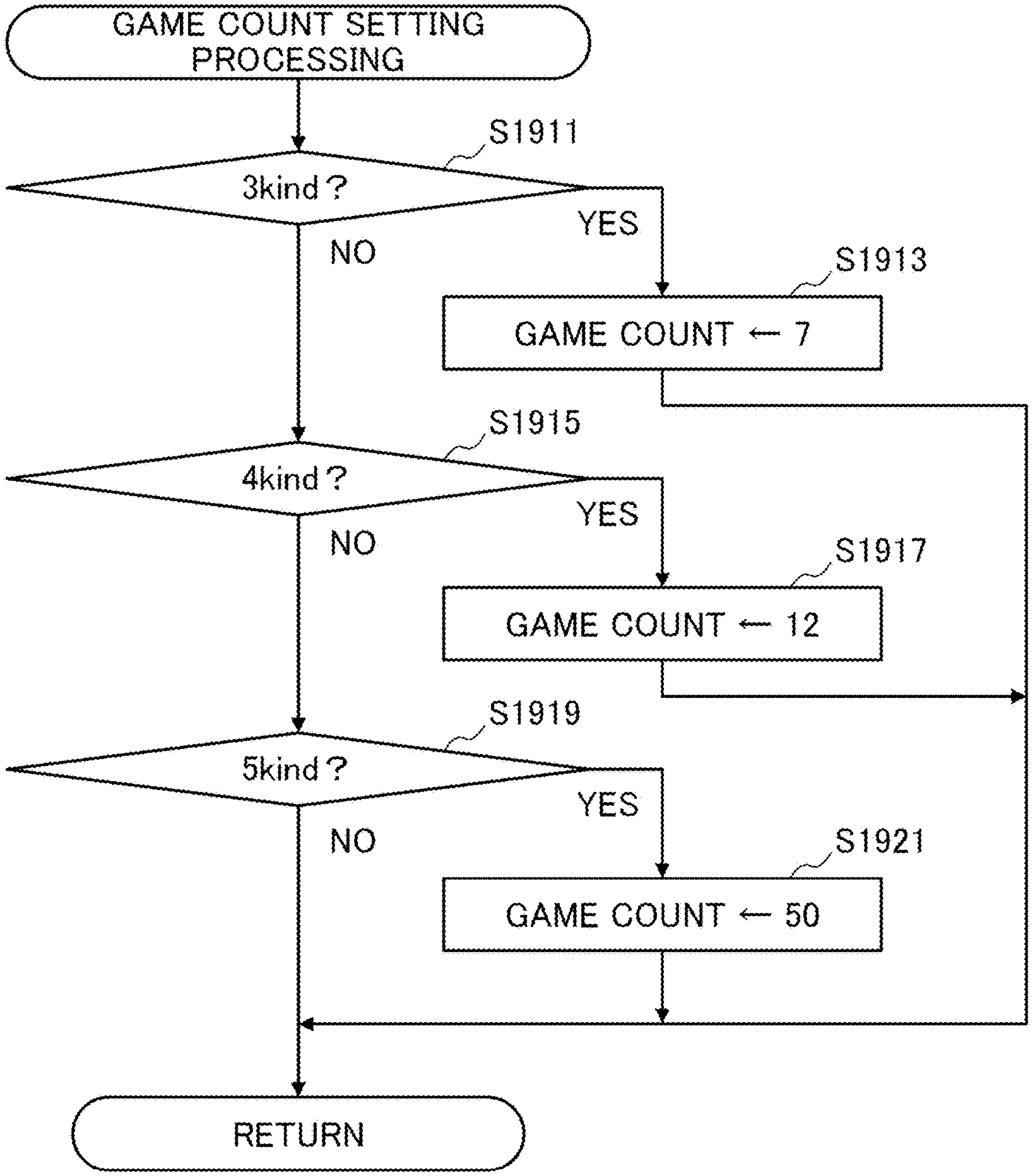
FIG. 19 is a flowchart of game count setting processing.

First, the main CPU 222 invokes game count setting processing illustrated in FIG. 19 and determines the number of games (step S1811).

Next, the main CPU 222 executes free game starting effects (S1813). The effects notify the player of entering the free game mode.

Next, the main CPU 222 executes at-one-game-end initialization processing (step S1815). For example, the main CPU 222 clears data that becomes unnecessary after each game in the working area of the RAM 226, such as the symbols determined by lottery.

Next, the main CPU 222 invokes and executes a subroutine of symbol lottery processing illustrated in FIG. 15 (step S1817). In the processing, to-be stopped symbols are determined based on random numbers for symbol determination.

Specifically, the main CPU 222 extracts five random numbers of the first to the fifth random numbers for symbol determination. Next, the main CPU 222 determines a to-be stopped symbol for the mech reel 52A with the first random number, a to-be stopped symbol for the mech reel 52B with the second random number, a to-be stopped symbol for the mech reel 52C with the third random number, a to-be stopped symbol for the mech reel 52D with the fourth random number, and a to-be stopped symbol for the mech reel 52E with the fifth random number. The to-be stopped symbols determined for the five mech reels 52A to 52E are stored in the symbol storage area provided in the RAM 226.

Next, the main CPU 222 invokes and executes reel effect lottery processing which is described later with reference to FIG. 22 (step S1819). The reel effect lottery processing determines presentation effects before the start of spinning of the five mech reels 52A to 52E and presentation effects from the middle until the stop of the spinning of the five mech reels 52A to 52E.

The reel effects are presentation effects by motion of the five mech reels 52A to 52E. Specifically, a plurality of kinds of reel effects are provided as shown in FIG. 23 and a combination of reel effects is determined. The reel effects are performed by controlling the spin speeds, spin directions, spin times (spin angles), and times to stop of the individual reel motors 272 for driving the five mech reels 52A to 52E. In the reel effect lottery processing, the main CPU 222 determines parameters for these spin speed, spin direction, spin time (spin angle), and time to stop of each reel motor 272.

In addition, at step S1819, the main CPU 222 may extract a random number for effect determination, determine an effect content from the predefined plurality of effect contents by lottery, and executes the determined effect content with predetermined timing. For example, the main CPU 222 can control the video display unit 110 to play a video for presentation effects, the speakers 112 to output audio, the lamp 114 to flash, and further apply special effects to these.

Figure 20:
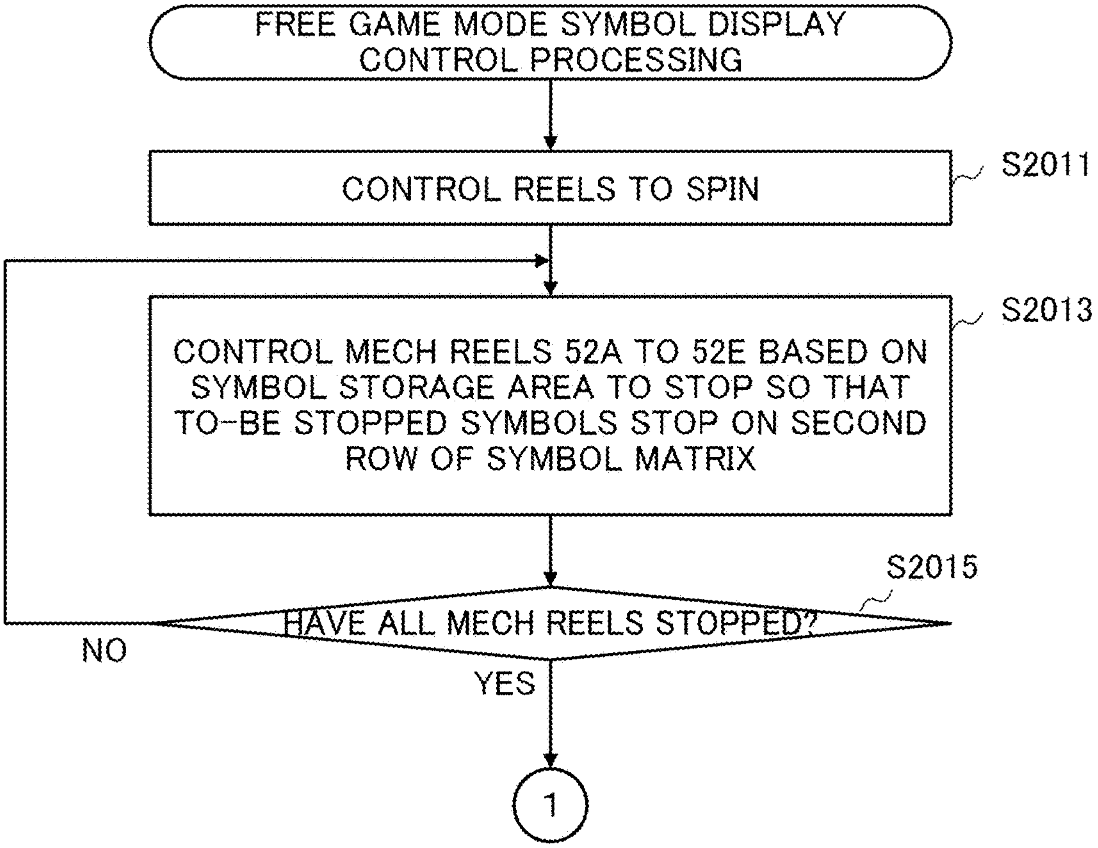
FIG. 20 is a flowchart of free game mode symbol display control processing.

Next, the main CPU 222 executes free game mode symbol display control processing illustrated in FIG. 20 (step S1821). In this processing, spinning the five mech reels 52A to 52E (scrolling the five reel strips) is started and the five to-be stopped symbols determined in the symbol lottery processing of step S1817 are stopped at the predetermined positions.

Next, the main CPU 222 executes payout determination processing illustrated in FIG. 17 (step S1823). In this processing, the main CPU 222 determines whether any winning pattern in the payout table (see FIG. 9) is completed based on the five to-be stopped symbols stored in the symbol storage area. The main CPU 222 determines an amount of payout in accordance with the winning pattern with reference to the payout table (see FIG. 9) and stores the amount to the payout count storage area (payout counter) provided in the RAM 226.

Next, the main CPU 222 decrements the game count by one (step S1825).

Next, the main CPU 222 determines whether the game count is more than zero (step S1827).

If the determination is that the game count is more than zero, the main CPU 222 returns to step S1815.

If the determination is that the game count is zero, the main CPU 222 exits this subroutine.

<Game Count Setting Processing>

FIG. 19 is a flowchart of game count setting processing for the slot machine 10 according to the present embodiment. The game count setting processing is invoked and executed at step S1811.

First, the main CPU 222 determines whether the number of BONUSes in the base game where the free game mode is triggered is three (3kind) (step S1911).

If the determination is that the number of BONUSes when the free game mode is triggered is three, the main CPU 222 sets the game count (maximum number of games) in the free game mode to 7 (step S1913) and exits this subroutine.

If the determination is that the number of BONUSes when the free game mode is triggered is not three (3kind), the main CPU 222 determines whether the number of BONUSes in the base game where the free game mode is triggered is four (4kind) (step S1915).

If the determination is that the number of BONUSes when the free game mode is triggered is four, the main CPU 222 sets the game count (maximum number of games) in the free game mode to 12 (step S1917) and exits this subroutine.

If the determination is that the number of BONUSes when the free game mode is triggered is not four (4kind), the main CPU 222 determines whether the number of BONUSes in the base game where the free game mode is triggered is five (5kind) (step S1919).

If the determination is that the number of BONUSes when the free game mode is triggered is five, the main CPU 222 sets the game count (maximum number of games) in the free game mode to 50 (step S1921) and exits this subroutine.

If the determination is that the number of BONUSes when free game mode is triggered is not five (5kind), the main CPU 222 exits this subroutine.

<Free Game Mode Symbol Display Control Processing>

Figure 21:
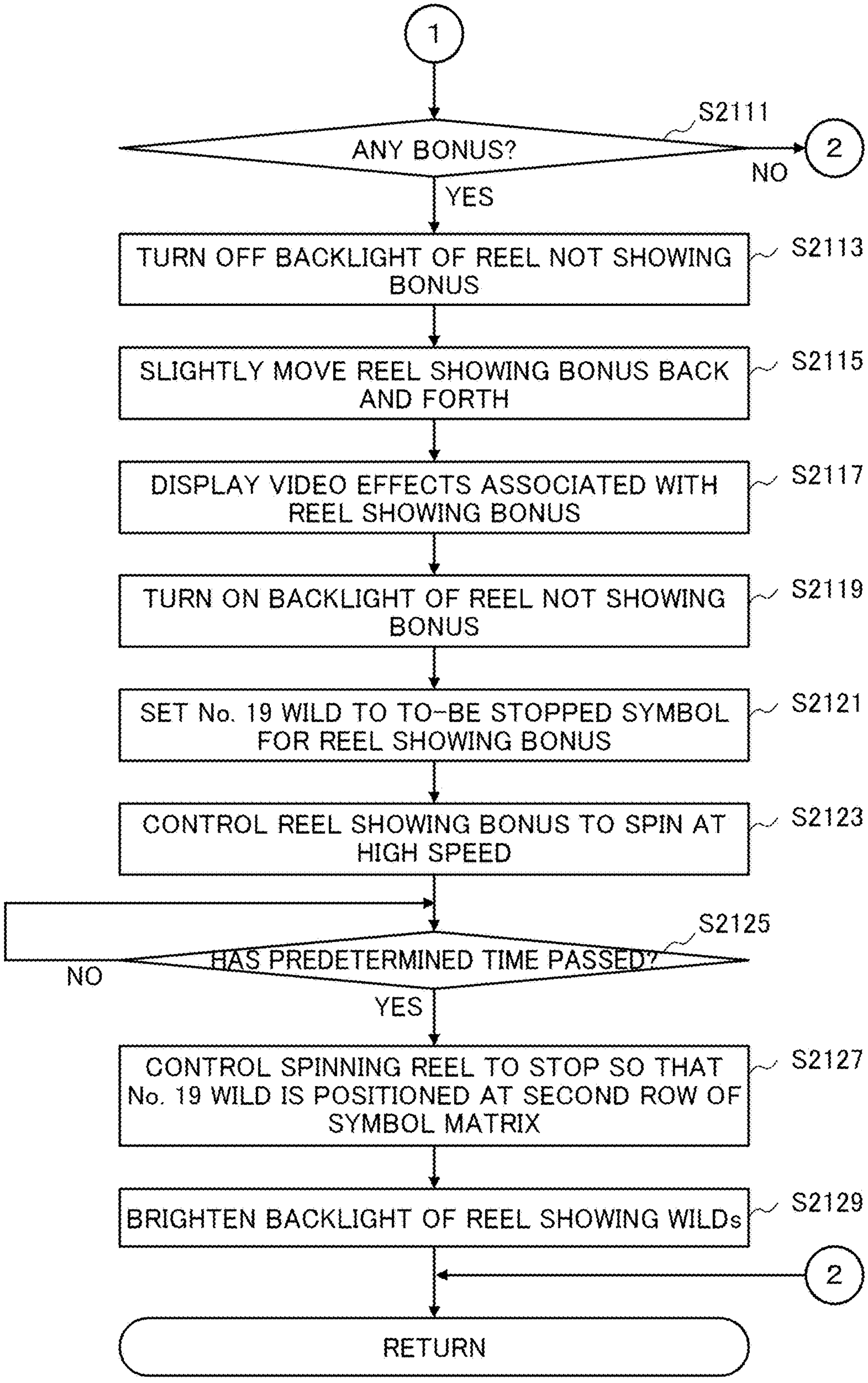
FIG. 21 is a flowchart of free game mode symbol display control processing.

FIGS. 20 and 21 are a flowchart of free game mode symbol display control processing for the slot machine 10 according to the present embodiment. The free game mode symbol display control processing is invoked and executed at step S1821.

First, the reel control module 308 run by the main CPU 222 sends a spin control signal to the reel assembly 50. The reel drivers 264 of the mech reels 52A to 52E supply power to the reel motors 272 to spin the mech reels 52A to 52E. The mech reels 52A to 52E spin at a predetermined speed so that the symbol arrays on the mech reels 52A to 52E scroll in the display window 56 of the symbol display unit 40 (step S2011).

Next, the reel control module 308 run by the main CPU 222 controls the reels to stop (step S2013). The spin control signal includes information on the stop positions for the mech reels 52A to 52E. The information on the stop positions can be obtained from the to-be stopped symbols for the individual reels held in the symbol storage area. The reel drivers 264 of the mech reels 52A to 52E control the reel motors 272 based on the information on spin positions of the mech reels 52A to 52E acquired by the magnetic field detectors 270 to stop the mech reels 52A to 52E at the positions indicated by the spin control signal. In this way, the reel control module 308 controls the reel motors 272 made of stepping motors to stop at desired positions; the scrolling of the symbol arrays are stopped so that the to-be stopped symbols are positioned on the middle row (the second row) of the symbol matrix formed in the display window 56.

Next, the main CPU 222 determines whether the main CPU 222 has stopped all the mech reels 52A to 52E (step S2015). If the determination is that the main CPU 222 has not stopped all the mech reels 52A to 52E, the main CPU 222 returns to step S2013.

If the determination is that the main CPU 222 has stopped all the mech reels 52A to 52E, the main CPU 222 determines whether any of the five mech reels 52A to 52E shows a BONUS (step S2111).

If the determination is that at least one of the five mech reels 52A to 52E shows a BONUS, the main CPU 222 turns off the backlight devices 280 of the mech reels not showing a BONUS among the five mech reels 52A to 52E (step S2113). This operation results in that only the mech reels showing a BONUS are illuminated, highlighting the mech reels showing a BONUS.

Next, the main CPU 222 slightly moves the mech reels showing a BONUS back and forth (step S2115). More specifically, the main CPU 222 slightly moves the mech reels upward and downward alternately. This operation enables the player to see as if the mech reels showing a BONUS are shaking.

Next, the main CPU 222 displays video effects associated with the mech reels showing a BONUS on the video display unit 110 (step S2117). For example, video effects associated with a mech reel can be a video where a star is falling toward the mech reel showing a BONUS.

Next, the main CPU 222 turns on the backlight devices 280 of the mech reels not showing a BONUS (step S2119).

Next, the main CPU 222 sets the WILD of No. 19 to the to-be stopped symbols of the reels showing a BONUS (step S2121). Specifically, the main CPU 222 sets the code number No. 19.

Next, the main CPU 222 controls the mech reels showing a BONUS to spin at high speed (step S2123).

Next, the main CPU 222 determines whether a predetermined time has passed (step S2125). If the determination is that the predetermined time has not passed, the main CPU 222 returns to step S2125.

Although the main CPU 222 determines whether a predetermined time has passed at step S2125, the main CPU 222 may determine whether the mech reels have rotated for a predetermined number of times. The predetermined time or the predetermined number of times can be determined at random by lottery. The predetermined time or the predetermined number of times can be determined depending on the number of BONUSes shown in the display window 56. In the cases of many BONUSes, the predetermined time should be shorter or the predetermined number of times should be smaller. This is because the more BONUSes appear, the more winning patterns may be completed, leading to high probability to provide more benefit to the player. Accordingly, finishing the free game mode and returning to the base game mode sooner by determining a predetermined time to be shorter or a predetermined number of times to be smaller lead the player to spend credits, so that the game hall can recover the loss.

If the determination is that the predetermined time has passed, the main CPU 222 controls each mech reel that has shown a BONUS to stop so that the WILD of No. 19 will stop at the second row (middle row) of the symbol matrix (step S2127). Such control results in showing three consecutive WILDs along each mech reel that have shown a BONUS in the display window 56. Specifically, the WILD of code No. 18 stops at the top row (first row); the WILD of code No. 19 stops at the middle row (second row); and the WILD of code No. 20 stops at the bottom row (third row).

As described above, in the free game mode, the mech reels that show a BONUS stop subsequently to show three consecutive WILDs.

Next, the main CPU 222 turns up the brightness of the backlight devices 280 for the reels showing the WILDs (step S2129), and exits this subroutine. If the determination in the foregoing step S2111 is that no BONUS appears on any of the five mech reels 52A to 52E, the main CPU 222 immediately exits this subroutine.

Through the symbol display control processing illustrated in FIGS. 20 and 21, symbols are rearranged in the display window 56 so that three consecutive WILDs appear on the mech reels that have shown a BONUS. The three consecutive WILDs are each replaced by another symbol to complete a more advantageous winning pattern and a final winning pattern is determined with reference to the payout table in FIG. 9.

As described above, the main CPU 222 determines whether a predetermined time has passed in the determination of step S2125 and controls mech reels to stop so that the WILDs will appear in the processing of step S2127. Alternatively, the main CPU 222 may calculate the lengths of movement after the restart until the stop of the spinning to control the mech reels.

The code numbers of the BONUSes are 12 and the code numbers of Wild2 are 19. Accordingly, in the case where a BONUS stops at the middle row of the display window 56, the mech reel should be moved by (7+22×n) symbols; then, a Wild2 stops at the middle row of the display window 56 and three consecutive WILDs appear. In the formula, n represents the number of rotations of a reel. Likewise, in the case where a BONUS is stopped at the top row of the display window 56, the mech reel should be moved by (6+22×n) symbols. In the case where a BONUS is stopped at the bottom row of the display window 56, the mech reel should be moved by (8+22×n) symbols. The values can be determined as appropriate depending on the places where the BONUS and the Wild2 are disposed.

<Reel Effect Lottery Processing>

Figure 22:
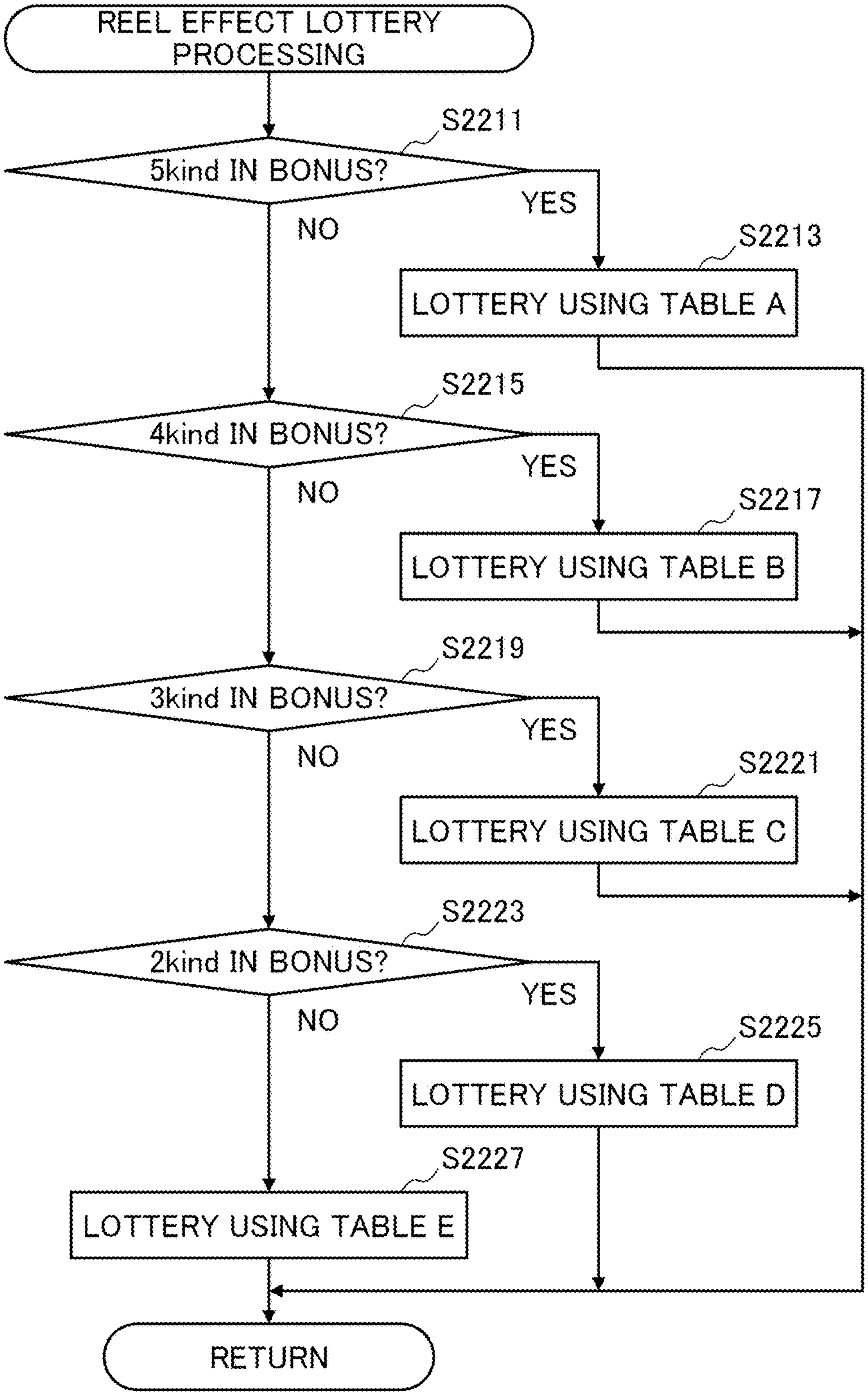
FIG. 22 is a flowchart of reel effect lottery processing.

FIG. 22 is a flowchart of reel effect lottery processing for the slot machine 10 according to the present embodiment. The reel effect lottery processing is invoked and executed at step S1319 or S1819.

First, the main CPU 222 determines whether five BONUSes (5kind) are determined to appear in the display window 56 through symbol lottery processing (step S2211). If the determination is that five BONUSes (5kind) are determined to appear, the main CPU 222 determines reel effects by lottery with reference to Table A (FIG. 23) (step S2213) and exits this subroutine.

If the determination is that five BONUSes (5kind) are not determined to appear, the main CPU 222 determines whether four BONUSes (4kind) are determined to appear in the display window 56 through symbol lottery processing (step S2215). If the determination is that four BONUSes (4kind) are determined to appear, the main CPU 222 determines reel effects by lottery with reference to Table B (FIG. 23) (step S2217) and exits this subroutine.

If the determination is that four BONUSes (4kind) are not determined to appear, the main CPU 222 determines whether three BONUSes (3kind) are determined to appear in the display window 56 through symbol lottery processing (step S2219). If the determination is that three BONUSes (3kind) are determined to appear, the main CPU 222 determines reel effects by lottery with reference to Table C (FIG. 23) (step S2221) and exits this subroutine.

If the determination is that three BONUSes (3kind) are not determined to appear, the main CPU 222 determines whether two BONUSes (2kind) are determined to appear in the display window 56 through symbol lottery processing (step S2223). If the determination is that two BONUSes (2kind) are determined to appear, the main CPU 222 determines reel effects by lottery with reference to Table D (FIG. 23) (step S2225) and exits this subroutine.

If the determination is that two BONUSes (2kind) are not determined to appear, the main CPU 222 determines reel effects by lottery with reference to Table E (FIG. 23) (step S2227) and exits this subroutine.

FIG. 23 is a drawing for illustrating the relations between reel effects and lottery tables (Table A to Table E). The reel effects are presentation effects by motion of mech reels.

As shown in FIG. 23, there are two kinds of effects before the start of spinning, Shake 1 and Shake 2. Shake 1 and Shake 2 are effects in which mech reels are slightly moved back and forth. Shake 1 and Shake 2 are different in the length of back and forth movement (amplitude) and the time of back and forth movement (cycle).

The effects from the middle to the stop of spinning are effects by motion of reels after the start of spinning until the stop of spinning of the mech reels. There are five kinds of effects from the middle to the stop of spinning. Low Speed, High Speed, High Speed 2, High Speed and Stop Together, and Shake 3-Reverse Spin-High Speed-Stop Together.

Low Speed is action to spin the mech reels slower than normal. High Speed is action to spin the mech reels faster than normal. High Speed 2 is action to spin the mech reels faster than the High Speed. High Speed and Stop Together is action to spin the mech reels spin faster than the normal and then to stop them together. Shake 3-Reverse Spin-High Speed-Stop Together is action to slightly move the mech reels back and forth, to spin them backward, to spin them forward at high speed, and to stop them together. Shake 3 is different from Shake 1 or Shake 2 in the length of back and forth movement (amplitude) and the time of back and forth movement (cycle).

As shown in FIG. 23, combination of these effects are assigned numbers (0 to 15) and the individual numbers are assigned weights. For example, Table A specifies that the weight of No. 0 is 0, that the weight of No. 1 is 300, that the weight of No. 2 is 100, that the weight of No. 3 is 100, that the weight of No. 4 is 100, that the weight of No. 5 is 400, that the weight of No. 6 is 0, that the weight of No. 7 is 200, that the weight of No. 8 is 200, that the weight of No. 9 is 200, that the weight of No. 10 is 200, that the weight of No. 11 is 0, that the weight of No. 12 is 300, that the weight of No. 13 is 300, that the weight of No. 14 is 300, and that the weight of No. 15 is 300.

When Table A is selected in the reel effect lottery processing of FIG. 22, one of the effect contents of 0 to 15 is determined with the foregoing weights to perform effects by motion of mech reels.

<<Example of Series of Effects>>

FIGS. 24A to 35B are views showing images of an example of a series of effects. The upper images are images displayed on the video display unit 110 and the lower images are images of the display window 56 showing the five mech reels 52A to 52E of the symbol display unit 40. The five mech reels 52A to 52E are disposed in order from the left to the right.

<Base Game Mode>

FIGS. 24A to 26B provide images displayed on the video display unit 110 and images of the five mech reels 52A to 52E in a base game mode.

Figure 24A:
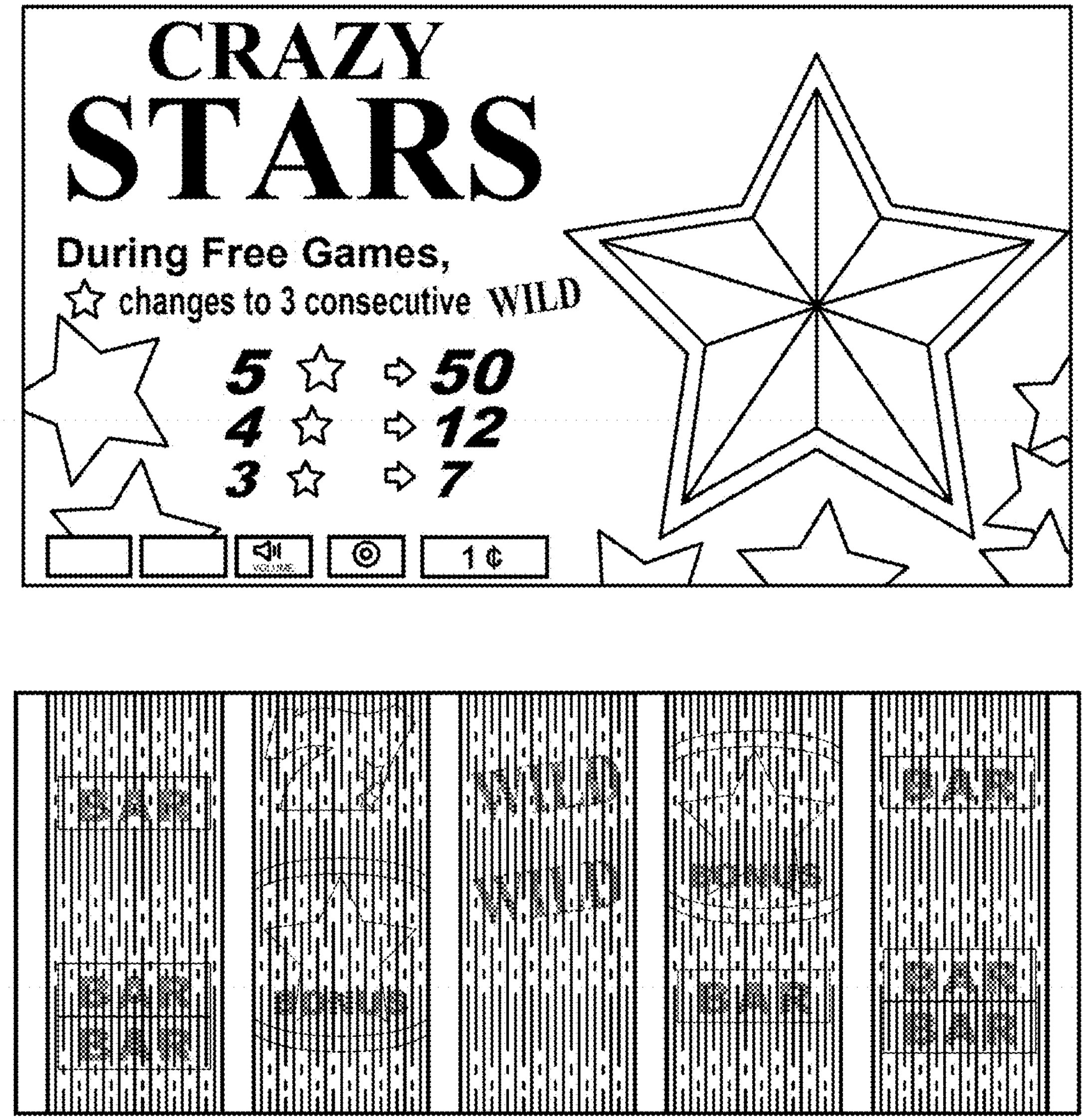
FIG. 24A is a view for showing an image of a video display unit and five mech reels.

FIG. 24A is a view showing a state where all the five mech reels 52A to 52E are spinning and the symbols are being shuffled (scrolled) (the processing of FIG. 16).

FIG. 24B is a view showing a state where the mech reel 52A is stopped but the mech reels 52B to 52E are spinning and the symbols are being shuffled. The mech reel 52A shows a BONUS when it is stopped (the processing of FIG. 16).

Figure 25A:
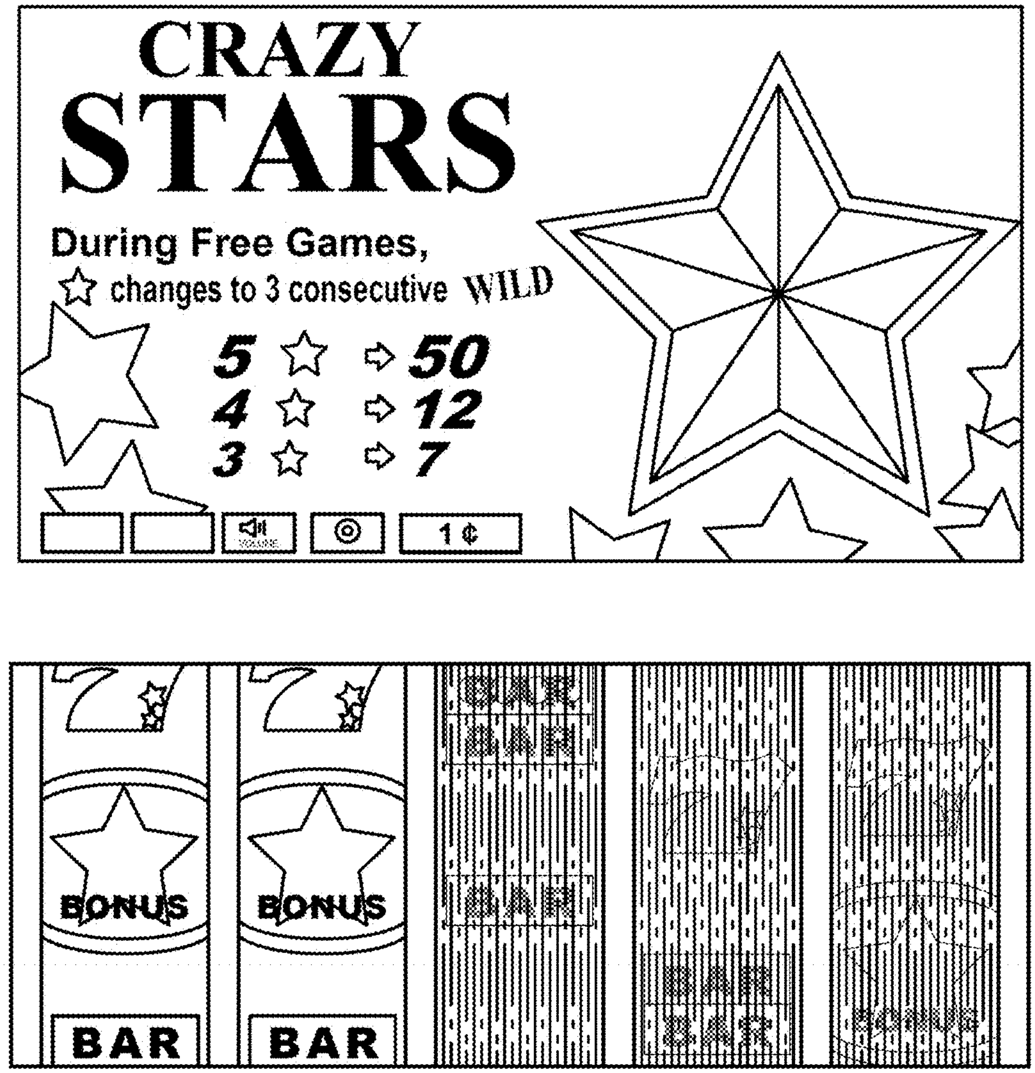
FIG. 25A is a view for showing an image of a video display unit and five mech reels.

FIG. 25A is a view showing a state where two mech reels 52A and 52B are stopped but the mech reels 52C to 52E are spinning and the symbols are being shuffled. The two mech reels 52A and 52B show two BONUSes when they are stopped (the processing of FIG. 16).

Figure 25B:
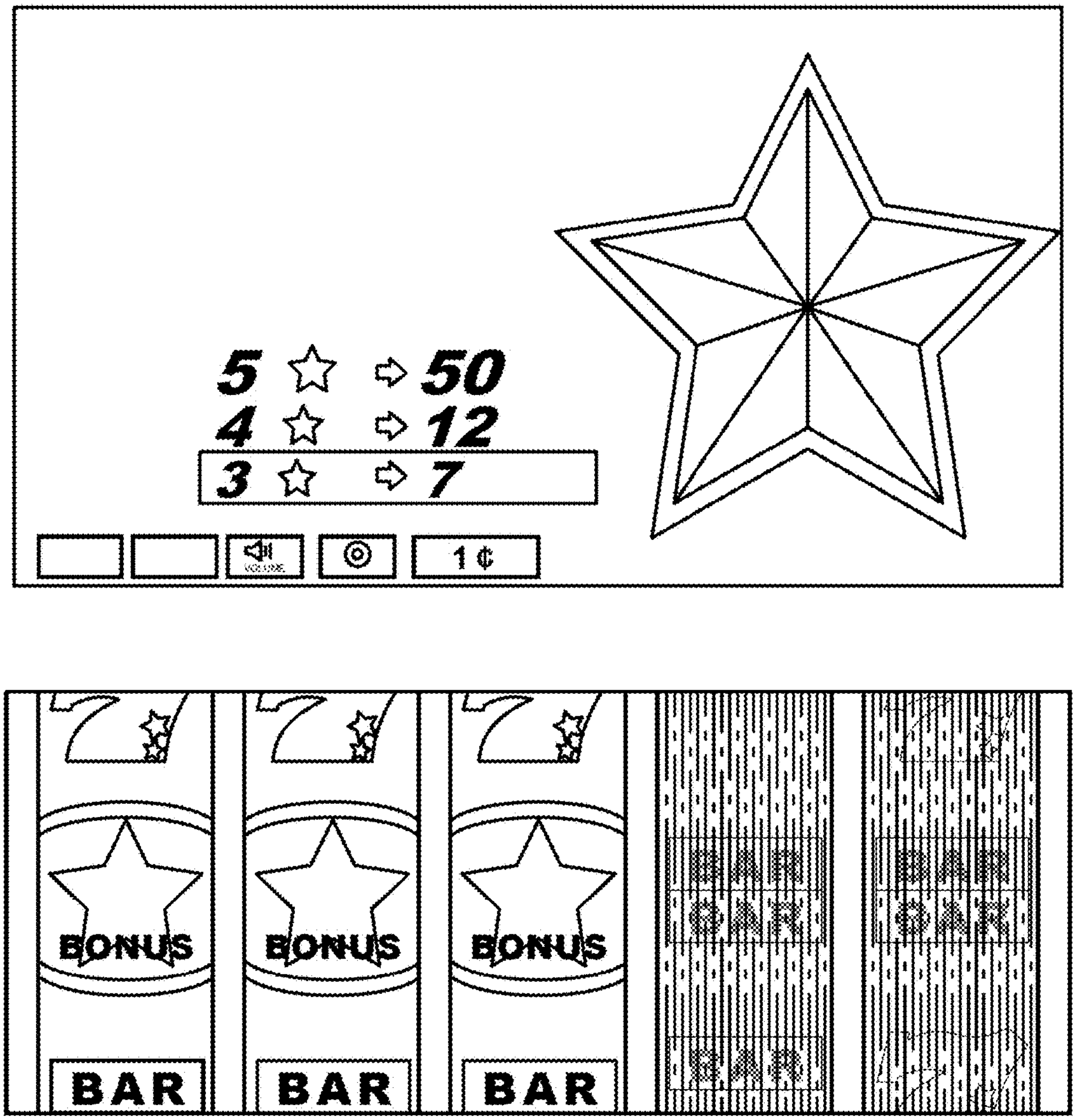
FIG. 25B is a view for showing an image of a video display unit and five mech reels.

FIG. 25B is a view showing a state where three mech reels 52A to 52C are stopped but the mech reels 52D and 52E are spinning and the symbols are being shuffled. The three mech reels 52A to 52C show three BONUSes when they are stopped (the processing of FIG. 16).

Figure 26A:
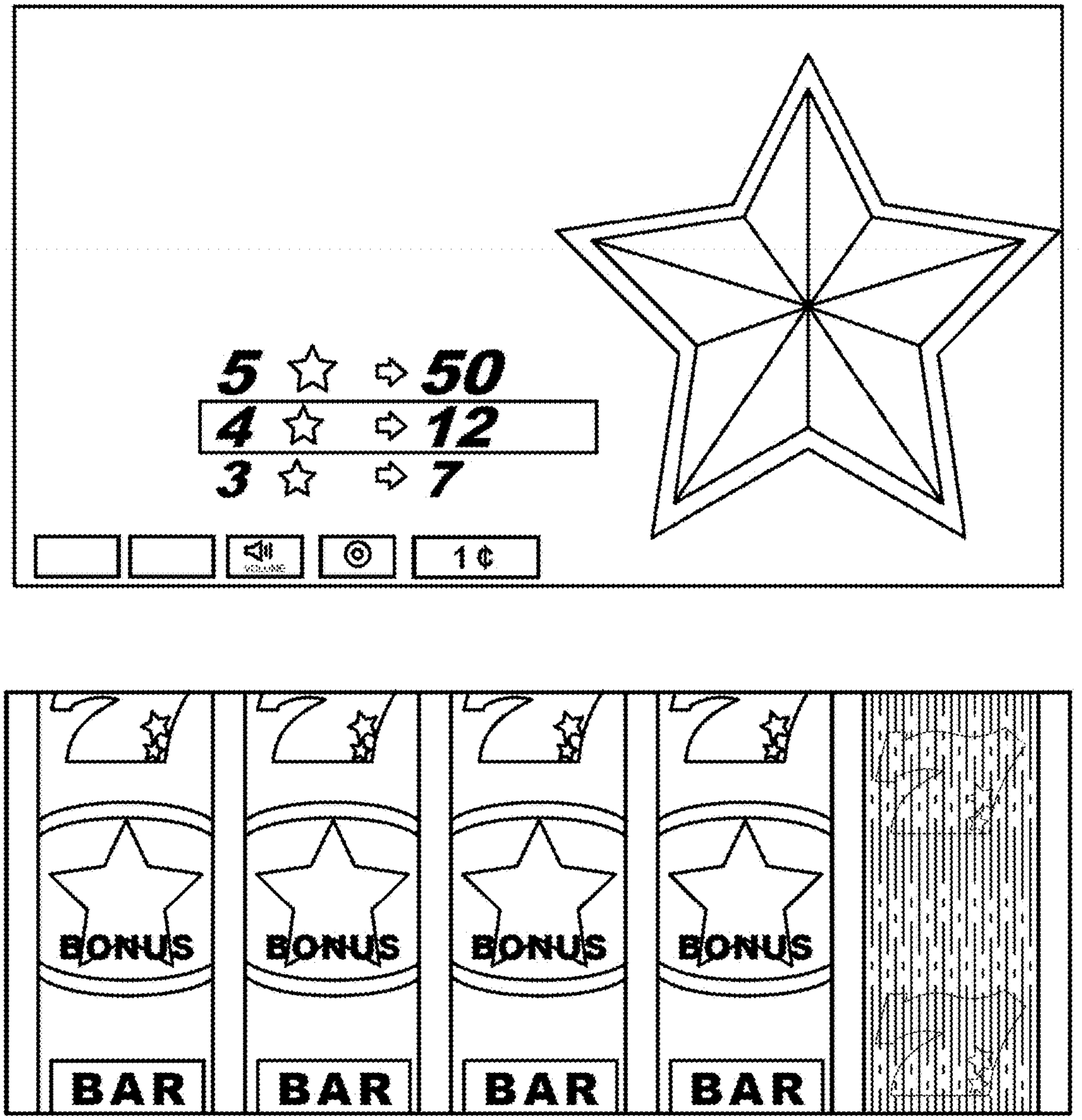
FIG. 26A is a view for showing an image of a video display unit and five mech reels.

FIG. 26A is a view showing a state where four mech reels 52A to 52D are stopped but the mech reel 52E is spinning and the symbols are being shuffled. The four mech reels 52A to 52D show four BONUSes when they are stopped (the processing of FIG. 16).

Figure 26B:
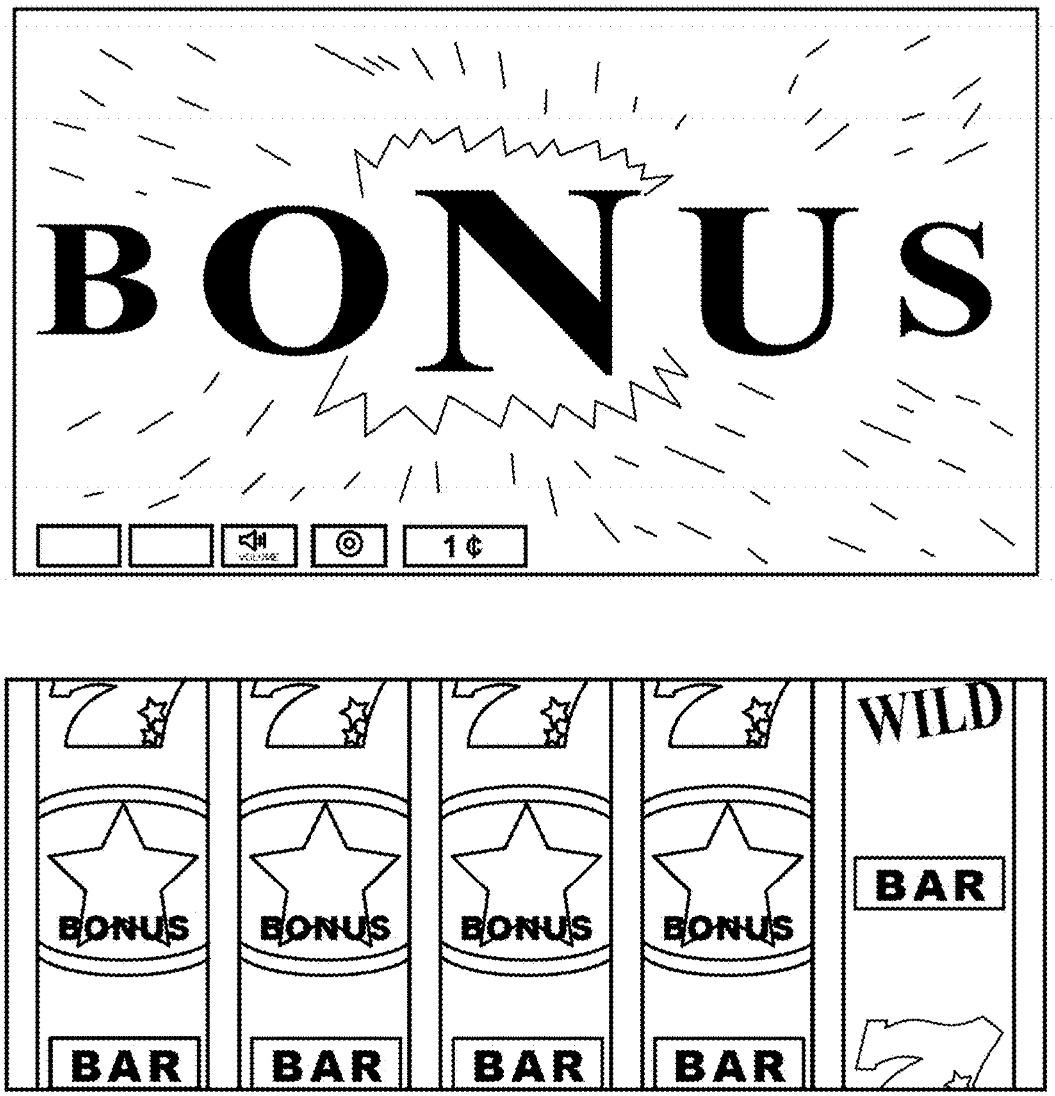
FIG. 26B is a view for showing an image of a video display unit and five mech reels.
Figure 27A:
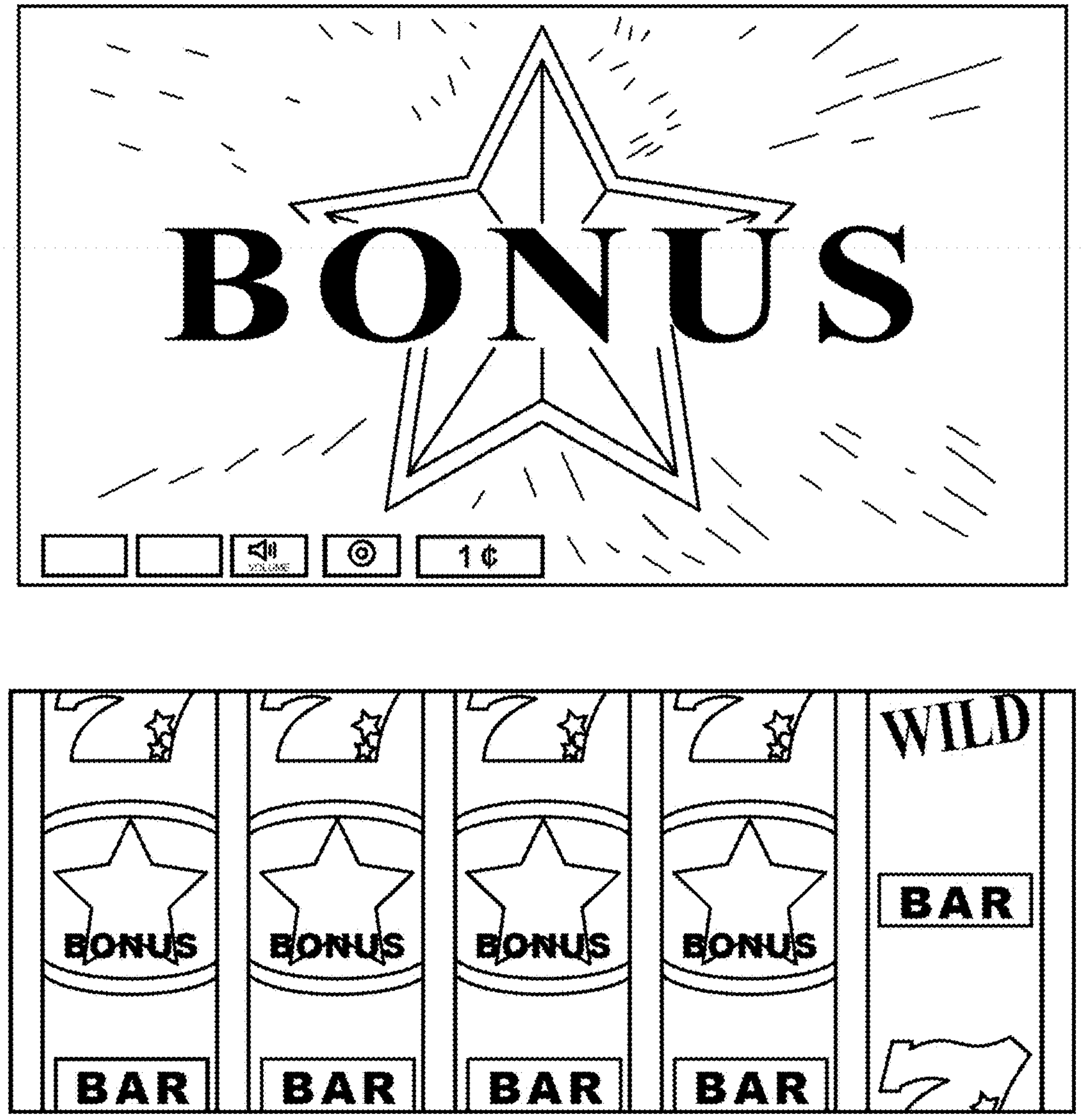
FIG. 27A is a view for showing an image of a video display unit and five mech reels.
Figure 27B:
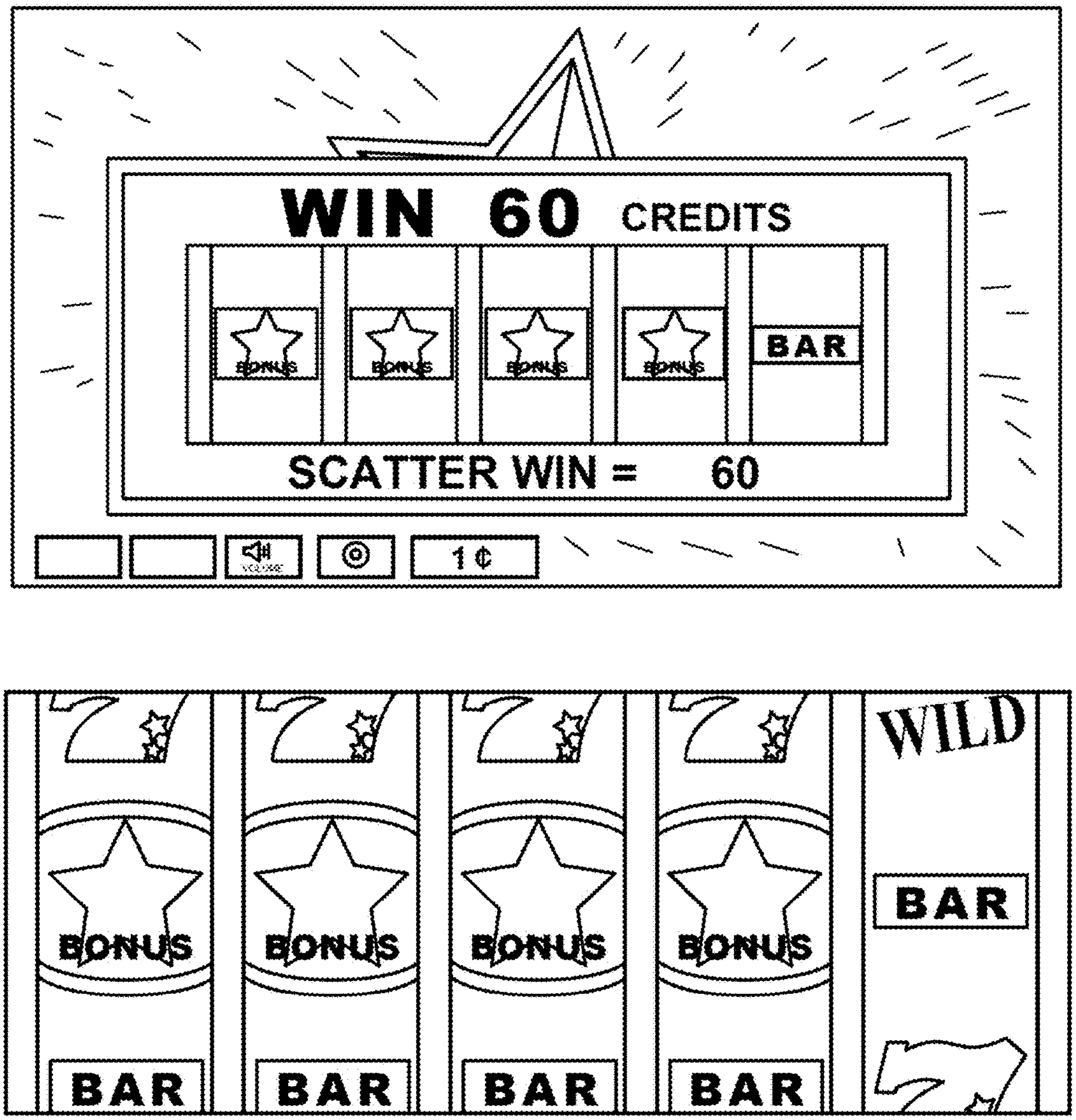
FIG. 27B is a view for showing an image of a video display unit and five mech reels.
Figure 28B:
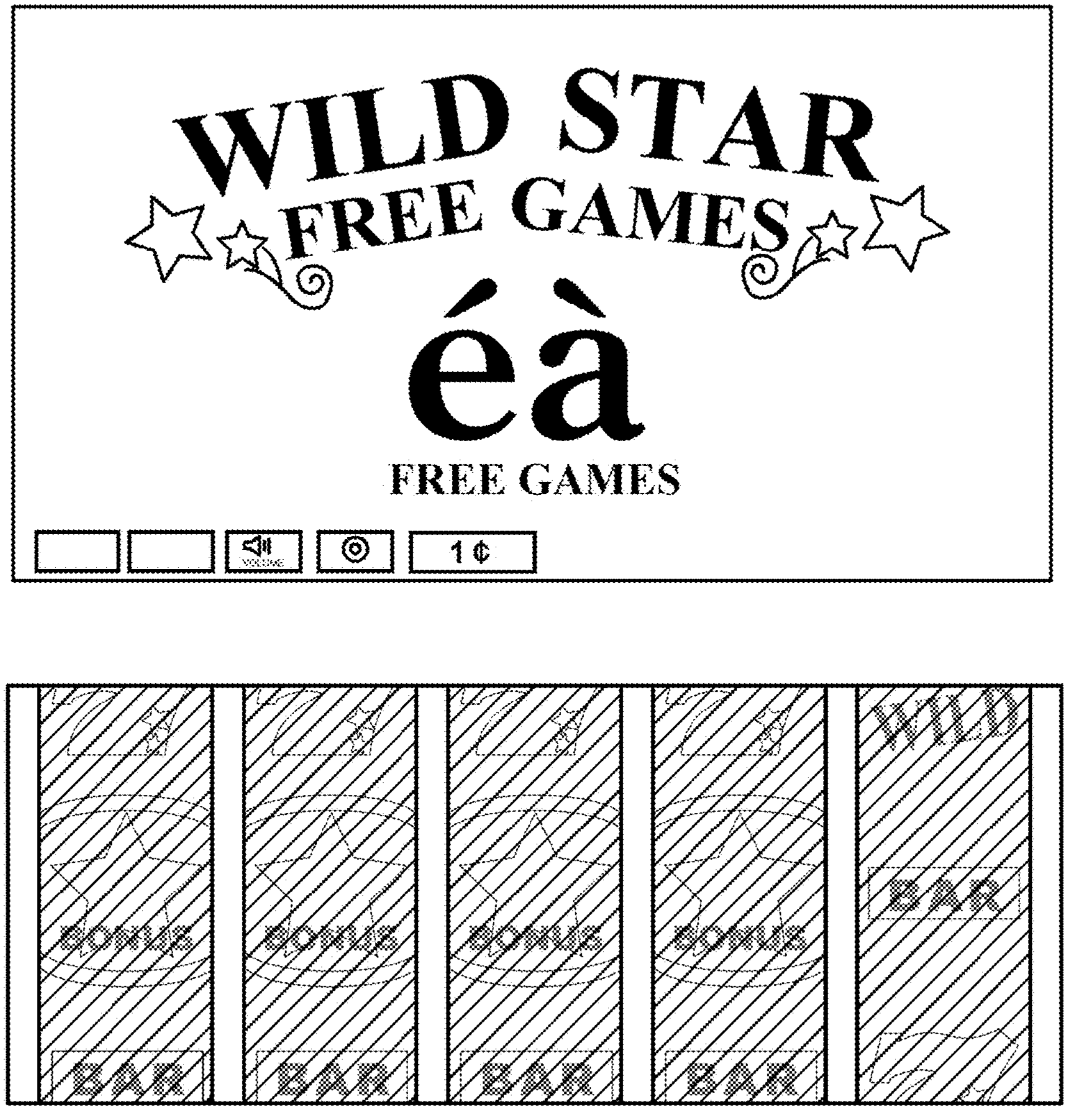
FIG. 28B is a view for showing an image of a video display unit and five mech reels.

FIG. 26B is a view showing a state where all the five mech reels 52A to 52E are stopped and symbols are all rearranged in the display window 56. The five mech reels 52A to 52E show four BONUSes and one 1BAR on the middle row of the display window 56 when they are stopped (the processing of FIG. 16). As a result, a winning pattern of BONUSes is completed, which triggers a free game mode (steps S1325 and S1327). In the example of FIG. 26B, the top row and the bottom row show BLANKs; no winning pattern is completed.

As shown in FIGS. 24A to 25A, the video display unit 110 shows the game title "CRAZY STARS" and information of "5☆→50", "4☆→12", "3☆→7" respectively indicating that completion of five BONUSes leads to acquisition of 50 free games, that completion of four BONUSes leads to acquisition of 12 free games, and that completion of three BONUSes leads to acquisition of 7 free games (step S1813).

In response to appearance of three BONUSes, the video display unit 110 indicates acquisition of at least "3☆→7" as shown in FIG. 25B. Subsequently, in response to appearance of four BONUSes, the video display unit 110 indicates, acquisition of at least "4☆→12" as shown in FIG. 26A. When all the five mech reels 52A to 52E are stopped, the video display unit 110 displays "BONUS" as shown in FIG. 26B, so that the player can see that the games enter a free game mode. As described above, when all the five mech reels 52A to 52E are stopped, four BONUSes are shown and trigger a free game mode including 12 free games.

As shown in FIGS. 27A to 29A, video effects until the start of free game mode are displayed on the video display unit 110 (step S1813). An image of a star and words of "WILD STAR" and "FREE GAMES" are displayed on the video display unit 110. As shown in FIGS. 28B to 29B, the backlight devices 280 of all the five mech reels 52A to 52E are turned off.

<Free Game Mode>

Figure 29A:
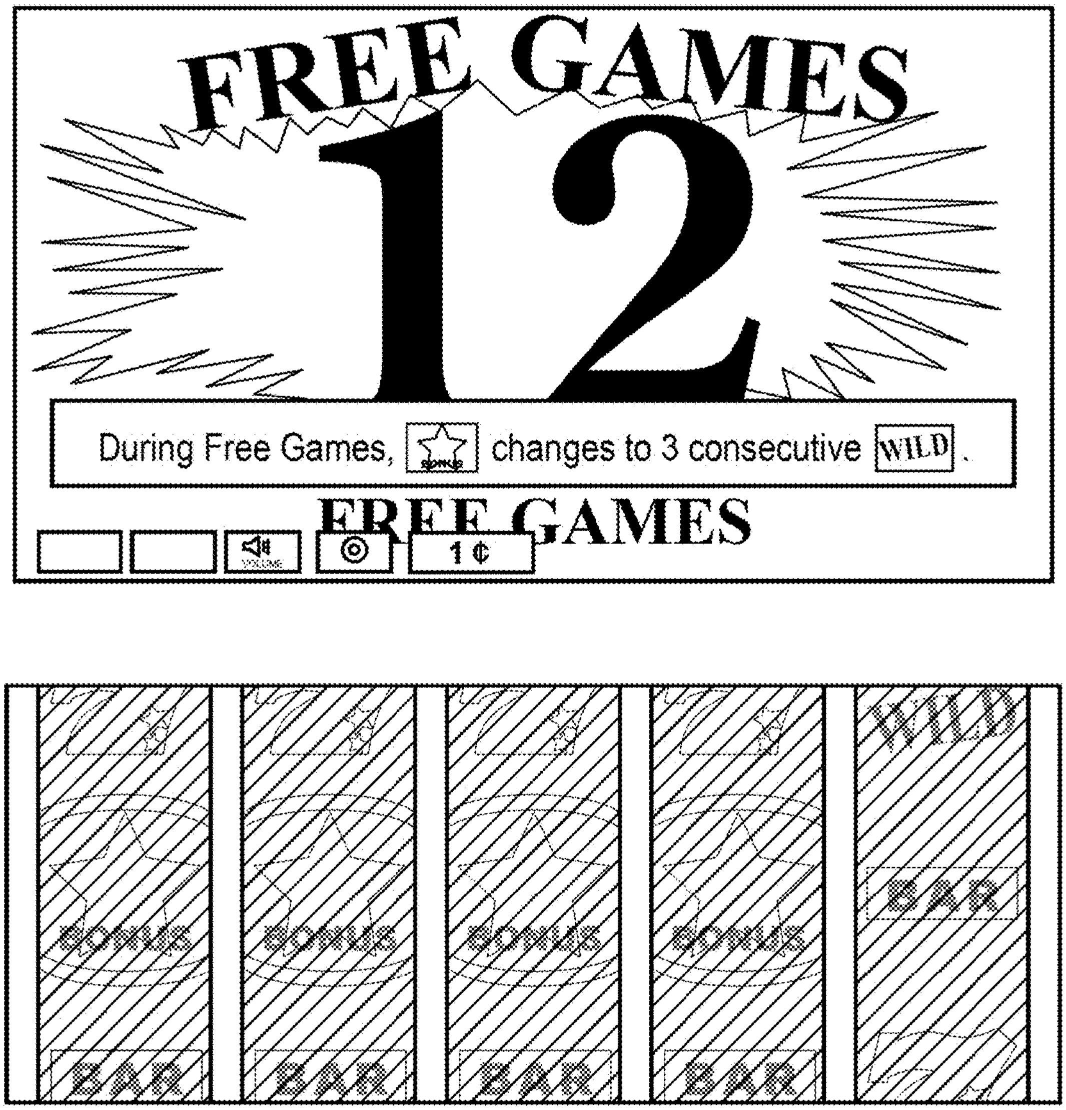
FIG. 29A is a view for showing an image of a video display unit and five mech reels.
Figure 29B:
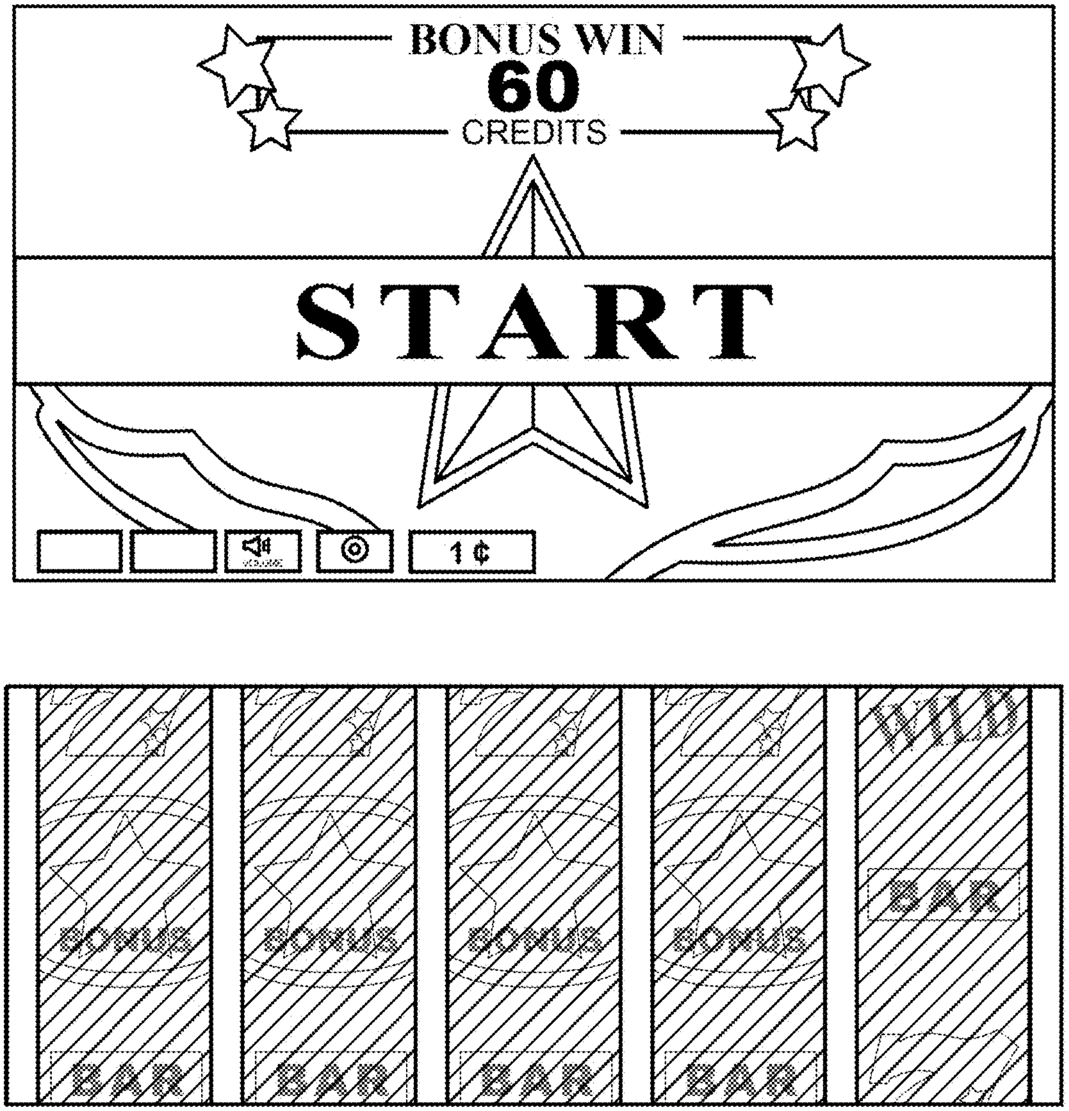
FIG. 29B is a view for showing an image of a video display unit and five mech reels.

As shown in FIG. 29B, when a unit game in the free game mode is started, the video display unit 110 displays a word "START" and the current credit (step S1813). The display makes the player recognize the start of a free game mode.

Figure 30A:
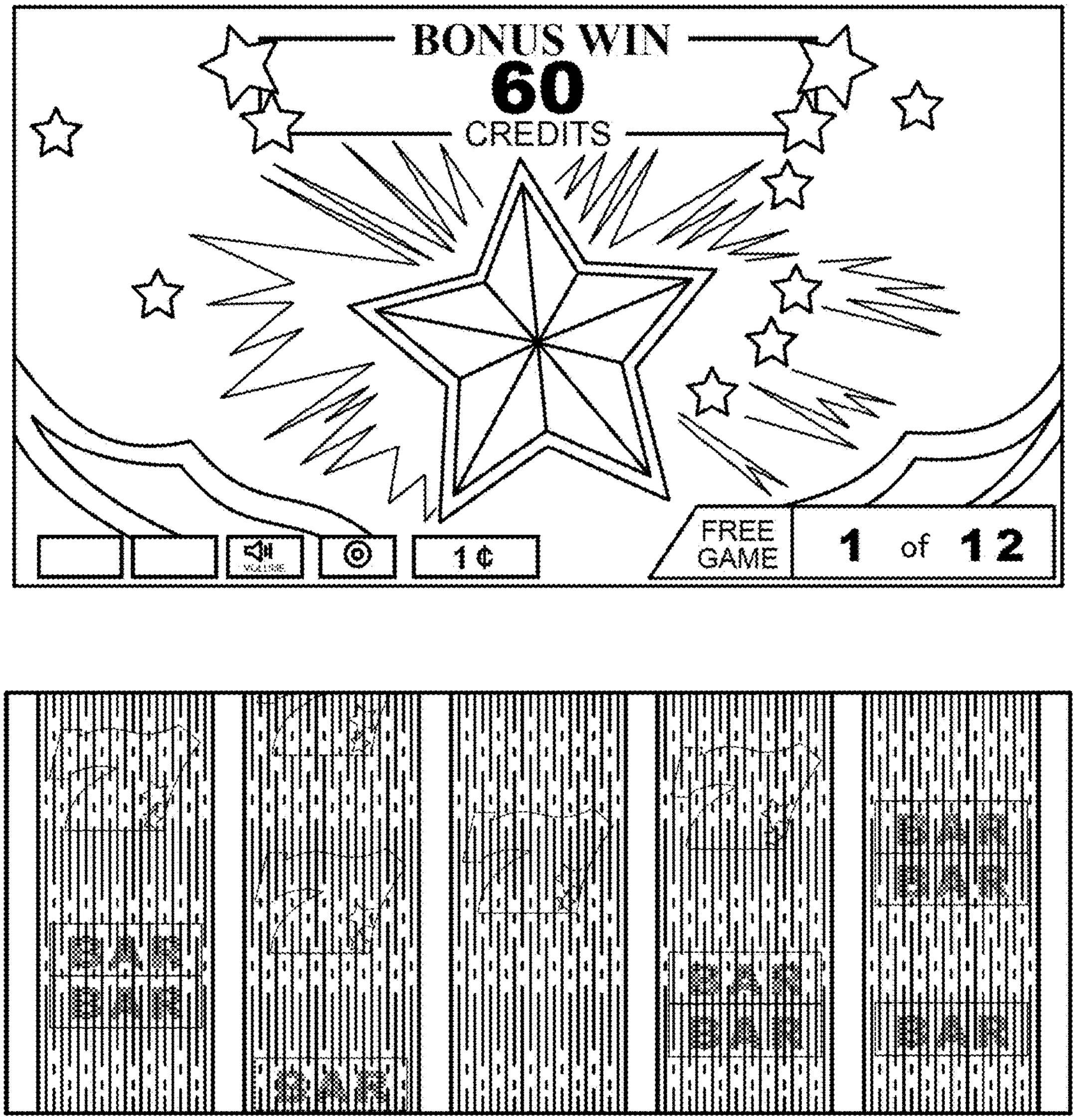
FIG. 30A is a view for showing an image of a video display unit and five mech reels.

FIG. 30A is a view showing the where that all five mech reels 52A to 52E are spinning and the symbols are being shuffled after the start of a unit game in the free game mode (steps S2011 to S2015).

Figure 30B:
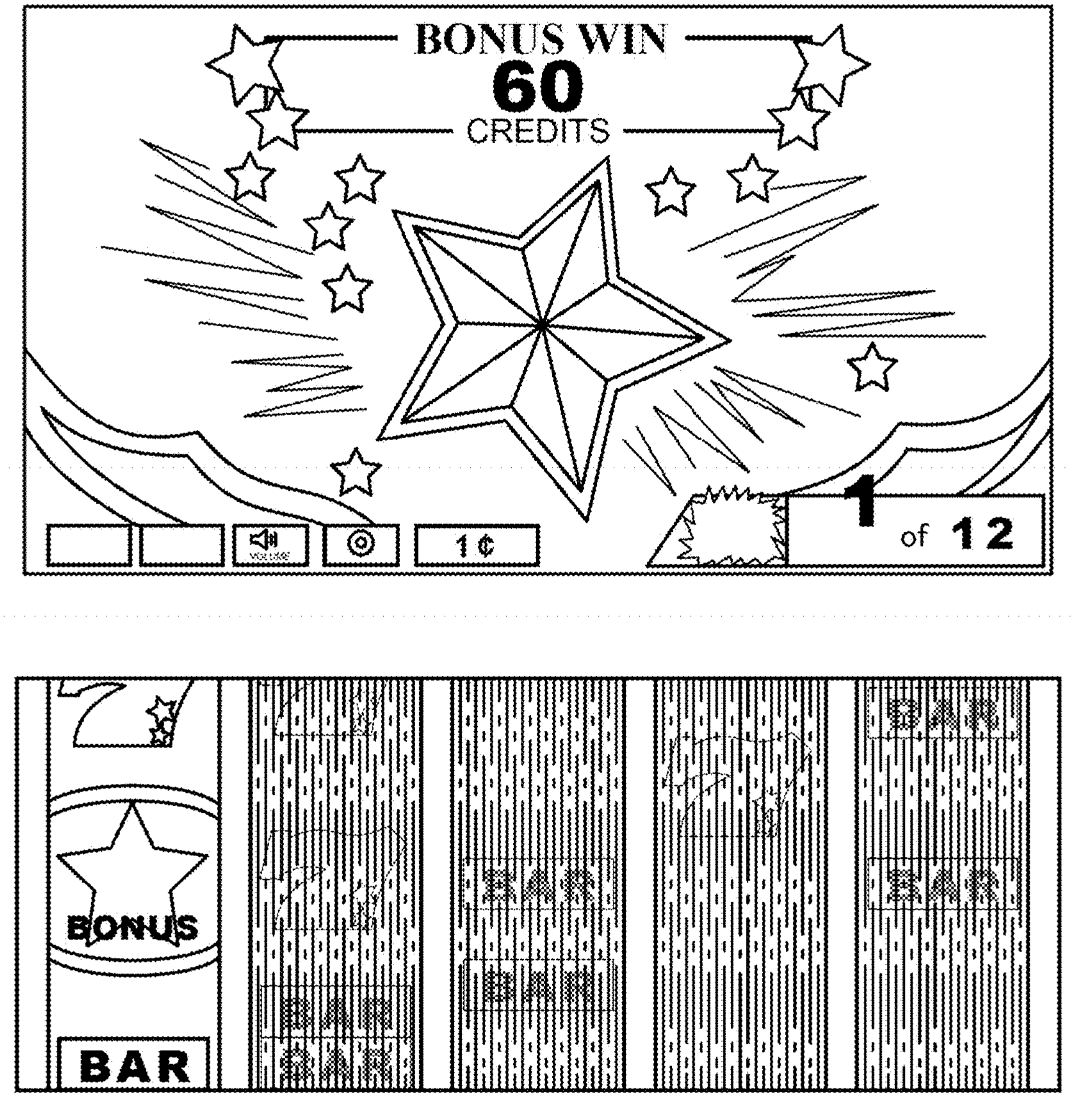
FIG. 30B is a view for showing an image of a video display unit and five mech reels.

FIG. 30B is a view showing a state where the mech reel 52A is stopped but the mech reels 52B to 52E are spinning and the symbols are being shuffled. The mech reel 52A shows a BONUS when it is stopped (steps S2011 to S2015).

Figure 31A:
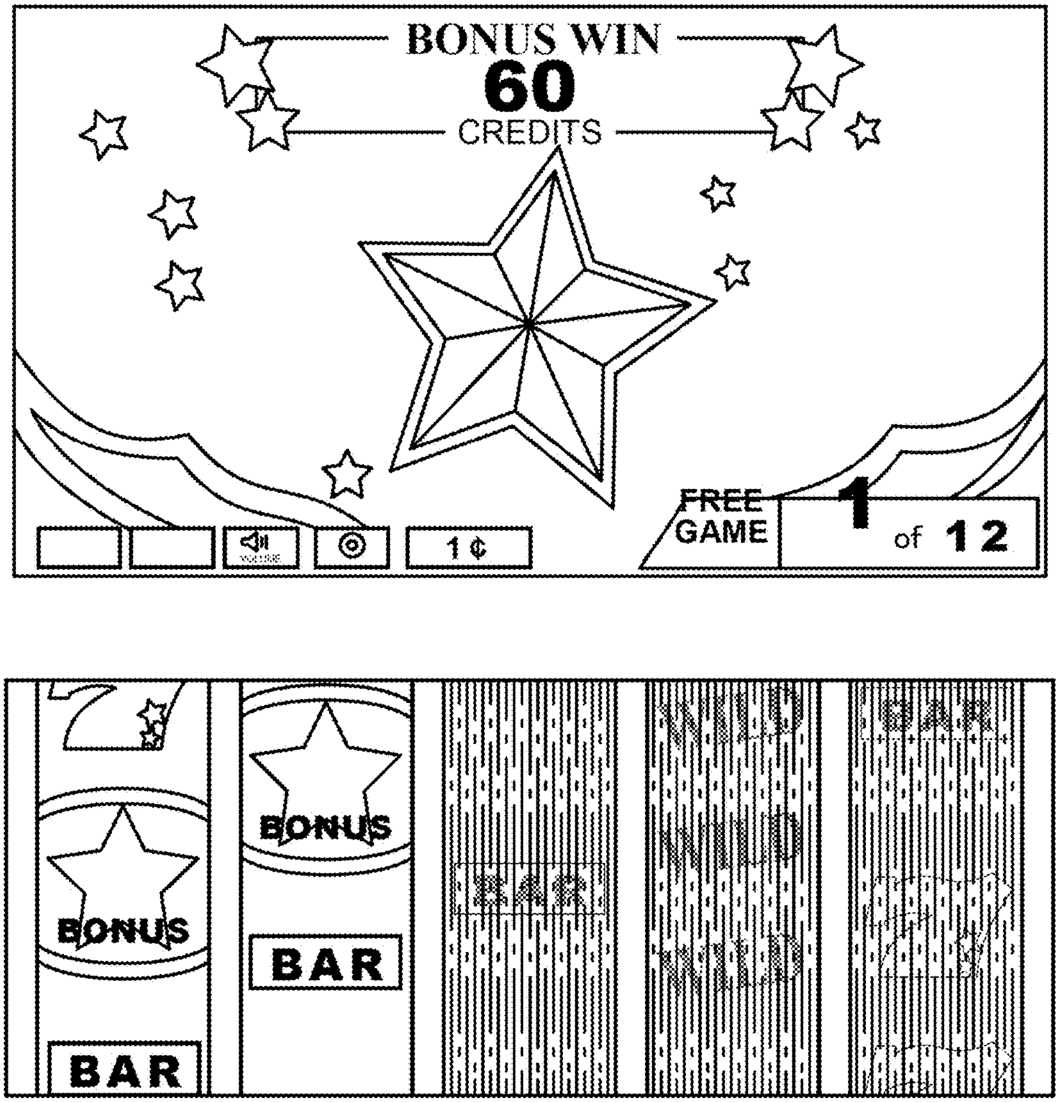
FIG. 31A is a view for showing an image of a video display unit and five mech reels.

FIG. 31A is a view showing a state where two mech reels 52A and 52B are stopped but the mech reels 52C to 52E are spinning and the symbols are being shuffled. The two mech reels 52A and 52B show two BONUSes when they are stopped (steps S2011 to S2015).

Figure 31B:
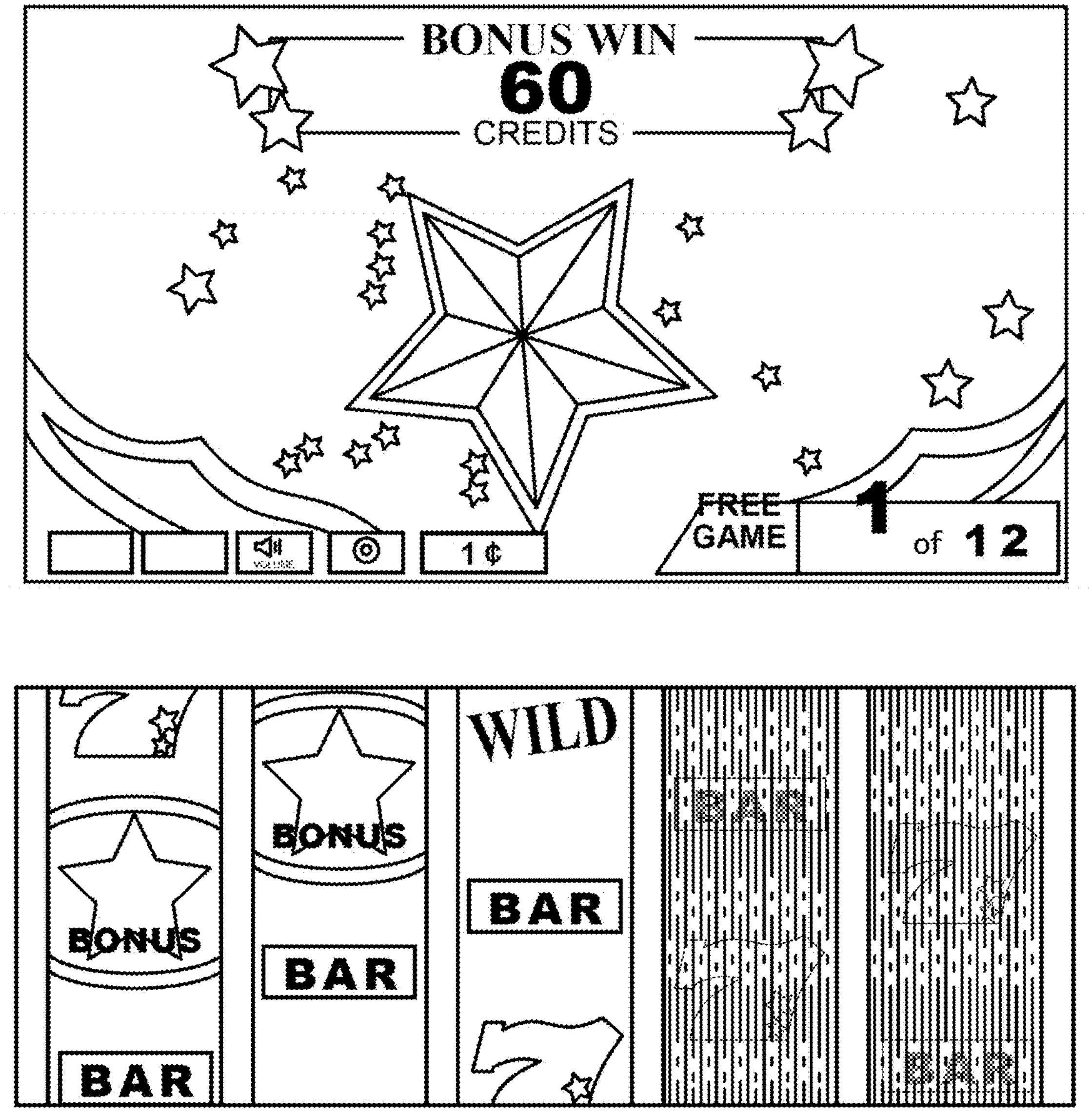
FIG. 31B is a view for showing an image of a video display unit and five mech reels.

FIG. 31B is a view showing a state where three mech reels 52A to 52C are stopped but the mech reels 52D and 52E are spinning and the symbols are being shuffled. The three mech reels 52A to 52C show two BONUSes and one 1BAR when they are stopped (steps S2011 to S2015).

Figure 32A:
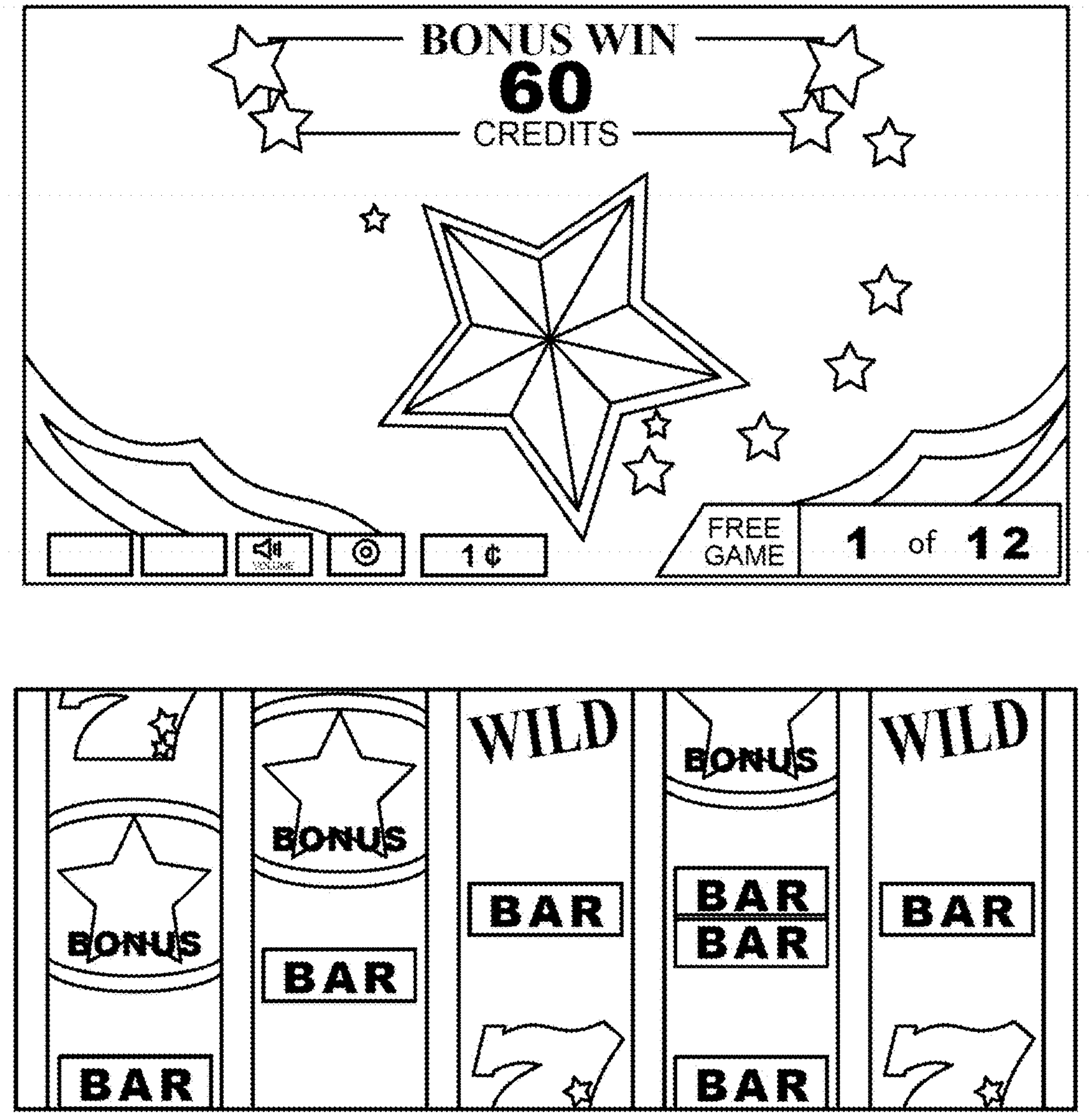
FIG. 32A is a view for showing an image of a video display unit and five mech reels.

FIG. 32A is a view showing a state where all the five mech reels 52A to 52E are stopped. The five mech reels 52A to 52E show two BONUSes, one 1BAR, one 2BAR, and one 1BAR when they are stopped (steps S2011 to S2015). Specifically, the mech reel 52A shows a BONUS at the middle row; the mech reel 52B shows a BONUS at the top row. Furthermore, the mech reel 52C shows a 1BAR at the middle row; the mech reel 52D shows a 2BAR at the middle row; and the mech reel 52E shows a 1BAR at the middle row. The mech reel 52B further shows a 1BAR at the bottom row. The mech reels 52A, 52C, 52D, and 52B show BLANKs on the top row and bottom TOW.

As shown in FIG. 32A, the position for a BONUS to appear can be any of the top row, the middle row, and the bottom row. If a BONUS appears any one of these positions, the mech reel is to be spun again.

Figure 32B:
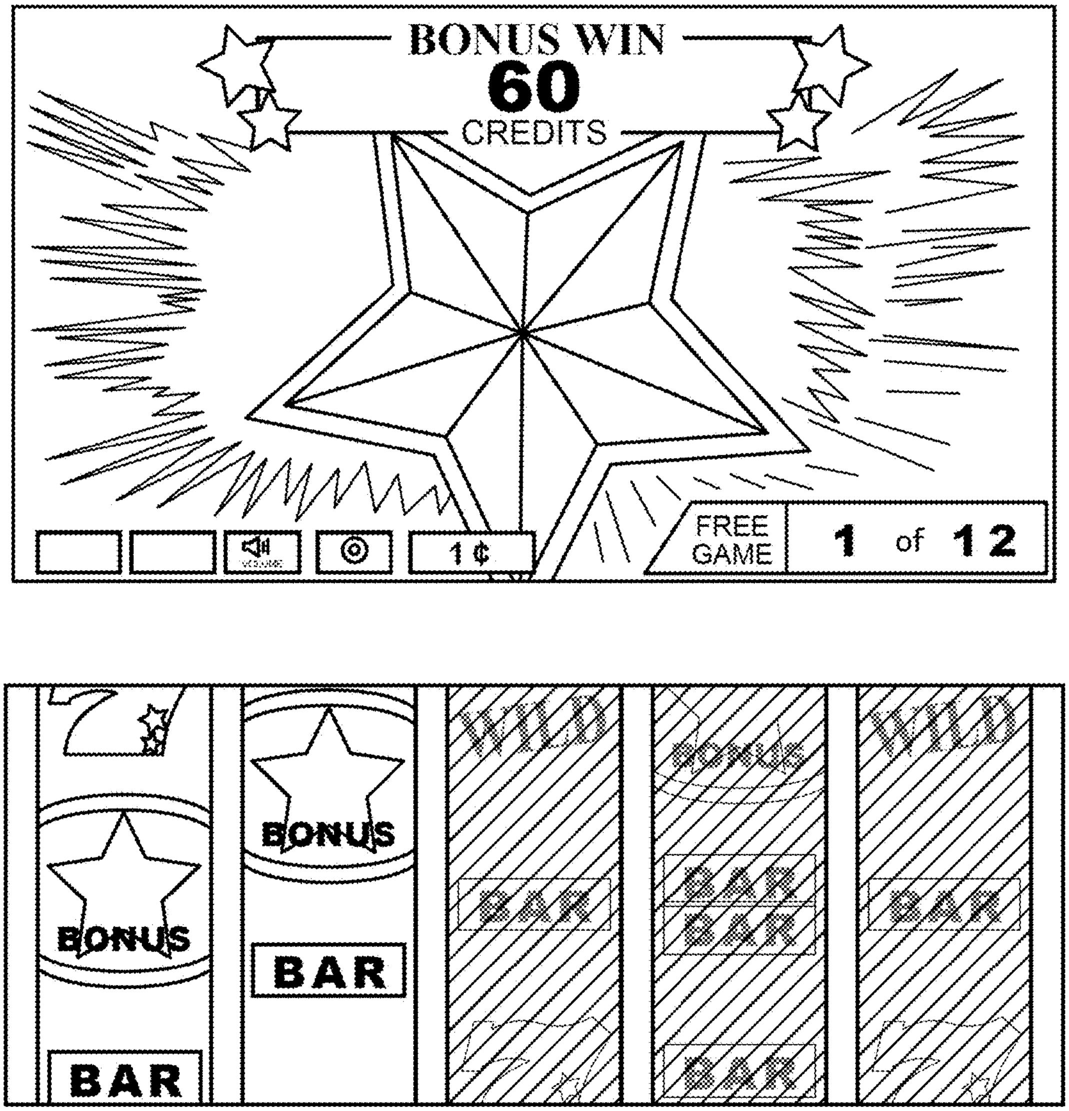
FIG. 32B is a view for showing an image of a video display unit and five mech reels.

FIG. 32B is a view showing a state where the backlight devices 280 for the three mech reels 52C to 52E not showing a BONUS are turned off.

As shown in FIG. 33A, the video display unit 110 displays a video in which stars are falling toward the two mech reels 52A and 52B showing a BONUS (step S2117).

Figure 33B:
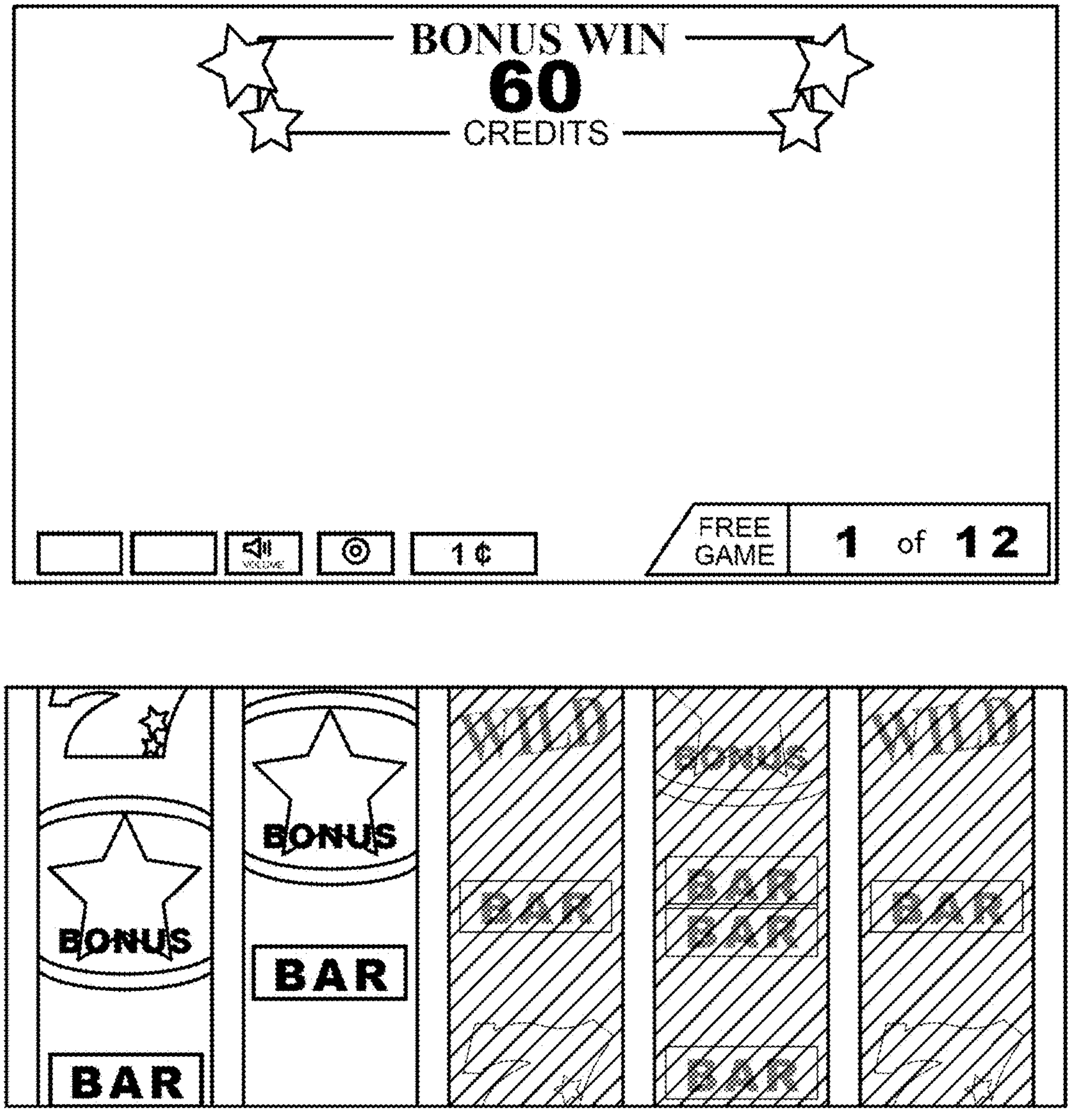
FIG. 33B is a view for showing an image of a video display unit and five mech reels.

FIG. 33B shows a state where the video display unit 110 has cleared the display (step S2117).

FIG. 34A is a view showing a state where only the two mech reels 52A and 52B that have shown a BONUS are spinning again and the symbols are being shuffled (step S2123). The three mech reels 52C to 52E not showing a BONUS keep still. After a predetermined time of spinning, the two mech reels 52A and 52B stop together.

Figure 34B:
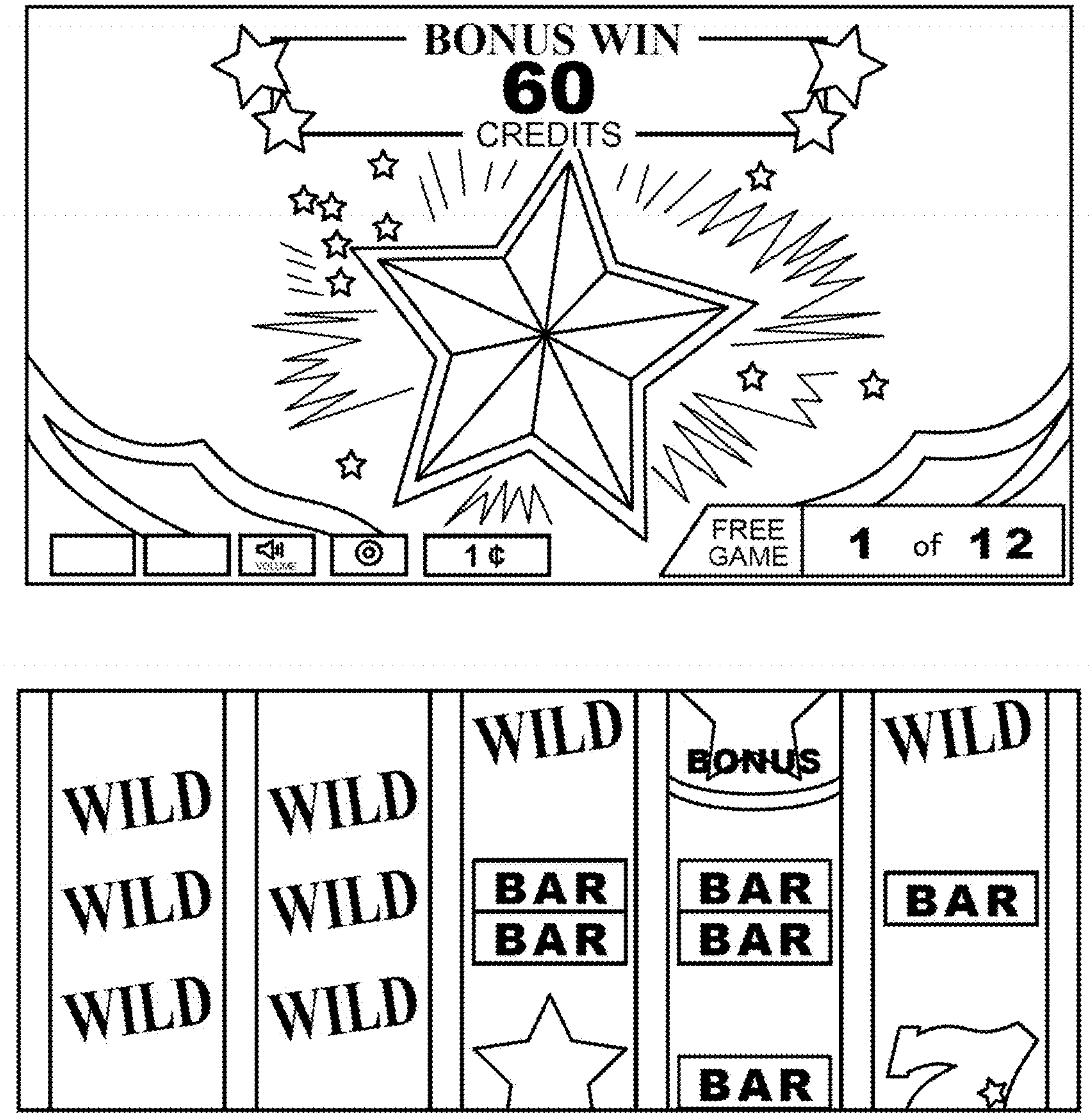
FIG. 34B is a view for showing an image of a video display unit and five mech reels.

FIG. 34B shows a state where the two mech reels 52A and 52B are stopped to each show three consecutive WILDs thereon (step S2127).

As shown in FIGS. 30A to 34B, after the five mech reels 52A to 52E start spinning until they finally stop, the video display unit 110 displays a video in which a large star is rotating.

Figure 35A:
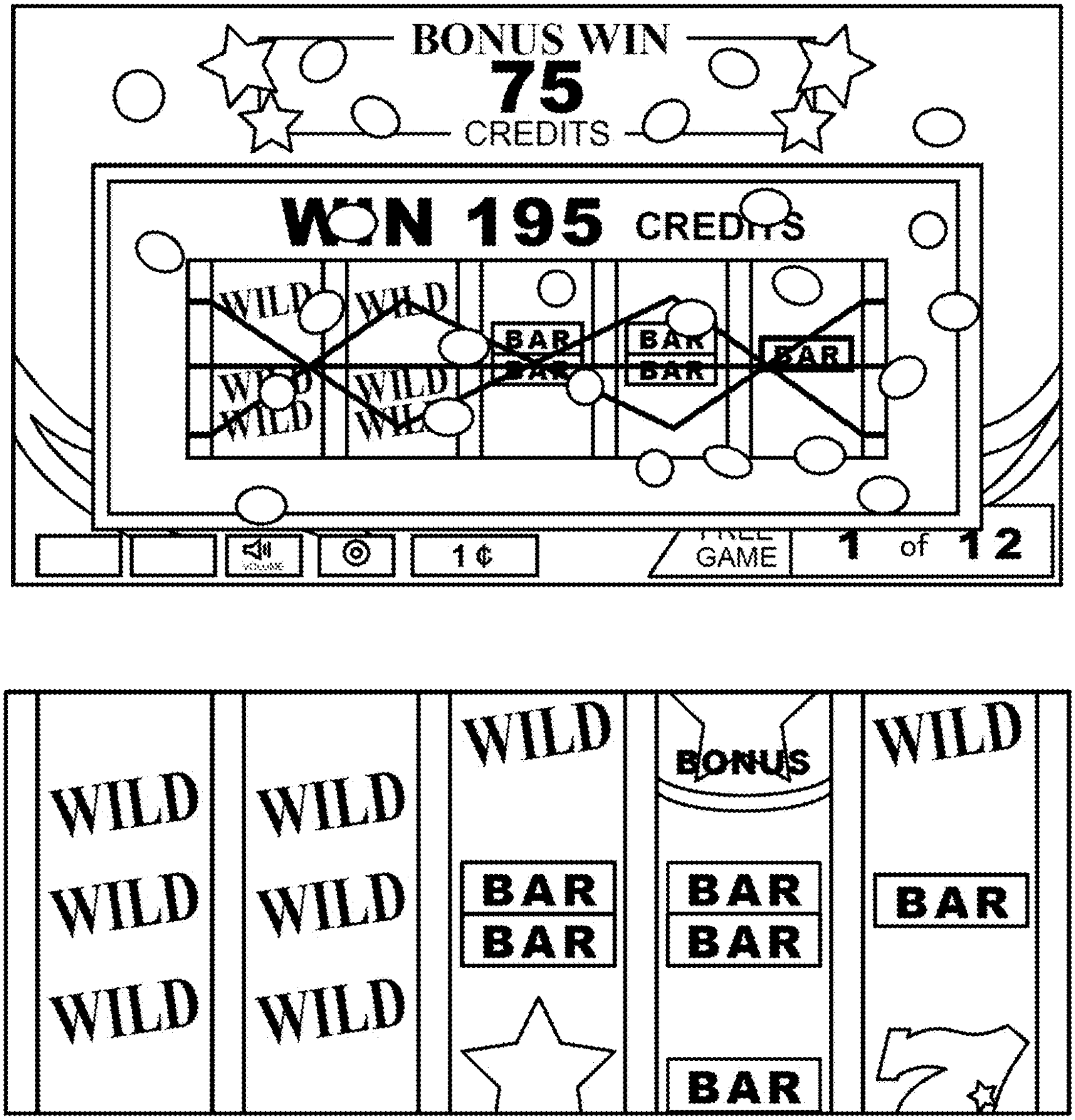
FIG. 35A is a view for showing an image of a video display unit and five mech reels.

As shown in FIG. 35A, in response to the appearance of three consecutive WILDs on each of the two mech reels 52A and 52B, the video display unit 110 displays an image indicating a plurality of paylines on which winning patterns are completed. The appearance of three consecutive WILDs on the two mech reels 52A and 52B leads to completion of more winning patterns, increasing the payout to be provided to the player.

Figure 35B:
FIG. 35B is a view for showing an image of a video display unit and five mech reels.

As shown in FIG. 35B, the video display unit 110 displays an image indicating that the completion of winning patterns in this unit game in the free game mode has increased the credit to 255 credits.

As shown in FIG. 35A, appearance of three consecutive WILDs on the two mech reels 52A and 52B leads to completion of winning patterns on multiple paylines, so that the player is provided with payout for each completed winning pattern.

The foregoing example has described a case of showing three consecutive WILDs when the condition that a BONUS appears is satisfied. However, the symbol is not limited to such a symbol having a special function but can be a normal symbol. That is to say, the requirement is satisfied if consecutively disposed first symbols are shown when the condition that a second symbol different from the first symbols appears is satisfied.

What is claimed is:

1. A gaming machine comprising:

a symbol display device including reels to be mechanically driven to rotate; and a controller for controlling the driving of the reels, wherein a plurality of symbols are disposed on each of the reels, wherein, on at least one of the reels, the plurality of symbols include first symbols, a second symbol different from the first symbol, and blank symbols, wherein the first symbols are wild symbols substitutable for other symbols, wherein the second symbol is a normal symbol including a particular symbol different from the wild symbols, wherein the first symbols are disposed consecutively on the at least one of the reels, wherein the normal symbols are symbols that are able to be a constituent symbol of a winning pattern, wherein the blank symbols are symbols that are unable to be a constituent symbol of a winning pattern, wherein normal symbols are disposed alternately with blank symbols and wild symbols are disposed consecutively without a blank symbol interposed between the wild symbols on the reels, wherein the controller is programmed to perform the following processing of:

(1-1) driving the reels to show a second symbol; and (1-2) driving the reels to show the consecutively disposed first symbols when a condition that the second symbol is shown is satisfied.

* * * * *